US007832882B2

(12) United States Patent
Weller et al.

(10) Patent No.: US 7,832,882 B2
(45) Date of Patent: Nov. 16, 2010

(54) INFORMATION MIRROR SYSTEM

(75) Inventors: Andrew D. Weller, Holland, MI (US); Rodney K. Blank, Zeeland, MI (US); Kenneth L. Schierbeek, Zeeland, MI (US); Kenneth Schofield, Holland, MI (US); Niall R. Lynam, Holland, MI (US); Troy O. Cooprider, Rochester, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 12/693,733

(22) Filed: Jan. 26, 2010

(65) Prior Publication Data

US 2010/0126030 A1    May 27, 2010

Related U.S. Application Data

(63) Continuation of application No. 12/473,687, filed on May 28, 2009, now Pat. No. 7,670,016, which is a continuation of application No. 12/268,685, filed on Nov. 11, 2008, now Pat. No. 7,540,620, which is a continuation of application No. 11/363,415, filed on Feb. 27, 2006, now Pat. No. 7,452,090, which is a continuation of application No. 10/456,599, filed on Jun. 6, 2003, now Pat. No. 7,004,593.

(60) Provisional application No. 60/420,010, filed on Oct. 21, 2002, provisional application No. 60/398,240, filed on Jul. 24, 2002, provisional application No. 60/386,373, filed on Jun. 6, 2002.

(51) Int. Cl.
*G02B 7/182* (2006.01)
(52) U.S. Cl. .................................. 359/879
(58) Field of Classification Search ......... 359/871–879; 340/438; 250/239
See application file for complete search history.

(56) References Cited

U.S. PATENT DOCUMENTS 2,166,303 A    7/1939    Hodny et al.

(Continued)

FOREIGN PATENT DOCUMENTS

AU    A-40317/95    2/1995

(Continued)

OTHER PUBLICATIONS

International Search Report dated Oct. 6, 2003, 1 pages received from the International Searching Authority in connection with International Application No. PCT/US03/17804.

(Continued)

*Primary Examiner*—Euncha P Cherry
(74) *Attorney, Agent, or Firm*—Van Dyke, Gardner, Linn & Burkhart, LLP

(57) ABSTRACT

An information mirror system includes an interior rearview mirror assembly having an electro-optic transflective reflective element and a reconfigurable liquid crystal video display operable to display information. The video display is disposed in the mirror housing rearward of the transflective mirror reflector of the transflective reflective element, wherein information displayed by the video display is viewable by a driver of the equipped vehicle viewing through the transflective mirror reflector when the video display is displaying information. The rearview mirror assembly includes a microprocessor that controls dimming of the electro-optic transflective reflective element and that controls the video display. The information mirror system includes a forward facing camera that captures images through the windshield of the equipped vehicle. The forward facing camera is associated with a headlamp controller that, responsive to image processing of images captured by the forward facing camera, is operable to control the headlamps of the equipped vehicle.

35 Claims, 13 Drawing Sheets

U.S. PATENT DOCUMENTS

| | | |
|---|---|---|
| 2,414,223 A | 1/1947 | DeVirgilis |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,185,020 A | 5/1965 | Thelen |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,614,210 A | 10/1971 | Caplan |
| 3,628,851 A | 12/1971 | Robertson |
| 3,676,668 A | 7/1972 | Collins et al. |
| 3,689,695 A | 9/1972 | Rosenfield et al. |
| 3,711,176 A | 1/1973 | Alfrey, Jr. et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,860,847 A | 1/1975 | Carley |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,109,235 A | 8/1978 | Bouthors |
| 4,139,234 A | 2/1979 | Morgan |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,580,196 A | 4/1986 | Task |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,626,850 A | 12/1986 | Chey |
| 4,630,109 A | 12/1986 | Barton |
| 4,630,904 A | 12/1986 | Pastore |
| 4,634,835 A | 1/1987 | Suzuki |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,665,311 A | 5/1987 | Cole |
| 4,665,430 A | 5/1987 | Hiroyasu |
| 4,671,615 A | 6/1987 | Fukada et al. |
| 4,671,619 A | 6/1987 | Kamimori et al. |
| 4,692,798 A | 9/1987 | Seko et al. |
| 4,694,295 A | 9/1987 | Miller et al. |
| 4,697,883 A | 10/1987 | Suzuki et al. |
| 4,702,566 A | 10/1987 | Tukude et al. |
| 4,712,879 A | 12/1987 | Lynam et al. |
| 4,713,685 A | 12/1987 | Nishimura et al. |
| 4,721,364 A | 1/1988 | Itoh et al. |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,780,752 A | 10/1988 | Angerstein et al. |
| 4,781,436 A | 11/1988 | Armbruster |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |
| 4,799,768 A | 1/1989 | Gahan |
| 4,807,096 A | 2/1989 | Skogler et al. |
| 4,825,232 A | 4/1989 | Howdle |
| 4,826,289 A | 5/1989 | Vandenbrink et al. |
| 4,837,551 A | 6/1989 | Iino |
| 4,845,402 A | 7/1989 | Smith |
| 4,847,772 A | 7/1989 | Michalopoulos et al. |
| 4,855,161 A | 8/1989 | Moser et al. |
| 4,859,867 A | 8/1989 | Larson et al. |
| 4,862,594 A | 9/1989 | Schierbeek et al. |
| 4,871,917 A | 10/1989 | O'Farrell et al. |
| 4,872,051 A | 10/1989 | Dye |
| 4,882,565 A | 11/1989 | Gallmeyer |
| 4,883,349 A | 11/1989 | Mittelhäuser |
| 4,884,135 A | 11/1989 | Schiffman |
| 4,886,960 A | 12/1989 | Molyneux et al. |
| 4,892,345 A | 1/1990 | Rachael, III |
| 4,902,108 A | 2/1990 | Byker |
| 4,910,591 A | 3/1990 | Petrossian et al. |
| 4,916,374 A | 4/1990 | Schierbeek et al. |

| Patent Number | Date | Inventor |
|---|---|---|
| 4,926,170 A | 5/1990 | Beggs et al. |
| 4,930,742 A | 6/1990 | Schofield et al. |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,978,196 A | 12/1990 | Suzuki et al. |
| 4,987,357 A | 1/1991 | Masaki |
| 4,996,083 A | 2/1991 | Moser et al. |
| 5,001,558 A | 3/1991 | Burley et al. |
| 5,005,213 A | 4/1991 | Hanson et al. |
| 5,006,971 A | 4/1991 | Jenkins |
| 5,014,167 A | 5/1991 | Roberts |
| 5,016,996 A | 5/1991 | Ueno |
| 5,027,200 A | 6/1991 | Petrossian et al. |
| 5,037,182 A | 8/1991 | Groves et al. |
| 5,038,255 A | 8/1991 | Nishihashi et al. |
| 5,056,899 A | 10/1991 | Warszawski |
| 5,058,851 A | 10/1991 | Lawlor et al. |
| 5,066,108 A | 11/1991 | McDonald |
| 5,066,112 A | 11/1991 | Lynam et al. |
| 5,070,323 A | 12/1991 | Iino et al. |
| 5,073,012 A | 12/1991 | Lynam |
| 5,076,673 A | 12/1991 | Lynam et al. |
| 5,076,674 A | 12/1991 | Lynam |
| 5,096,287 A | 3/1992 | Kakinami et al. |
| 5,100,095 A | 3/1992 | Haan et al. |
| 5,101,139 A | 3/1992 | Lechter |
| 5,105,127 A | 4/1992 | Lavaud et al. |
| 5,115,346 A | 5/1992 | Lynam |
| 5,117,346 A | 5/1992 | Gard |
| 5,121,200 A | 6/1992 | Choi |
| 5,122,619 A | 6/1992 | Dlubak |
| 5,124,845 A | 6/1992 | Shimojo |
| 5,128,799 A | 7/1992 | Byker |
| 5,131,154 A | 7/1992 | Schierbeek et al. |
| 5,135,298 A | 8/1992 | Feltman |
| 5,136,483 A | 8/1992 | Schöniger et al. |
| 5,140,455 A | 8/1992 | Varaprasad et al. |
| 5,142,407 A | 8/1992 | Varaprasad et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,160,200 A | 11/1992 | Cheselske |
| 5,160,201 A | 11/1992 | Wrobel |
| 5,168,378 A | 12/1992 | Black et al. |
| 5,173,881 A | 12/1992 | Sindle |
| 5,178,448 A | 1/1993 | Adams et al. |
| 5,179,471 A | 1/1993 | Caskey et al. |
| 5,184,956 A | 2/1993 | Langlais et al. |
| 5,189,537 A | 2/1993 | O'Farrell |
| 5,193,029 A | 3/1993 | Schofield et al. |
| 5,197,562 A | 3/1993 | Kakinama et al. |
| 5,207,492 A | 5/1993 | Roberts |
| 5,210,967 A | 5/1993 | Brown |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinama et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,355,118 A | 10/1994 | Fukuhara |
| 5,355,284 A | 10/1994 | Roberts |
| 5,361,190 A | 11/1994 | Roberts et al. |
| 5,371,659 A | 12/1994 | Pastrick et al. |
| 5,373,482 A | 12/1994 | Gauthier |
| 5,386,285 A | 1/1995 | Asayama |
| 5,386,306 A | 1/1995 | Gunjima et al. |
| 5,406,395 A | 4/1995 | Wilson et al. |
| 5,406,414 A | 4/1995 | O'Farrell et al. |
| 5,408,357 A | 4/1995 | Beukema |
| 5,410,346 A | 4/1995 | Saneyoshi et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,430,431 A | 7/1995 | Nelson |
| 5,432,496 A | 7/1995 | Lin |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| 5,469,298 A | 11/1995 | Suman et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,510,983 A | 4/1996 | Iino |
| 5,515,448 A | 5/1996 | Nishitani |
| 5,519,621 A | 5/1996 | Worthman |
| 5,521,744 A | 5/1996 | Mazurek |
| 5,521,760 A | 5/1996 | DeYoung et al. |
| 5,523,811 A | 6/1996 | Wada et al. |
| 5,525,264 A | 6/1996 | Cronin et al. |
| 5,528,474 A | 6/1996 | Roney et al. |

| | | | | | | |
|---|---|---|---|---|---|---|
| 5,529,138 A | 6/1996 | Shaw et al. | | 5,741,966 A | 4/1998 | Handfield et al. |
| 5,530,240 A | 6/1996 | Larson et al. | | 5,745,050 A | 4/1998 | Nakagawa |
| 5,530,420 A | 6/1996 | Tsuchiya et al. | | 5,745,266 A | 4/1998 | Smith |
| 5,530,421 A | 6/1996 | Marshall et al. | | 5,748,287 A | 5/1998 | Takahashi et al. |
| 5,535,056 A | 7/1996 | Caskey et al. | | 5,751,211 A | 5/1998 | Shirai et al. |
| 5,535,144 A | 7/1996 | Kise | | 5,751,246 A | 5/1998 | Hertel |
| 5,539,397 A | 7/1996 | Asanuma et al. | | 5,751,390 A | 5/1998 | Crawford et al. |
| 5,541,590 A | 7/1996 | Nishio | | 5,751,489 A | 5/1998 | Caskey et al. |
| 5,550,677 A | 8/1996 | Schofield et al. | | 5,754,099 A | 5/1998 | Nishimura et al. |
| 5,561,333 A | 10/1996 | Darius | | 5,760,828 A | 6/1998 | Cortes |
| 5,566,244 A | 10/1996 | Kato et al. | | 5,760,931 A | 6/1998 | Saburi et al. |
| 5,567,360 A | 10/1996 | Varaprasad et al. | | 5,760,962 A | 6/1998 | Schofield et al. |
| 5,568,316 A | 10/1996 | Schrenck et al. | | 5,761,094 A | 6/1998 | Olson et al. |
| 5,570,127 A | 10/1996 | Schmidt | | 5,762,823 A | 6/1998 | Hikmet |
| 5,572,354 A | 11/1996 | Desmond et al. | | 5,764,139 A | 6/1998 | Nojima et al. |
| 5,574,443 A | 11/1996 | Hsieh | | 5,765,940 A | 6/1998 | Levy et al. |
| 5,576,687 A | 11/1996 | Blank et al. | | 5,767,793 A | 6/1998 | Agravante et al. |
| 5,576,854 A | 11/1996 | Schmidt et al. | | 5,775,762 A | 7/1998 | Vitito |
| 5,576,975 A | 11/1996 | Sasaki et al. | | 5,786,772 A | 7/1998 | Schofield et al. |
| 5,587,236 A | 12/1996 | Agrawal et al. | | 5,788,357 A | 8/1998 | Muth et al. |
| 5,587,699 A | 12/1996 | Faloon et al. | | 5,790,973 A | 8/1998 | Blaker et al. |
| 5,594,615 A | 1/1997 | Spijkerman et al. | | 5,793,308 A | 8/1998 | Rosinski et al. |
| 5,602,542 A | 2/1997 | Widmann et al. | | 5,793,420 A | 8/1998 | Schmidt |
| 5,602,670 A | 2/1997 | Keegan | | 5,796,094 A | 8/1998 | Schofield et al. |
| 5,608,550 A | 3/1997 | Epstein et al. | | 5,796,176 A | 8/1998 | Kramer et al. |
| 5,610,756 A | 3/1997 | Lynam et al. | | 5,798,057 A | 8/1998 | Hikmet |
| 5,611,966 A | 3/1997 | Varaprasad et al. | | 5,798,575 A | 8/1998 | O'Farrell et al. |
| 5,614,885 A | 3/1997 | Van Lente et al. | | 5,798,688 A | 8/1998 | Schofield |
| 5,615,023 A | 3/1997 | Yang | | 5,802,727 A | 9/1998 | Blank et al. |
| 5,615,857 A | 4/1997 | Hook | | 5,803,579 A | 9/1998 | Turnbull et al. |
| 5,617,085 A | 4/1997 | Tsutsumi et al. | | 5,805,367 A | 9/1998 | Kanazawa |
| 5,626,800 A | 5/1997 | Williams et al. | | 5,806,879 A | 9/1998 | Hamada et al. |
| 5,631,089 A | 5/1997 | Center, Jr. et al. | | 5,806,965 A | 9/1998 | Deese |
| 5,631,638 A | 5/1997 | Kaspar et al. | | 5,808,197 A | 9/1998 | Dao |
| 5,631,639 A | 5/1997 | Hibino et al. | | 5,808,566 A | 9/1998 | Behr et al. |
| 5,632,092 A | 5/1997 | Blank et al. | | 5,808,589 A | 9/1998 | Fergason |
| 5,632,551 A | 5/1997 | Roney et al. | | 5,808,713 A | 9/1998 | Broer et al. |
| 5,634,709 A | 6/1997 | Iwama | | 5,808,777 A | 9/1998 | Lynam et al. |
| 5,642,238 A | 6/1997 | Sala | | 5,808,778 A | 9/1998 | Bauer et al. |
| 5,644,851 A | 7/1997 | Blank et al. | | 5,812,321 A | 9/1998 | Schierbeek et al. |
| 5,646,614 A | 7/1997 | Abersfelder et al. | | 5,813,745 A | 9/1998 | Fant, Jr. et al. |
| 5,649,756 A | 7/1997 | Adams et al. | | 5,818,625 A | 10/1998 | Forgette et al. |
| 5,649,758 A | 7/1997 | Dion | | 5,820,097 A | 10/1998 | Spooner |
| 5,650,765 A | 7/1997 | Park | | 5,820,245 A | 10/1998 | Desmond et al. |
| 5,661,455 A | 8/1997 | Van Lente et al. | | 5,822,023 A | 10/1998 | Suman et al. |
| 5,662,375 A | 9/1997 | Adams et al. | | 5,823,654 A | 10/1998 | Pastrick et al. |
| 5,666,157 A | 9/1997 | Aviv | | 5,825,527 A | 10/1998 | Forgette et al. |
| 5,668,663 A | 9/1997 | Varaprasad et al. | | 5,837,994 A | 11/1998 | Stam et al. |
| 5,668,675 A | 9/1997 | Fredricks | | 5,844,505 A | 12/1998 | Van Ryzin |
| 5,669,698 A | 9/1997 | Veldman et al. | | 5,848,373 A | 12/1998 | DeLorme et al. |
| 5,669,699 A | 9/1997 | Pastrick et al. | | 5,850,176 A | 12/1998 | Kinoshita et al. |
| 5,669,704 A | 9/1997 | Pastrick | | 5,863,116 A | 1/1999 | Pastrick et al. |
| 5,669,705 A | 9/1997 | Pastrick et al. | | 5,867,801 A | 2/1999 | Denny |
| 5,670,935 A | 9/1997 | Schofield et al. | | 5,871,275 A | 2/1999 | O'Farrell et al. |
| 5,671,996 A | 9/1997 | Bos et al. | | 5,877,707 A | 3/1999 | Kowalick |
| 5,673,994 A | 10/1997 | Fant, Jr. et al. | | 5,877,897 A | 3/1999 | Schofield et al. |
| 5,673,999 A | 10/1997 | Koenck | | 5,878,353 A | 3/1999 | ul Azam et al. |
| 5,680,123 A | 10/1997 | Lee | | 5,878,370 A | 3/1999 | Olson |
| 5,680,245 A | 10/1997 | Lynam | | 5,879,074 A | 3/1999 | Pastrick |
| 5,680,263 A | 10/1997 | Zimmermann et al. | | 5,883,605 A | 3/1999 | Knapp |
| 5,686,975 A | 11/1997 | Lipton | | 5,883,739 A | 3/1999 | Ashihara et al. |
| 5,689,241 A | 11/1997 | Clark Sr. et al. | | 5,888,431 A | 3/1999 | Tonar et al. |
| 5,691,848 A | 11/1997 | Van Lente et al. | | 5,899,551 A | 5/1999 | Neijzen et al. |
| 5,692,819 A | 12/1997 | Mitsutake et al. | | 5,899,956 A | 5/1999 | Chan |
| 5,699,044 A | 12/1997 | Van Lente et al. | | 5,904,729 A | 5/1999 | Ruzicka |
| 5,708,410 A | 1/1998 | Blank et al. | | 5,910,854 A | 6/1999 | Varaprasad et al. |
| 5,708,415 A | 1/1998 | Van Lente et al. | | 5,914,815 A | 6/1999 | Bos |
| 5,708,857 A | 1/1998 | Ishibashi | | 5,917,664 A | 6/1999 | O'Neill et al. |
| 5,715,093 A | 2/1998 | Schierbeek et al. | | 5,918,180 A | 6/1999 | Dimino |
| 5,724,187 A | 3/1998 | Varaprasad et al. | | 5,923,027 A | 7/1999 | Stam et al. |
| 5,724,316 A | 3/1998 | Brunts | | 5,923,457 A | 7/1999 | Byker et al. |
| 5,729,194 A | 3/1998 | Spears et al. | | 5,924,212 A | 7/1999 | Domanski |
| 5,737,226 A | 4/1998 | Olson et al. | | 5,927,792 A | 7/1999 | Welling et al. |

| | | | | | | |
|---|---|---|---|---|---|---|
| 5,928,572 A | 7/1999 | Tonar et al. | | 6,111,498 A | 8/2000 | Jobes, I et al. |
| 5,929,786 A | 7/1999 | Schofield et al. | | 6,111,683 A | 8/2000 | Cammenga et al. |
| 5,938,321 A | 8/1999 | Bos et al. | | 6,111,684 A | 8/2000 | Forgette et al. |
| 5,938,721 A | 8/1999 | Dussell et al. | | 6,111,685 A | 8/2000 | Tench et al. |
| 5,940,011 A | 8/1999 | Agravante et al. | | 6,111,696 A | 8/2000 | Allen et al. |
| 5,940,120 A | 8/1999 | Frankhouse et al. | | 6,115,086 A | 9/2000 | Rosen |
| 5,940,201 A | 8/1999 | Ash et al. | | 6,115,651 A | 9/2000 | Cruz |
| 5,942,895 A | 8/1999 | Popovic et al. | | 6,116,743 A | 9/2000 | Hoek |
| 5,949,331 A | 9/1999 | Schofield et al. | | 6,122,597 A | 9/2000 | Saneyoshi et al. |
| 5,956,079 A | 9/1999 | Ridgley | | 6,122,921 A | 9/2000 | Brezoczky et al. |
| 5,956,181 A | 9/1999 | Lin | | 6,124,647 A | 9/2000 | Marcus et al. |
| 5,959,367 A | 9/1999 | O'Farrell et al. | | 6,124,886 A | 9/2000 | DeLine et al. |
| 5,959,555 A | 9/1999 | Furuta | | 6,127,919 A | 10/2000 | Wylin |
| 5,959,577 A | 9/1999 | Fan et al. | | 6,127,945 A | 10/2000 | Mura-Smith |
| 5,963,247 A | 10/1999 | Banitt | | 6,128,576 A | 10/2000 | Nishimoto et al. |
| 5,965,247 A | 10/1999 | Jonza et al. | | 6,130,421 A | 10/2000 | Bechtel et al. |
| 5,971,552 A | 10/1999 | O'Farrell et al. | | 6,130,448 A | 10/2000 | Bauer et al. |
| 5,973,760 A | 10/1999 | Dehmlow | | 6,132,072 A | 10/2000 | Turnbull et al. |
| 5,975,715 A | 11/1999 | Bauder | | 6,139,171 A | 10/2000 | Waldmann |
| 5,984,482 A | 11/1999 | Rumsey et al. | | 6,139,172 A | 10/2000 | Bos et al. |
| 5,986,730 A | 11/1999 | Hansen et al. | | 6,140,933 A | 10/2000 | Bugno et al. |
| 5,987,381 A | 11/1999 | Oshizawa | | 6,146,003 A | 11/2000 | Thau |
| 5,990,469 A | 11/1999 | Bechtel et al. | | 6,148,261 A | 11/2000 | Obradovich et al. |
| 5,990,625 A | 11/1999 | Meissner et al. | | 6,149,287 A | 11/2000 | Pastrick et al. |
| 5,998,617 A | 12/1999 | Srinivasa et al. | | 6,150,014 A | 11/2000 | Chu et al. |
| 5,998,929 A | 12/1999 | Bechtel et al. | | 6,151,065 A | 11/2000 | Steed et al. |
| 6,000,823 A | 12/1999 | Desmond et al. | | 6,151,539 A | 11/2000 | Bergholz et al. |
| 6,001,486 A | 12/1999 | Varaprasad et al. | | 6,152,551 A | 11/2000 | Annas |
| 6,002,511 A | 12/1999 | Varaprasad et al. | | 6,152,590 A | 11/2000 | Fürst et al. |
| 6,002,544 A | 12/1999 | Yatsu | | 6,154,149 A | 11/2000 | Tyckowski et al. |
| 6,005,724 A | 12/1999 | Todd | | 6,154,306 A | 11/2000 | Varaprasad et al. |
| 6,007,222 A | 12/1999 | Thau | | 6,157,294 A | 12/2000 | Urai et al. |
| 6,008,486 A | 12/1999 | Stam et al. | | 6,157,418 A | 12/2000 | Rosen |
| 6,008,871 A | 12/1999 | Okumura | | 6,158,655 A | 12/2000 | DeVries, Jr. et al. |
| 6,009,359 A | 12/1999 | El-Hakim et al. | | 6,161,865 A | 12/2000 | Rose et al. |
| 6,016,035 A | 1/2000 | Eberspächer et al. | | 6,166,625 A | 12/2000 | Teowee et al. |
| 6,016,215 A | 1/2000 | Byker | | 6,166,629 A | 12/2000 | Hamma et al. |
| 6,019,411 A | 2/2000 | Carter et al. | | 6,166,847 A | 12/2000 | Tench et al. |
| 6,019,475 A | 2/2000 | Lynam et al. | | 6,166,848 A | 12/2000 | Cammenga et al. |
| 6,021,371 A | 2/2000 | Fultz | | 6,167,755 B1 | 1/2001 | Damson et al. |
| 6,023,229 A | 2/2000 | Bugno et al. | | 6,169,955 B1 | 1/2001 | Fultz |
| 6,025,872 A | 2/2000 | Ozaki et al. | | 6,170,956 B1 | 1/2001 | Rumsey et al. |
| 6,037,689 A | 3/2000 | Bingle et al. | | 6,172,600 B1 | 1/2001 | Kakinama et al. |
| 6,042,253 A | 3/2000 | Fant, Jr. et al. | | 6,172,601 B1 | 1/2001 | Wada et al. |
| 6,045,243 A | 4/2000 | Muth et al. | | 6,172,613 B1 | 1/2001 | DeLine et al. |
| 6,045,643 A | 4/2000 | Byker et al. | | 6,173,501 B1 | 1/2001 | Blank et al. |
| 6,046,766 A | 4/2000 | Sakata | | 6,173,508 B1 | 1/2001 | Strohmeyer, Jr. |
| 6,046,837 A | 4/2000 | Yamamoto | | 6,175,164 B1 | 1/2001 | O'Farrell et al. |
| 6,049,171 A | 4/2000 | Stam et al. | | 6,175,300 B1 | 1/2001 | Kendrick |
| 6,060,989 A | 5/2000 | Gehlot | | 6,176,602 B1 | 1/2001 | Pastrick et al. |
| 6,061,002 A | 5/2000 | Weber et al. | | 6,178,034 B1 | 1/2001 | Allemand et al. |
| 6,064,508 A | 5/2000 | Forgette et al. | | 6,178,377 B1 | 1/2001 | Ishihara et al. |
| 6,065,840 A | 5/2000 | Caskey et al. | | 6,181,387 B1 | 1/2001 | Rosen |
| 6,067,111 A | 5/2000 | Hahn et al. | | 6,182,006 B1 | 1/2001 | Meek |
| 6,067,500 A | 5/2000 | Morimoto et al. | | 6,183,119 B1 | 2/2001 | Desmond et al. |
| 6,072,391 A | 6/2000 | Suzukie et al. | | 6,184,679 B1 | 2/2001 | Popovic et al. |
| 6,074,777 A | 6/2000 | Reimers et al. | | 6,184,781 B1 | 2/2001 | Ramakesavan |
| 6,078,355 A | 6/2000 | Zengel | | 6,185,492 B1 | 2/2001 | Kagawa et al. |
| 6,078,865 A | 6/2000 | Koyanagi | | 6,185,501 B1 | 2/2001 | Smith et al. |
| 6,082,881 A | 7/2000 | Hicks | | 6,188,505 B1 | 2/2001 | Lomprey et al. |
| 6,084,700 A | 7/2000 | Knapp et al. | | 6,191,704 B1 | 2/2001 | Takenaga et al. |
| 6,086,131 A | 7/2000 | Bingle et al. | | 6,196,688 B1 | 3/2001 | Caskey et al. |
| 6,086,229 A | 7/2000 | Pastrick | | 6,198,409 B1 | 3/2001 | Schofield et al. |
| 6,087,012 A | 7/2000 | Varaprasad et al. | | 6,199,014 B1 | 3/2001 | Walker et al. |
| 6,087,953 A | 7/2000 | DeLine et al. | | 6,199,810 B1 | 3/2001 | Wu et al. |
| 6,094,618 A | 7/2000 | Harada | | 6,200,010 B1 | 3/2001 | Anders |
| 6,097,023 A | 8/2000 | Schofield et al. | | 6,201,642 B1 | 3/2001 | Bos |
| 6,097,316 A | 8/2000 | Liaw et al. | | 6,210,008 B1 | 4/2001 | Hoekstra et al. |
| 6,099,131 A | 8/2000 | Fletcher et al. | | 6,210,012 B1 | 4/2001 | Broer |
| 6,099,155 A | 8/2000 | Pastrick et al. | | 6,212,470 B1 | 4/2001 | Seymour et al. |
| 6,102,559 A | 8/2000 | Nold et al. | | 6,217,181 B1 | 4/2001 | Lynam et al. |
| 6,104,552 A | 8/2000 | Thau et al. | | 6,218,934 B1 | 4/2001 | Regan |
| 6,106,121 A | 8/2000 | Buckley et al. | | 6,222,447 B1 | 4/2001 | Schofield et al. |

| | | |
|---|---|---|
| 6,222,460 B1 | 4/2001 | DeLine et al. |
| 6,227,689 B1 | 5/2001 | Miller |
| 6,232,937 B1 | 5/2001 | Jacobsen et al. |
| 6,239,851 B1 | 5/2001 | Hatazawa et al. |
| 6,239,898 B1 | 5/2001 | Byker et al. |
| 6,243,003 B1 | 6/2001 | DeLine et al. |
| 6,245,262 B1 | 6/2001 | Varaprasad et al. |
| 6,247,820 B1 | 6/2001 | Van Order |
| 6,249,214 B1 | 6/2001 | Kashiwazaki |
| 6,250,148 B1 | 6/2001 | Lynam |
| 6,250,766 B1 | 6/2001 | Strumolo et al. |
| 6,250,783 B1 | 6/2001 | Stidham et al. |
| 6,255,639 B1 | 7/2001 | Stam et al. |
| 6,257,746 B1 | 7/2001 | Todd et al. |
| 6,259,412 B1 | 7/2001 | Duroux |
| 6,259,475 B1 | 7/2001 | Ramachandran et al. |
| 6,265,968 B1 | 7/2001 | Betzitza et al. |
| 6,268,803 B1 | 7/2001 | Gunderson et al. |
| 6,269,308 B1 | 7/2001 | Kodaka et al. |
| 6,274,221 B2 | 8/2001 | Smith et al. |
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Regan et al. |
| 6,304,173 B2 | 10/2001 | Pala et al. |
| 6,305,807 B1 * | 10/2001 | Schierbeek ................ 359/603 |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,317,057 B1 | 11/2001 | Lee |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Fürst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,548 B1 | 3/2002 | Bingle et al. |
| 6,363,326 B1 | 3/2002 | Scully |
| 6,366,213 B2 | 4/2002 | DeLine et al. |
| 6,370,329 B1 | 4/2002 | Teuchert |
| 6,371,636 B1 | 4/2002 | Wesson |
| 6,386,742 B1 | 5/2002 | DeLine et al. |
| 6,390,529 B1 | 5/2002 | Bingle et al. |
| 6,390,635 B2 | 5/2002 | Whitehead et al. |
| 6,396,397 B1 | 5/2002 | Bos et al. |
| 6,396,637 B2 | 5/2002 | Roest et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,426,492 B1 | 7/2002 | Bos et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,445,287 B1 | 9/2002 | Schofield et al. |
| 6,447,128 B1 | 9/2002 | Lang et al. |
| 6,452,533 B1 | 9/2002 | Yamabuchi et al. |
| 6,463,369 B2 | 10/2002 | Sadano et al. |
| 6,466,701 B1 | 10/2002 | Ejiri et al. |
| 6,472,977 B1 | 10/2002 | Pöchmüller |
| 6,473,001 B1 | 10/2002 | Blum |
| 6,474,853 B2 | 11/2002 | Pastrick et al. |
| 6,476,731 B1 | 11/2002 | Miki et al. |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,512,624 B2 | 1/2003 | Tonar et al. |
| 6,513,252 B1 | 2/2003 | Schierbeek et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,520,667 B1 | 2/2003 | Mousseau |
| 6,522,451 B1 | 2/2003 | Lynam |
| 6,522,969 B2 | 2/2003 | Kannonji |
| 6,534,884 B2 | 3/2003 | Marcus et al. |
| 6,539,306 B2 | 3/2003 | Turnbull |
| 6,542,085 B1 | 4/2003 | Yang |
| 6,542,182 B1 | 4/2003 | Chautorash |
| 6,543,163 B1 | 4/2003 | Ginsberg |
| 6,545,598 B1 | 4/2003 | de Villeroche |
| 6,549,253 B1 | 4/2003 | Robbie et al. |
| 6,549,335 B1 | 4/2003 | Trapani et al. |
| 6,550,949 B1 | 4/2003 | Bauer et al. |
| 6,553,308 B1 | 4/2003 | Uhlmann et al. |
| 6,560,027 B2 | 5/2003 | Meine |
| 6,567,708 B1 | 5/2003 | Bechtel et al. |
| 6,568,839 B1 | 5/2003 | Pastrick et al. |

| | | | | | | |
|---|---|---|---|---|---|---|
| 6,572,233 B1 | 6/2003 | Northman et al. | | 6,774,356 B2 | 8/2004 | Heslin et al. |
| 6,575,643 B2 | 6/2003 | Takashashi | | 6,774,810 B2 | 8/2004 | DeLine et al. |
| 6,580,373 B1 | 6/2003 | Ohashi | | 6,778,904 B2 | 8/2004 | Iwami et al. |
| 6,581,007 B2 | 6/2003 | Hasegawa et al. | | 6,784,129 B2 | 8/2004 | Seto et al. |
| 6,583,730 B2 | 6/2003 | Lang et al. | | 6,797,396 B1 | 9/2004 | Liu et al. |
| 6,591,192 B2 | 7/2003 | Okamura et al. | | 6,800,871 B2 | 10/2004 | Matsuda et al. |
| 6,592,230 B2 | 7/2003 | Dupay | | 6,801,283 B2 | 10/2004 | Koyama et al. |
| 6,593,565 B2 | 7/2003 | Heslin et al. | | 6,806,452 B2 | 10/2004 | Bos et al. |
| 6,593,984 B2 | 7/2003 | Arakawa et al. | | 6,810,323 B1 | 10/2004 | Bullock et al. |
| 6,594,065 B2 | 7/2003 | Byker et al. | | 6,824,281 B2 | 11/2004 | Schofield et al. |
| 6,594,067 B2 | 7/2003 | Poll et al. | | 6,832,848 B2 | 12/2004 | Pastrick |
| 6,594,090 B2 | 7/2003 | Kruschwitz et al. | | 6,836,725 B2 | 12/2004 | Millington et al. |
| 6,594,583 B2 | 7/2003 | Ogura et al. | | 6,842,276 B2 | 1/2005 | Poll et al. |
| 6,594,614 B2 | 7/2003 | Studt et al. | | 6,846,098 B2 | 1/2005 | Bourdelais et al. |
| 6,597,489 B1 | 7/2003 | Guarr et al. | | 6,847,487 B2 | 1/2005 | Burgner |
| 6,611,202 B2 | 8/2003 | Schofield et al. | | 6,848,817 B2 | 2/2005 | Bos et al. |
| 6,611,227 B1 | 8/2003 | Nebiyeloul-Kifle et al. | | 6,853,491 B1 | 2/2005 | Ruhle et al. |
| 6,611,759 B2 | 8/2003 | Brosche | | 6,870,655 B1 | 3/2005 | Northman et al. |
| 6,614,387 B1 | 9/2003 | Deadman | | 6,870,656 B2 | 3/2005 | Tonar et al. |
| 6,616,313 B2 | 9/2003 | Fürst et al. | | 6,871,982 B2 | 3/2005 | Holman et al. |
| 6,616,764 B2 | 9/2003 | Krämer et al. | | 6,877,888 B2 | 4/2005 | DeLine et al. |
| 6,618,672 B2 | 9/2003 | Sasaki et al. | | 6,882,287 B2 | 4/2005 | Schofield |
| 6,624,936 B2 | 9/2003 | Kotchick et al. | | 6,891,563 B2 | 5/2005 | Schofield et al. |
| 6,627,918 B2 | 9/2003 | Getz et al. | | 6,902,284 B2 | 6/2005 | Hutzel et al. |
| 6,630,888 B2 | 10/2003 | Lang et al. | | 6,906,632 B2 | 6/2005 | DeLine et al. |
| 6,636,258 B2 | 10/2003 | Strumolo | | 6,910,779 B2 | 6/2005 | Abel et al. |
| 6,638,528 B1 | 10/2003 | Kanios | | 6,912,396 B2 | 6/2005 | Sziraki et al. |
| 6,638,582 B1 | 10/2003 | Uchiyama et al. | | 6,916,099 B2 | 7/2005 | Su et al. |
| 6,642,840 B2 | 11/2003 | Lang et al. | | 6,922,902 B2 | 8/2005 | Schierbeek et al. |
| 6,642,851 B2 | 11/2003 | Deline et al. | | 6,928,180 B2 | 8/2005 | Stam et al. |
| 6,648,477 B2 | 11/2003 | Hutzel et al. | | 6,928,366 B2 | 8/2005 | Ockerse et al. |
| 6,661,830 B1 | 12/2003 | Reed et al. | | 6,930,737 B2 | 8/2005 | Weindorf et al. |
| 6,665,592 B2 | 12/2003 | Kodama | | 6,934,067 B2 | 8/2005 | Ash et al. |
| 6,670,207 B1 | 12/2003 | Roberts | | 6,946,978 B2 | 9/2005 | Schofield |
| 6,670,910 B2 | 12/2003 | Delcheccolo et al. | | 6,947,576 B2 | 9/2005 | Stam et al. |
| 6,671,080 B2 | 12/2003 | Poll et al. | | 6,947,577 B2 | 9/2005 | Stam et al. |
| 6,672,731 B2 | 1/2004 | Schnell et al. | | 6,951,410 B2 | 10/2005 | Parsons |
| 6,672,734 B2 | 1/2004 | Lammers | | 6,951,681 B2 | 10/2005 | Hartley et al. |
| 6,672,744 B2 | 1/2004 | DeLine et al. | | 6,952,312 B2 | 10/2005 | Weber et al. |
| 6,672,745 B1 | 1/2004 | Bauer et al. | | 6,958,495 B2 | 10/2005 | Nishijima et al. |
| 6,674,370 B2 | 1/2004 | Rodewald et al. | | 6,958,683 B2 | 10/2005 | Mills et al. |
| 6,675,075 B1 | 1/2004 | Engelsberg et al. | | 6,968,273 B2 | 11/2005 | Ockerse et al. |
| 6,678,083 B1 | 1/2004 | Anstee | | 6,972,888 B2 | 12/2005 | Poll et al. |
| 6,678,614 B2 | 1/2004 | McCarthy et al. | | 6,974,236 B2 | 12/2005 | Tenmyo |
| 6,683,539 B2 | 1/2004 | Trajkovic et al. | | 6,975,215 B2 | 12/2005 | Schofield et al. |
| 6,683,969 B1 | 1/2004 | Nishigaki et al. | | 6,977,702 B2 | 12/2005 | Wu |
| 6,685,348 B2 | 2/2004 | Pastrick et al. | | 6,980,092 B2 | 12/2005 | Turnbull et al. |
| 6,690,268 B2 | 2/2004 | Schofield et al. | | 6,985,291 B2 | 1/2006 | Watson et al. |
| 6,690,413 B1 | 2/2004 | Moore | | 6,992,718 B1 | 1/2006 | Takahara |
| 6,693,517 B2 | 2/2004 | McCarthy et al. | | 7,001,058 B2 | 2/2006 | Inditsky |
| 6,693,518 B2 | 2/2004 | Kumata et al. | | 7,004,592 B2 | 2/2006 | Varaprasad et al. |
| 6,693,519 B2 | 2/2004 | Keirstead | | 7,004,593 B2 | 2/2006 | Weller et al. |
| 6,693,524 B1 | 2/2004 | Payne | | 7,006,173 B1 | 2/2006 | Hiyama et al. |
| 6,700,692 B2 | 3/2004 | Tonar et al. | | 7,009,751 B2 | 3/2006 | Tonar et al. |
| 6,709,136 B2 | 3/2004 | Pastrick et al. | | 7,012,543 B2 | 3/2006 | DeLine et al. |
| 6,713,783 B1 | 3/2004 | Mase et al. | | 7,041,965 B2 | 5/2006 | Heslin et al. |
| 6,717,610 B1 | 4/2004 | Bos et al. | | 7,042,616 B2 | 5/2006 | Tonar et al. |
| 6,717,712 B2 | 4/2004 | Lynam et al. | | 7,046,418 B2 | 5/2006 | Lin et al. |
| 6,726,337 B2 | 4/2004 | Whitehead et al. | | 7,046,448 B2 | 5/2006 | Burgner |
| 6,727,808 B1 | 4/2004 | Uselmann et al. | | 7,057,681 B2 | 6/2006 | Hinata et al. |
| 6,727,844 B1 | 4/2004 | Zimmermann et al. | | 7,092,052 B2 | 8/2006 | Okamoto et al. |
| 6,731,332 B1 | 5/2004 | Yasui et al. | | 7,106,213 B2 | 9/2006 | White |
| 6,734,807 B2 | 5/2004 | King | | 7,108,409 B2 | 9/2006 | DeLine et al. |
| 6,736,526 B2 | 5/2004 | Matsuba et al. | | 7,121,028 B2 | 10/2006 | Shoen et al. |
| 6,737,964 B2 | 5/2004 | Samman et al. | | 7,125,131 B2 | 10/2006 | Olczak |
| 6,738,088 B1 | 5/2004 | Uskolovsky et al. | | 7,130,727 B2 | 10/2006 | Liu et al. |
| 6,744,353 B2 | 6/2004 | Sjönell | | 7,132,064 B2 | 11/2006 | Li et al. |
| 6,748,211 B1 | 6/2004 | Isaac et al. | | 7,136,091 B2 | 11/2006 | Ichikawa et al. |
| 6,756,912 B2 | 6/2004 | Skiver et al. | | 7,149,613 B2 | 12/2006 | Stam et al. |
| 6,757,109 B2 | 6/2004 | Bos | | 7,151,515 B2 | 12/2006 | Kim et al. |
| 6,759,113 B1 | 7/2004 | Tang | | 7,151,997 B2 | 12/2006 | Uhlmann et al. |
| 6,759,945 B2 | 7/2004 | Richard | | 7,154,657 B2 | 12/2006 | Poll et al. |
| 6,760,157 B1 | 7/2004 | Allen et al. | | 7,158,881 B2 | 1/2007 | McCarthy et al. |

| Patent Number | Date | Inventor |
|---|---|---|
| 7,160,017 B2 | 1/2007 | Lee et al. |
| 7,167,796 B2 | 1/2007 | Taylor et al. |
| 7,175,291 B1 | 2/2007 | Li |
| 7,176,790 B2 | 2/2007 | Yamazaki |
| 7,184,190 B2 | 2/2007 | McCabe et al. |
| 7,188,963 B2 | 3/2007 | Schofield et al. |
| 7,193,764 B2 | 3/2007 | Lin et al. |
| 7,195,381 B2 | 3/2007 | Lynam et al. |
| 7,199,767 B2 | 4/2007 | Spero |
| 7,209,277 B2 | 4/2007 | Tonar et al. |
| 7,215,473 B2 | 5/2007 | Fleming |
| 7,233,304 B1 | 6/2007 | Aratani et al. |
| 7,241,037 B2 | 7/2007 | Mathieu et al. |
| 7,245,336 B2 | 7/2007 | Hiyama et al. |
| 7,248,305 B2 | 7/2007 | Ootsuta et al. |
| 7,251,079 B2 | 7/2007 | Capaldo et al. |
| 7,255,451 B2 | 8/2007 | McCabe et al. |
| 7,255,465 B2 | 8/2007 | DeLine et al. |
| 7,262,406 B2 | 8/2007 | Heslin et al. |
| 7,262,916 B2 | 8/2007 | Kao et al. |
| 7,265,342 B2 | 9/2007 | Heslin et al. |
| 7,268,841 B2 | 9/2007 | Kasajima et al. |
| 7,269,327 B2 | 9/2007 | Tang |
| 7,269,328 B2 | 9/2007 | Tang |
| 7,274,501 B2 | 9/2007 | McCabe et al. |
| 7,286,280 B2 | 10/2007 | Whitehead et al. |
| 7,290,919 B2 | 11/2007 | Pan et al. |
| 7,292,208 B1 | 11/2007 | Park et al. |
| 7,310,177 B2 | 12/2007 | McCabe et al. |
| 7,311,428 B2 | 12/2007 | DeLine et al. |
| 7,323,819 B2 | 1/2008 | Hong et al. |
| 7,324,261 B2 | 1/2008 | Tonar et al. |
| 7,328,103 B2 | 2/2008 | McCarthy et al. |
| 7,329,013 B2 | 2/2008 | Blank et al. |
| 7,338,177 B2 | 3/2008 | Lynam |
| 7,344,284 B2 | 3/2008 | Lynam et al. |
| 7,349,143 B2 | 3/2008 | Tonar et al. |
| 7,362,505 B2 | 4/2008 | Hikmet et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |
| 7,379,243 B2 | 5/2008 | Horsten et al. |
| 7,389,171 B2 | 6/2008 | Rupp |
| 7,396,147 B2 | 7/2008 | Munro |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,446,462 B2 | 11/2008 | Lim et al. |
| 7,446,650 B2 | 11/2008 | Scholfield et al. |
| 7,448,776 B2 | 11/2008 | Tang |
| 7,452,090 B2 | 11/2008 | Weller et al. |
| 7,455,412 B2 | 11/2008 | Rottcher |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,490,007 B2 | 2/2009 | Taylor et al. |
| 7,490,943 B2 | 2/2009 | Kikuchi et al. |
| 7,490,944 B2 | 2/2009 | Blank et al. |
| 7,494,231 B2 | 2/2009 | Varaprasad et al. |
| 7,496,439 B2 | 2/2009 | McCormick |
| 7,502,156 B2 | 3/2009 | Tonar et al. |
| 7,505,188 B2 | 3/2009 | Niiyama et al. |
| 7,511,607 B2 | 3/2009 | Hubbard et al. |
| 7,511,872 B2 | 3/2009 | Tonar et al. |
| 7,526,103 B2 | 4/2009 | Schofield et al. |
| 7,538,316 B2 | 5/2009 | Heslin et al. |
| 7,540,620 B2 | 6/2009 | Weller et al. |
| 7,547,467 B2 | 6/2009 | Olson et al. |
| 7,551,354 B2 | 6/2009 | Horsten et al. |
| 7,567,291 B2 | 7/2009 | Bechtel et al. |
| 7,571,042 B2 | 8/2009 | Taylor et al. |
| 7,572,490 B2 | 8/2009 | Park et al. |
| 7,580,795 B2 | 8/2009 | McCarthy et al. |
| 7,581,867 B2 | 9/2009 | Lee et al. |
| 7,586,566 B2 | 9/2009 | Nelson et al. |
| 7,586,666 B2 | 9/2009 | McCabe et al. |
| 7,589,893 B2 | 9/2009 | Rottcher |
| 7,619,508 B2 | 11/2009 | Lynam et al. |
| 7,623,202 B2 | 11/2009 | Araki et al. |
| 7,626,749 B2 | 12/2009 | Baur et al. |
| 7,633,567 B2 | 12/2009 | Yamada et al. |
| 7,636,195 B2 | 12/2009 | Nieuwkerk et al. |
| 7,636,930 B2 | 12/2009 | Chang |
| 7,643,927 B2 | 1/2010 | Hils |
| 7,658,521 B2 | 2/2010 | DeLine et al. |
| 7,667,579 B2 | 2/2010 | DeLine et al. |
| 7,695,174 B2 | 4/2010 | Takayanagi et al. |
| 2001/0013825 A1 * | 8/2001 | DeLine et al. ........... 340/425.5 |
| 2001/0019356 A1 | 9/2001 | Takeda et al. |
| 2001/0022616 A1 | 9/2001 | Rademacher et al. |
| 2001/0026215 A1 | 10/2001 | Nakaho et al. |
| 2001/0026316 A1 | 10/2001 | Senatore |
| 2001/0030857 A1 | 10/2001 | Futhey et al. |
| 2001/0045981 A1 | 11/2001 | Gloger et al. |
| 2001/0055165 A1 | 12/2001 | McCarthy et al. |
| 2002/0003571 A1 | 1/2002 | Schofield et al. |
| 2002/0044065 A1 | 4/2002 | Quist et al. |
| 2002/0049535 A1 | 4/2002 | Rigo et al. |
| 2002/0070872 A1 | 6/2002 | Deline et al. |
| 2002/0072026 A1 | 6/2002 | Lynam et al. |
| 2002/0085155 A1 | 7/2002 | Arikawa |
| 2002/0093826 A1 | 7/2002 | Bos et al. |
| 2002/0113203 A1 | 8/2002 | Heslin et al. |
| 2002/0126497 A1 | 9/2002 | Pastrick |
| 2002/0154007 A1 | 10/2002 | Yang |
| 2002/0159270 A1 | 10/2002 | Lynam et al. |
| 2002/0172053 A1 | 11/2002 | Pastrick et al. |
| 2002/0191409 A1 | 12/2002 | DeLine et al. |
| 2002/0196639 A1 | 12/2002 | Weidel |
| 2003/0002165 A1 | 1/2003 | Mathias et al. |
| 2003/0002179 A1 | 1/2003 | Roberts et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0016542 A1 | 1/2003 | Pastrick et al. |
| 2003/0020603 A1 | 1/2003 | DeLine et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa et al. |
| 2003/0043269 A1 | 3/2003 | Park |
| 2003/0048639 A1 | 3/2003 | Boyd et al. |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0069690 A1 | 4/2003 | Correia et al. |
| 2003/0076415 A1 | 4/2003 | Strumbolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0095331 A1 | 5/2003 | Bengoechea et al. |
| 2003/0098908 A1 | 5/2003 | Misaiji et al. |
| 2003/0103141 A1 | 6/2003 | Bechtel et al. |
| 2003/0103143 A1 | 6/2003 | Hitomi et al. |
| 2003/0117522 A1 | 6/2003 | Okada |

| | | |
|---|---|---|
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0147244 A1 | 8/2003 | Tenmyo |
| 2003/0169158 A1 | 9/2003 | Paul, Jr. |
| 2003/0169522 A1 | 9/2003 | Schofield et al. |
| 2003/0179293 A1 | 9/2003 | Oizumi |
| 2003/0189754 A1 | 10/2003 | Sugino et al. |
| 2003/0202096 A1 | 10/2003 | Kim |
| 2003/0210369 A1 | 11/2003 | Wu |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0032675 A1 | 2/2004 | Weller et al. |
| 2004/0036768 A1 | 2/2004 | Green |
| 2004/0046870 A1 | 3/2004 | Leigh Travis |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0077359 A1 | 4/2004 | Bernas et al. |
| 2004/0080404 A1 | 4/2004 | White |
| 2004/0080431 A1 | 4/2004 | White |
| 2004/0085196 A1 | 5/2004 | Miller et al. |
| 2004/0085499 A1 | 5/2004 | Baek |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0105614 A1 | 6/2004 | Kobayashi et al. |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0128065 A1 | 7/2004 | Taylor et al. |
| 2004/0145457 A1 | 7/2004 | Schofield et al. |
| 2004/0170008 A1 | 9/2004 | Tenmyo |
| 2004/0202001 A1 | 10/2004 | Roberts et al. |
| 2004/0243303 A1 | 12/2004 | Padmanabhan |
| 2004/0251804 A1 | 12/2004 | McCullough et al. |
| 2005/0024591 A1 | 2/2005 | Lian et al. |
| 2005/0024729 A1 | 2/2005 | Ockerse et al. |
| 2005/0078347 A1 | 4/2005 | Lin et al. |
| 2005/0078389 A1 | 4/2005 | Kulas et al. |
| 2005/0079326 A1 | 4/2005 | Varaprasad et al. |
| 2005/0083577 A1 | 4/2005 | Varaprasad et al. |
| 2005/0099559 A1 | 5/2005 | Lee et al. |
| 2005/0111070 A1 | 5/2005 | Lin et al. |
| 2005/0140855 A1 | 6/2005 | Utsumi et al. |
| 2005/0168995 A1 | 8/2005 | Kittelmann et al. |
| 2005/0169003 A1 | 8/2005 | Lindahl et al. |
| 2005/0172504 A1 | 8/2005 | Ohm et al. |
| 2005/0185278 A1 | 8/2005 | Horsten et al. |
| 2005/0187675 A1 | 8/2005 | Schofield et al. |
| 2005/0237440 A1 | 10/2005 | Sugimura et al. |
| 2005/0270766 A1 | 12/2005 | Kung et al. |
| 2005/0270798 A1 | 12/2005 | Lee et al. |
| 2006/0007550 A1 | 1/2006 | Tonar et al. |
| 2006/0028730 A1 | 2/2006 | Varaprasad et al. |
| 2006/0038668 A1 | 2/2006 | DeWard et al. |
| 2006/0050018 A1 | 3/2006 | Hutzel et al. |
| 2006/0061008 A1 | 3/2006 | Karner et al. |
| 2006/0139953 A1 | 6/2006 | Chou et al. |
| 2006/0164230 A1 | 7/2006 | DeWind et al. |
| 2006/0164725 A1 | 7/2006 | Horsten et al. |
| 2006/0202111 A1 | 9/2006 | Heslin et al. |
| 2006/0255960 A1 | 11/2006 | Uken et al. |
| 2006/0274218 A1 | 12/2006 | Xue |
| 2007/0041096 A1 | 2/2007 | Nieuwkerk et al. |
| 2007/0058257 A1 | 3/2007 | Lynam |
| 2007/0080585 A1 | 4/2007 | Lyu |
| 2007/0118287 A1 | 5/2007 | Taylor et al. |
| 2007/0120043 A1 | 5/2007 | Heslin et al. |
| 2007/0132567 A1 | 6/2007 | Schofield et al. |
| 2007/0162229 A1 | 7/2007 | McCarthy et al. |
| 2007/0171037 A1 | 7/2007 | Schofield et al. |
| 2007/0183066 A1 | 8/2007 | Varaprasad et al. |
| 2007/0184284 A1 | 8/2007 | Varaprasad et al. |
| 2008/0002106 A1 | 1/2008 | Van De Witte et al. |
| 2008/0013153 A1 | 1/2008 | McCabe et al. |
| 2008/0068520 A1 | 3/2008 | Minikey, Jr. et al. |
| 2008/0094684 A1 | 4/2008 | Varaprasad et al. |
| 2008/0094685 A1 | 4/2008 | Varaprasad et al. |
| 2008/0180529 A1 | 7/2008 | Taylor et al. |
| 2008/0180781 A1 | 7/2008 | Varaprasad et al. |
| 2008/0183355 A1 | 7/2008 | Taylor et al. |
| 2008/0201075 A1 | 8/2008 | Taylor et al. |
| 2008/0212189 A1 | 9/2008 | Baur et al. |
| 2008/0212215 A1 | 9/2008 | Schofield et al. |
| 2008/0225538 A1 | 9/2008 | Lynam et al. |
| 2008/0266389 A1 | 10/2008 | DeWind et al. |
| 2008/0291522 A1 | 11/2008 | Varaprasad et al. |
| 2008/0308219 A1 | 12/2008 | Lynam |
| 2009/0015736 A1 | 1/2009 | Weller et al. |
| 2009/0033837 A1 | 2/2009 | Molsen et al. |
| 2009/0040465 A1 | 2/2009 | Conner et al. |
| 2009/0040588 A1 | 2/2009 | Tonar et al. |
| 2009/0040778 A1 | 2/2009 | Takayanagi et al. |
| 2009/0052003 A1 | 2/2009 | Schofield et al. |
| 2009/0080055 A1 | 3/2009 | Baur et al. |
| 2009/0141331 A1 | 6/2009 | Skiver et al. |
| 2009/0174776 A1 | 7/2009 | Taylor et al. |
| 2009/0201137 A1 | 8/2009 | Weller et al. |
| 2009/0219394 A1 | 9/2009 | Heslin et al. |
| 2009/0231741 A1 | 9/2009 | Weller et al. |
| 2009/0243824 A1 | 10/2009 | Peterson et al. |
| 2009/0262422 A1 | 10/2009 | Cross et al. |
| 2010/0085645 A1 | 4/2010 | Skiver et al. |
| 2010/0091509 A1 | 4/2010 | DeLine et al. |

FOREIGN PATENT DOCUMENTS

| | | |
|---|---|---|
| DE | 941408 | 4/1956 |
| DE | 944531 | 7/1956 |
| DE | 7323996 | 11/1973 |
| DE | 2631713 A1 | 2/1977 |
| DE | 3248511 A1 | 7/1984 |
| DE | 3301945 | 7/1984 |
| DE | 3614882 | 11/1987 |
| DE | 9306989.8 U1 | 7/1993 |
| DE | 4329983 | 8/1995 |
| DE | 4415885 A1 | 11/1995 |
| DE | 4444443 A1 | 6/1996 |
| DE | 9321263 | 1/1997 |
| DE | 0899157 | 3/1997 |
| DE | 29703084 U1 | 6/1997 |
| DE | 29805142 U1 | 5/1998 |
| DE | 19755008 | 7/1999 |
| DE | 29902344 U1 | 7/1999 |
| EP | 0165817 A2 | 12/1985 |
| EP | 0202460 A2 | 11/1986 |
| EP | 0254435 A1 | 1/1988 |
| EP | 0299509 A2 | 1/1989 |
| EP | 0450553 A2 | 10/1991 |
| EP | 0513476 A1 | 11/1992 |

| | | |
|---|---|---|
| EP | 0605045 A1 | 7/1994 |
| EP | 0615882 A2 | 9/1994 |
| EP | 0667254 A1 | 8/1995 |
| EP | 0729864 A1 | 12/1995 |
| EP | 0728618 A2 | 8/1996 |
| EP | 0769419 A2 | 4/1997 |
| EP | 0788947 A1 | 8/1997 |
| EP | 0830267 A2 | 3/1998 |
| EP | 937601 A2 | 8/1999 |
| EP | 1097848 A | 5/2001 |
| EP | 1152285 A2 | 11/2001 |
| EP | 1376207 A1 | 1/2004 |
| EP | 2008869 | 12/2008 |
| FR | 1021987 A | 2/1953 |
| FR | 1461419 | 12/1966 |
| FR | 2585991 | 2/1987 |
| FR | 2672857 A1 | 8/1992 |
| FR | 2673499 A1 | 9/1992 |
| FR | 2759045 | 8/1998 |
| GB | 810010 | 3/1959 |
| GB | 934037 | 8/1963 |
| GB | 1008411 | 10/1965 |
| GB | 1136134 | 12/1968 |
| GB | 1553376 | 9/1979 |
| GB | 1566451 | 4/1980 |
| GB | 2137573 A | 10/1984 |
| GB | 2192370 | 1/1988 |
| GB | 2 210 836 A | 6/1989 |
| GB | 2222991 | 3/1990 |
| GB | 2255539 A | 11/1992 |
| GB | 2292857 A | 3/1996 |
| GB | 2297632 A | 8/1996 |
| GB | 2351055 A | 12/2000 |
| IE | 970014 | 7/1998 |
| JP | 50000638 A | 1/1975 |
| JP | 55039843 | 3/1980 |
| JP | 5730639 | 2/1982 |
| JP | 57208530 | 12/1982 |
| JP | 5830729 | 2/1983 |
| JP | 58110334 A | 6/1983 |
| JP | 58180347 | 10/1983 |
| JP | 58209635 | 12/1983 |
| JP | 59114139 | 7/1984 |
| JP | 60212730 | 10/1985 |
| JP | 60261275 A | 12/1985 |
| JP | 61260217 | 11/1986 |
| JP | 6243543 | 2/1987 |
| JP | 62122487 A | 6/1987 |
| JP | 63106730 | 5/1988 |
| JP | 63106731 | 5/1988 |
| JP | 64-14700 | 1/1989 |
| JP | 01123587 A | 5/1989 |
| JP | 2122844 | 10/1990 |
| JP | 3061192 A | 3/1991 |
| JP | 03243914 | 10/1991 |
| JP | 4-114587 | 4/1992 |
| JP | 40245886 A | 9/1992 |
| JP | 5-213113 | 8/1993 |
| JP | 6080953 A | 3/1994 |
| JP | 6107035 A | 4/1994 |
| JP | 6227318 A | 8/1994 |
| JP | 7277072 | 10/1995 |
| JP | 0577657 B2 | 7/1997 |
| JP | 11078693 | 3/1999 |
| JP | 2000159014 | 6/2000 |
| JP | 2000255321 | 9/2000 |
| JP | 2002352611 | 12/2002 |
| JP | 2002352611 A | 12/2002 |
| JP | 2003267129 | 9/2003 |
| JP | 2004037944 | 2/2004 |
| JP | 2005148119 A | 6/2005 |
| JP | 2005316509 | 11/2005 |
| JP | 2005327600 A | 11/2005 |
| WO | WO 82/02448 | 7/1982 |
| WO | WO 94/12368 A1 | 6/1994 |
| WO | WO 94/19212 A2 | 9/1994 |
| WO | WO 94/27262 A1 | 11/1994 |
| WO | WO 96/03475 A1 | 2/1996 |
| WO | WO 96/21581 A1 | 7/1996 |
| WO | WO 97/34186 A1 | 9/1997 |
| WO | WO 97/48134 A1 | 12/1997 |
| WO | WO 98/14974 | 4/1998 |
| WO | WO 98/30415 | 7/1998 |
| WO | WO 98/38547 A1 | 9/1998 |
| WO | WO 98/42796 A1 | 10/1998 |
| WO | WO 98/44384 A1 | 10/1998 |
| WO | WO 98/44385 A1 | 10/1998 |
| WO | WO 98/44386 A1 | 10/1998 |
| WO | WO 99/14088 | 3/1999 |
| WO | WO 99/14943 A1 | 3/1999 |
| WO | WO 99/23828 | 5/1999 |
| WO | WO 99/45081 | 9/1999 |
| WO | WO 00/11723 A1 | 3/2000 |
| WO | WO 00/15462 A1 | 3/2000 |
| WO | WO 00/17009 A1 | 3/2000 |
| WO | WO 00/17702 A3 | 3/2000 |
| WO | WO 00/18612 | 4/2000 |
| WO | WO 00/22471 A1 | 4/2000 |
| WO | WO 0023826 | 4/2000 |
| WO | WO 00/33134 A1 | 6/2000 |
| WO | 0049680 A | 8/2000 |
| WO | 0052661 A | 9/2000 |
| WO | WO 00/55685 A1 | 9/2000 |
| WO | WO 00/66679 A1 | 11/2000 |
| WO | WO 01/64464 A1 | 9/2001 |
| WO | WO 01/64481 A2 | 9/2001 |
| WO | WO 02/062623 A2 | 8/2002 |
| WO | WO 03/065084 A1 | 8/2003 |
| WO | WO 03/079318 A1 | 9/2003 |
| WO | WO 2004/058540 | 7/2004 |
| WO | WO 2005/024500 A1 | 3/2005 |
| WO | WO 2005/045481 A1 | 5/2005 |
| WO | WO 2005/050267 A1 | 6/2005 |
| WO | WO 2005/071646 A1 | 8/2005 |
| WO | WO 2005/082015 A2 | 9/2005 |
| WO | WO 2007/103573 | 9/2007 |

OTHER PUBLICATIONS

European Supplementary Search Report dated Mar. 7, 2008, 2 pages, received from the European Patent Office in connection with European Patent Application No. 03736877.6.
Steward, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.
Edgar, Julian; Goodbye 12 Volts . . . Hello 42 Volts!; Oct. 5, 1999; Autospeed 50; Issue 50; www.autospeed.co.nz/cms/A_0319/article.html.
Kobe, Gerry; 42 Volts Goes Underhood; Mar. 2000; Automotive Industries; Cahners Publishing Company; www.findarticles.com/p/articles/mi_m3012/is_3_180/ai_61361677.
Jewett, Dale; Aug. 2000; Automotive Industries; Cahners Publishing Company; www.findarticles.com/p/articles/mi_m3012/is_8_180ai_64341779.
National Semiconductor, LM78S40, Universal Switching Regulator Subsystem, National Semiconductor Corporation, Apr. 1996, p. 6.
Dana H. Ballard and Christopher M. Brown, Computer Vision, article, 4 pages Prentice-Hall, Englewood Cliffs, New Jersey, believed to be published more than one year prior to the filed of the present application.
G. Wang, D. Renshaw, P.B. Denyer and M. Lu, CMOS Video Cameras, article, 1991, 4 pages University of Edinburgh, UK.
N.R. Lynam, "Electrochromic Automotive Day/Night Mirror," *SAE Technical Paper Series*, 870636 (1987).
N.R. Lynam, "Smart Windows for Automobiles," *SAE Technical Paper Series*, 900419 (1990).

N.R. Lynam and A. Agrawal, "Automotive Applications of Chromogenic Materials," from *Large Area Chromogenics: Materials and Devices for Transmittance Control*, C.M. Lampert and C.G. Granquist, EDS, Optical Engineering Press, Washington (1990).

Kobe, Gerry, "Hypnotic Wizardry! (interior electronics)," *Automotive Industries*, vol. 169, No. 5, p. 60, published May 1998. Relevant section is entitled "INSTRUMENTATION."

SAE Information Report, "Vision Factors Considerations in Rear View Mirror Design—SAE J985 OCT88," approved Oct. 1988, and located in *1995 SAE Handbook*, vol. 3.

T. Alfey, Jr. et al., "Physical Optics of Iridescent Multilayered Plastic Films", *Polym. Eng'g & Sci.*, 9(6), 400-04 (1969).

I.F. Chang, "Electrochromic and Electrochemichromic Materials and Phenomena" in *Nonemissive Electrooptic Displays*, 155-96, A.R. Kmetz and F.K. von Willisen, eds., Plenum Press, New York (1976).

C.M. Lampert, "Electrochromic Materials and Devices for Energy Efficient Windows", *Solar Energy Mat'ls*, 11, 1-27 (1984).

Nagai et al., "*Transmissive Electrochromic Device*", *Opt. Mat'ls. Tech For Energy Effic. And Solar Energy Conv. IV*, 562, 39-45, C.M. Lampert, ed., SPIE—The Int'l Soc. For Opt. Eng'g (1985).

W. Schrenk et al., "Coextruded Elastomeric Optical Interference Film", *ANTEC '88*, 1703-07 (1988).

U.S. Appl. No. 08/720,237, filed Sep. 26, 1996, entitle Automotive Pyroelectric Intrusion Detection, abandoned.

"Combination of rain sensing, autolamps and telephone antenna in one module," Research Disclosure, Kenneth Mason Publications, Hampshire, GB No. 412, Aug. 1998, p. 1045XP-000824825.

Product Brochure entitled "SideMinder," published in 1993 by Autosense.

* cited by examiner

INFORMATION MIRROR SYSTEM

CROSS REFERENCE TO RELATED APPLICATIONS

The present application is a continuation of U.S. patent application Ser. No. 12/473,687, filed May 28, 2009, now U.S. Pat. No. 7,670,016, which is a continuation of U.S. patent application Ser. No. 12/268,685, filed Nov. 11, 2008, now U.S. Pat. No. 7,540,620, which is a continuation of U.S. patent application Ser. No. 11/363,415, filed Feb. 27, 2006, now U.S. Pat. No. 7,452,090, which is a continuation of U.S. patent application Ser. No. 10/456,599, filed Jun. 6, 2003, now U.S. Pat. No. 7,004,593, which claims the benefit of U.S. provisional applications, Ser. No. 60/420,010, filed Oct. 21, 2002; Ser. No. 60/398,240, filed Jul. 24, 2002; and Ser. No. 60/386,373, filed Jun. 6, 2002, which are all hereby incorporated herein by reference in their entireties.

FIELD OF THE INVENTION

The present invention relates generally to interior rearview mirror assemblies for vehicles and, more particularly, to an interior rearview mirror assembly which includes a compass system.

BACKGROUND OF THE INVENTION

Interior rearview mirror assemblies which include a directional or compass display are known, such as the types disclosed in U.S. Pat. No. 5,802,727, which is hereby incorporated herein by reference. Typically, such mirror assemblies include a compass sensor, such as a magnetoresistive sensor, a magnetocapacitive sensor, a magnetoinductive sensor, or a flux gate sensor or the like, which is fixedly attached to the mirror mount that attaches the mirror assembly to a mirror assembly mounting element, such as a conventional mounting button mounted on an interior surface of the windshield of the vehicle. The mirror assemblies also include processing circuitry and a compass information display, typically included in the interior mirror casing (that includes the mirror reflector) which is pivotally adjustable by the driver to suit his or her rearward field of view.

Predominantly, compass mirror assemblies in the market today involve the fixed placement of the compass sensor (and any locally associated sensor circuitry), such as at the mirror mount where the mirror attaches to the windshield or headliner of the vehicle. The compass system typically involves a cable/harness connection to the processing circuitry (which is typically in the pivotable housing of the mirror assembly), which may include the compass compensation circuitry and the like, which feeds or connects to a display (such as a vacuum fluorescent (VF) display or the like) that is typically included in the adjustable mirror casing (such as behind the reflective element so as to display from behind and through the reflective element, or at an eyebrow or chin region of the bezel area of the mirror casing). The display then typically displays an output of the directional heading of the vehicle to the driver or passenger of the vehicle, such as an eight octant display, such as N, S, E, W, NE, NW, SE, SW, or the like.

It has been proposed in the art to mount the compass sensor within the movable housing of the rearview mirror assembly. Processes have also been proposed to compensate for movement of the sensor during normal use of the mirror, such as when the mirror head or casing is adjusted by the driver. Such a commercially implemented system, such as currently implemented in a Lexus vehicle and such as described in U.S. Pat. Nos. 6,140,933 and 6,023,229, which are hereby incorporated herein by reference, requires the use of a specially adapted single ball mount or single pivot mirror assembly. Such compass mirror assemblies can be costly and often involve special tooling and complicated adaptation of the mirror assembly itself and the casing of the mirror assembly. Also, such compass systems as described in the patents referenced above are not readily adapted for use with double ball or double pivot mirror assemblies.

It is also known to provide a stand-alone compass pod or module, which may be mounted at the mirror assembly mount at the windshield or headliner of the vehicle. The compass pod includes the compass sensor or sensors and all of the compass circuitry and is operable to output a compensated signal to a display at the instrument panel or console via a cable or wire or the like. However, the display, typically a VF display, has its own logic, circuitry, drivers and/or photosensor input (for adjustment of the display in response to ambient lighting in the vehicle), which may not readily communicate with the circuitry output of the compass pod. In order to convey and/or receive the correct compensated directional signal, a serial or similar encoding or communication protocol may need to be established, so that the compensated directional signal is correctly received by the display equipment in the instrument panel or console. This can result in an expensive compass add-on device, since it may be costly to encode and decode the signals from the compass circuitry.

It is also known to provide a compass display, and associated circuitry, all integrated into a module attaching to an interior rearview mirror assembly, such as disclosed in U.S. Pat. No. 5,576,687, which is hereby incorporated herein by reference in its entirety. While such modules may work well in many applications, such incorporation of the information display of compass direction/heading in the module has disadvantages, including the need to assure readability of the display by the driver of the vehicle.

It is also known in the art (such as disclosed in U.S. Pat. Nos. 6,539,306; 5,724,316; and 5,761,094, which are hereby incorporated herein by reference) to utilize a global positioning system as a means of or adjunct to directional sensing in vehicles. Such known systems either have or seek to overcome problems that can arise when the global positioning system fails to receive appropriate signal inputs from orbiting satellites. Several potential solutions have been proposed that can involve costly and complicated additions to the vehicle.

Therefore, there is a need in the art for an economical interior compass rearview mirror assembly, and particularly an interior compass rearview mirror assembly which is economical to use or implement, such that the assembly may be implemented in non-luxury vehicles, which often use a double ball, prismatic interior rearview mirror assembly.

SUMMARY OF THE INVENTION

The present invention is intended to provide a low cost interior rearview mirror system which includes a compass system having a display which indicates the general direction in which the vehicle is traveling. The entire compass system, including the compass sensor, may be included on a single printed circuit board positioned at or secured to a back surface of the mirror reflective element, which may be a prismatic mirror reflective element (for low cost implementation), such that the compass/mirror system may be readily installed in the casing of the mirror assembly, and may be installed simultaneously (and with minimal if any additional labor involved)

as the reflective element is included in the mirror casing, such as snapped into or otherwise secured to/within the mirror casing.

According to an aspect of the present invention, an interior rearview mirror assembly includes a double ball mounting arrangement, as is known in the mirror art, for a casing and reflective element. The casing and reflective element are pivotable about a pair of pivots via the double ball mounting arrangement. The mirror assembly includes a compass system, preferably entirely positioned within the casing and operable to display information regarding the directional heading of the vehicle to a driver of the vehicle.

In one form, the display includes ports or light transmissive regions or the like, which are representative of only the four cardinal directional points, such as, for example, the characters N, S, E, W, formed or etched in the reflective film coating of the reflective element (and forming a transparent window therein) using techniques such as disclosed in commonly assigned U.S. Pat. No. 4,882,565, issued to Gallmeyer on Nov. 21, 1989, which is hereby incorporated herein by reference, and an illumination source within the casing and aligned with and behind each of the characters. The appropriate illumination source or sources may then be energized or illuminated to illuminate the appropriate character or characters to or icons or indicia the driver to convey the directional heading information. For example, four individual light emitting diodes may be placed behind and aligned with the respective four characters, so as to emit light through the characters for viewing by the driver of the vehicle.

According to another aspect of the present invention, an interior rearview mirror system comprises an interior rearview mirror assembly, which includes a casing and a reflective element, and a compass system. The compass system includes a compass sensor and a display comprising a plurality of ports formed in the reflective coating of the reflective element. The display includes a plurality of illumination sources positioned behind and aligned with respective ports. Each of the illumination sources is energized to project or emit illumination through the respective port of the display. The illumination sources may be mounted on a printed circuit board and the reflective element and printed circuit board may be incorporated, such as by snapping into place, on or within the casing of the mirror assembly, with minimal invasiveness to the casing and overall design and tooling of the mirror assembly.

The display may include four illumination sources (preferably light emitting diodes) mounted on the printed circuit board and with the printed circuit board arranged behind the reflective element such that each of the individual illumination sources is behind and aligned with a respective one of the ports (which may be formed as the characters N, S, E, W) formed or etched in the reflective coating of the reflective element. Each of the illumination sources is positioned on the printed circuit board such that it is aligned with, behind and emitting through a respective one of the four ports (that are preferably created on the reflective element itself). Optionally, and preferably, a light diffuser and/or a spectral filter may be interposed between the light source and the rear of the reflective element. The compass processing circuitry (that typically includes digital circuitry including a microprocessor running compensation and other compass-related software) is operable to energize or actuate one or more of the illumination sources to display the directional heading of the vehicle to the driver.

The printed circuit board may include a user actuatable button or buttons, which are positioned to be accessible or to protrude through one or more openings in the casing of the mirror assembly. The user actuatable button or buttons may be included in the unitary compass system, and may be operable to select a calibration mode/and or set a zone setting of the compass system.

The compass system may be operable in conjunction with a global positioning system of the vehicle. The global positioning system may be operable to detect or track movement of the vehicle to provide point-to-point data of vehicle movement to determine a directional heading of the vehicle. The global positioning system may be operable to calibrate the compass system, indicate a zone in which the vehicle is located, and/or provide a directional heading indication in situations where the compass sensor is adversely affected or compromised.

The present invention also provides a low cost compass system and compass pod or module positionable at an interior rearview mirror assembly, which includes a compass display for indicating the general direction in which the vehicle is traveling. The compass sensors and associated circuitry are included within the compass pod or module, which is generally fixedly mounted to the mirror mount of the mirror assembly. The compass pod includes a multi-wire cable which connects the compass circuitry of the compass pod to the display in the mirror assembly. The display is positioned at the rear surface of the reflective element of the mirror assembly and comprises a plurality of illumination sources or devices positioned adjacent to or behind corresponding ports, such as icons or characters or other indicia, etched or otherwise formed in the reflective surface or coating in the reflective element. Preferably, each display port is representative of one of the four cardinal directional headings (N, S, E, W) or one of the eight cardinal and inter-cardinal directional headings (N, S, E, W, NE, NW, SE, SW), and the compass circuitry is operable to activate an appropriate illumination device at the display via providing power to an appropriate one of the wires connecting to the display. The mirror assembly thus does not require much, if any, additional display circuitry, drivers or the like to encode or decode the signal communicated from the compass circuitry.

According to another aspect of the present invention, a compass system for a vehicle includes a compass module fixedly mountable at an interior rearview mirror assembly of the vehicle and a display. The compass module comprises a compass sensor and compass circuitry. The compass circuitry is operable to receive an input from the compass sensor and to determine a directional heading of the vehicle in response to the input. The display is positioned remote from the compass module and comprises a plurality of illumination sources which are actuatable to project illumination through corresponding ports which are indicative of a directional heading. Each of the illumination sources has an associated wire and is in electrical communication with the compass circuitry via the respective associated wire, whereby the compass circuitry (or a microprocessor or the like associated with the compass circuitry) provides electrical power to each of the illumination sources by energizing the respective associated wire. The compass circuitry and/or microprocessor is/are operable to actuate or energize an appropriate one of the illumination sources via the respective wire associated with the appropriate one of the illumination sources to indicate the directional heading of the vehicle at the display.

The display may be positioned at a reflective element of a prismatic interior rearview mirror assembly (for low cost implementation), such that the display may be readily installed in the casing of the mirror assembly, and preferably installed simultaneously (and with minimal if any additional labor involved) as the reflective element is included in the mirror casing, such as snapped into or otherwise secured to/within the mirror casing. Alternately, the display may be positioned at a reflective element of an electro-optic interior rearview mirror assembly. In such applications, the compass module may include electro-optic reflective element automatic dimming/powering circuitry for controlling the electro-optic reflective element, and may be in electrical communication with the electro-optic reflective element via a pair of wires. The microprocessor of the compass module thus may control the electro-optic reflective element via flowing electricity across the reflective element to darken the electrochromic medium as desired or in response to one or more photosensors.

The display and/or the compass module may include an ambient light photosensor for sensing the ambient light levels surrounding the mirror assembly and/or the compass module. If the compass module is associated with a display positioned at an electro-optic interior rearview mirror assembly, the display may include a glare detecting photosensor, while the compass module includes an ambient light photosensor.

According to another aspect of the present invention, an interior rearview mirror system includes a compass pod mounted at a mirror mount of an interior rearview mirror assembly, which includes a casing and a reflective element. The mirror mount and compass pod are generally fixedly positioned relative to the vehicle, while the casing and the reflective element are pivotable or adjustable relative to the mirror mount. A compass display is positioned at the mirror reflective element or casing and includes a plurality of illumination sources and at least one port or light transmissive region formed in the reflective element and corresponding to at least one of the illumination sources. The compass pod includes a compass sensor, a microprocessor and compass circuitry, preferably substantially or entirely positioned within the pod and operable to provide an output signal to the display via a connector cable to display information regarding the directional heading of the vehicle to a driver of the vehicle. Each wire of the connector cable functions to provide power to an appropriate one or more of the illumination sources of the display in response to the microprocessor and/or compass circuitry energizing the respective wire.

The display may include four or eight illumination sources (preferably light emitting diodes) arranged (such as mounted on a printed circuit board) behind the reflective element such that each of the individual illumination sources is positioned behind and aligned with and emitting light through a respective one of the ports formed or etched in the reflective coating of the reflective element. Optionally, and preferably, a light diffuser and/or a spectral filter may be interposed between the light source and the rear of the reflective element. The microprocessor and/or compass processing circuitry (that typically includes digital circuitry including a microprocessor running compensation and other compass-related software) is operable to energize or actuate one or more of the illumination sources to display the directional heading of the vehicle to the driver.

Optionally, the display may comprise a multi-pixel or multi-element reconfigurable display element. The multi-element display may comprise multiple display elements and may be reconfigurable to display directional heading information via selective activation of the display elements.

The compass pod or module may include a printed circuit board positioned within the pod, with the compass sensor and compass circuitry positioned on the circuit board. The circuit board may also include a photosensor for determining a level of ambient light at the pod and mirror assembly, whereby the compass circuitry may be operable to adjust the intensity of the illumination sources at the display in response to the photosensor. The circuit board may also include user actuatable buttons, such as a calibration switch or a zone switch, which are positioned to be accessible or to protrude through one or more openings in the casing of the compass pod.

According to another aspect of the present invention, an interior rearview mirror system comprises an interior rearview assembly (which has a mirror casing and a reflective element), a global positioning system of the vehicle, a magnetoresponsive sensor, a microprocessor, and a display. The global positioning system generates locational data and the magnetoresponsive sensor generates direction indicative signals. The microprocessor processes at least one of the locational data and the direction indicative signals and generates directional heading information indicative of the directional heading of the vehicle. The display is associated with or adjacent to the interior rearview mirror assembly and is viewable by the driver of the vehicle. The display displays the directional heading information. The microprocessor temporarily processes the direction indicative signals generated by the magnetoresponsive sensor to generate the directional heading information when the locational data generated by the global positioning system is compromised, thereby ensuring consistency of the directional heading information being displayed.

Optionally, the microprocessor may process the locational data and/or other data generated by the global positioning system of the vehicle to extract or derive other data or information for displaying to the driver or occupant of the vehicle. The display may selectively display such other data or information to the driver or occupant of the vehicle.

Therefore, the present invention provides a low cost compass system for an interior rearview mirror assembly which provides the compass sensor and compass circuitry at a generally fixedly mounted pod or module. The compass sensor and circuitry may be part of a single printed circuit board, which may be secured within the pod or module, while the display and illumination sources are mounted at the rear of the reflective element. Each illumination source of the display may be activated via a simple power signal from the microprocessor and/or compass circuitry via a respective wire of a connector cable between the compass pod and the display, without requiring any encoding or decoding of the signal from the compass circuitry in order to provide the correct display to the driver of the vehicle. The present invention thus provides a low cost compass system with minimal associated encoding or decoding costs and design modifications, and with minimal special adaptation of the mirror casing.

The present invention may also provide a low cost, double ball mounted interior rearview mirror assembly which includes a compass system within the mirror casing. The compass system may be part of a single printed circuit board, which may be secured to the rear of (or disposed to the rear of) the reflective element, such that the compass system may be easily installed in the mirror casing when or after the reflective element is snapped into the casing. The circuit board may include a plurality of illumination sources which are positioned generally adjacent to ports or light transmissive regions formed in the reflective element, such that when each of the illumination sources is energized, the illumination source projects illumination through the respective port to provide direction information or other information to a driver or occupant of the vehicle. The compass system may be implemented at and/or within a casing of an interior rearview mirror assembly with minimal modifications being necessary to the casing. The present invention thus provides a low cost compass system with minimal associated tooling costs and design modifications, and with minimal special adaptation of the mirror casing, for example.

Optionally, the mirror system of the present invention may provide a GPS-derived compass system which is operable to deduce directional heading information and display the directional heading information to a driver or occupant of the vehicle. The mirror system may include a magnetoresponsive sensor which may function as an auxiliary or back up to the GPS-derived compass system when the global positioning system of the vehicle is not generating an appropriate signal or input to the GPS-derived compass system. The auxiliary magnetoresponsive compass sensor thus ensures consistency of the directional heading information being displayed. Because the GPS-derived compass system may function as the primary compass system and may function to calibrate the magnetoresponsive sensor, compass control circuitry and calibration algorithms and circuitry are not required.

These and other objects, advantages, purposes and features of the present invention will become apparent upon review of the following specification in conjunction with the drawings.

DESCRIPTION OF THE PREFERRED EMBODIMENTS

Figure 1:
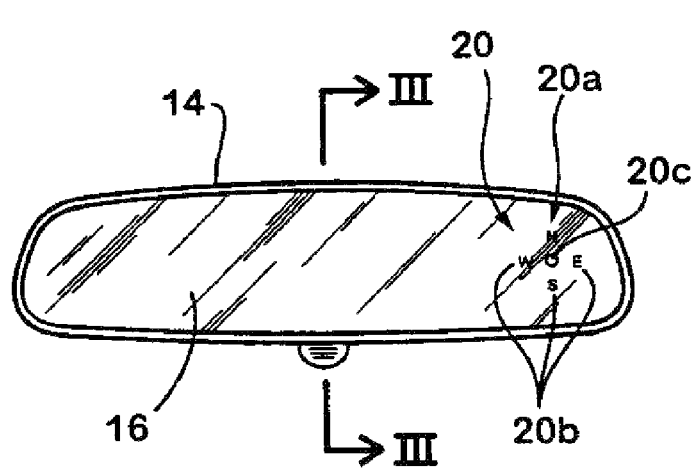
FIG. 1 is a forward facing elevation of an interior rearview mirror assembly in accordance with the present invention, as facing forward with respect to a direction of travel of a vehicle.

Referring now to the drawings and the illustrative embodiments depicted therein, a compassized prismatic interior rearview mirror assembly or system 10 includes a double pivot or double ball mounting arrangement 12 for pivotally or adjustably mounting a casing 14 and prismatic reflective element 16 of mirror assembly 10 relative to an interior portion of a vehicle, such as to an interior surface of a windshield (not shown) of a vehicle (FIGS. 1-3) or the like. The mirror assembly 10 includes a compass system 18, which includes a compass sensor (not shown) and a display 20 for providing a display or indication of the directional heading of the vehicle at the reflective element 16 of the mirror.

Figure 2:
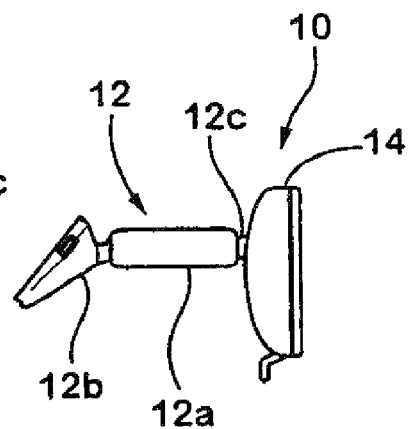
FIG. 2 is a side elevation of the interior rearview mirror assembly of FIG. 1.

As shown in FIG. 2, the double ball or double pivot mirror mounting arrangement 12 includes a mounting arm 12a which is pivotally mounted at opposite ends to a mirror mount 12b (mounted at the windshield or headliner of the vehicle, such as at a mounting button at the interior surface of the vehicle) and a mirror casing mount 12c. An example of a double pivot or double ball mounting arrangement is disclosed in commonly assigned U.S. Pat. Nos. 4,646,210 and 6,331,066, which are hereby incorporated herein by reference. Preferably, the mirror mounting components provide a breakaway type connection or mount, such as the types disclosed in U.S. Pat. Nos. 6,172,613; 6,087,953; 5,820,097; 5,377,949; and/or 5,330,149, which are hereby incorporated herein by reference.

Figure 3:
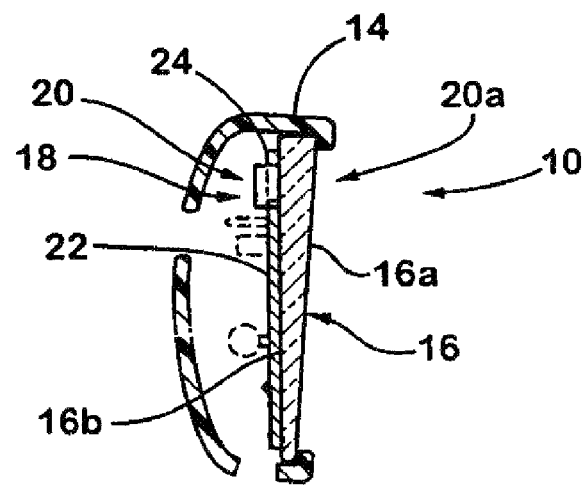
FIG. 3 is a sectional view of the mirror assembly taken along the line in FIG. 1.

The prismatic reflective element 16 may be formed from various materials such as plastic or glass, but preferably is glass, and preferably has a planar front surface 16a extending at an angle to a planar rear surface 16b (FIG. 3). Rear surface 16b is preferably coated with a reflective layer of metal such as chromium, aluminum or alloys thereof as is conventionally known in the industry. The mirror casing 14 is pivotable relative to mounting arm 12a and mirror mount 12b to pivot the reflective surface 16b in order to reduce glare during nighttime conditions. When the mirror casing is pivoted from a full reflectivity day position to a reduced reflectivity night position, the reflective surface 16b is rotated clockwise such that the uncoated front surface 16a is aligned for viewing by the vehicle driver instead of reflective surface 16b. Preferably, reflective surface 16b reflects at least about 60% to 95% of the light incident thereon, while uncoated front surface 16a reflects about 4% of the light incident thereon, thereby significantly reducing glare from headlights or other bright lights rearward of the vehicle to the driver's eyes. Although shown and described as having a prismatic reflective element, it is envisioned that the present invention may be equally suitable and applicable to electro-optic or electrochromic interior rearview mirror assemblies having electro-optic or electrochromic reflective elements.

The compass sensor of compass system 18 functions to detect a directional heading of the vehicle relative to the earth's magnetic field, as is known in the art. The compass sensor may be any known sensor type, such as a magnetoresistive sensor (such as described in U.S. Pat. No. 5,802,727, and U.S. patent application Ser. No. 09/540,702, filed Mar. 31, 2000 by Schierbeek et al. for VEHICLE COMPASS COMPENSATION, now U.S. Pat. No. 6,513,252, which are hereby incorporated herein by reference), a magnetocapacitive sensor, a magnetoinductive sensor, or a flux-gate sensor or the like, without affecting the scope of the present invention. The compass sensor may include a pair of sensors positioned generally orthogonal to one another. The pair of generally orthogonal sensors are preferably oriented relative to the vehicle such that one of the sensors is generally parallel to the floor of the vehicle and pointing generally forwardly in the direction of travel of the vehicle, while the other is generally orthogonal or perpendicular to the first sensor. The compass sensor or sensors provide an output signal to compass processing circuitry, which is operable to process the output signal to determine the vehicle heading and to actuate or control or adjust an output of display 20 in response to the output signal.

As shown in FIG. 3, compass system 18 may include a printed circuit board (PCB) 22, which may be mounted or positioned or bonded along the rear surface 16b of the reflective element 16, as shown in FIG. 3. The printed circuit board 22 may include all of the processing circuitry and the compass sensor. Such processing circuitry may include compensation methods known in the art, such as described in U.S. Pat. Nos. 4,546,551; 5,699,044; 4,953,305; 5,576,687; 5,632,092; 5,644,851; 5,708,410; 5,737,226; 5,802,727; 5,878,370; 6,087,953; 6,173,501; and 6,222,460, and U.S. patent application Ser. No. 09/999,429, filed Nov. 15, 2001 by DeLine et al. for INTERIOR REARVIEW MIRROR SYSTEM INCORPORATING A DIRECTIONAL INFORMATION DISPLAY, now U.S. Pat. No. 6,642,851, and European patent application, published Oct. 11, 2000 under Publication No. EP 0 1043566, which are all hereby incorporated herein by reference.

Because the mirror casing and reflective element may be pivoted to be angled generally toward the head of the driver of the vehicle, such as, for example, approximately 22 degrees toward the driver side of the vehicle and approximately 6 degrees downward, the compassized interior rearview mirror assembly of the present invention may be adapted to mount the compass sensor or sensors on a physical mount at the printed circuit board which compensates for or approximates and effectively cancels the approximate angle of the mirror casing so as to orient the compass sensors generally in the desired orientation, even when the mirror casing and reflective element are angled toward the driver of the vehicle. Optionally, the printed circuit board may be mounted at a physical mount at the reflective element to accommodate the approximate angle of the mirror casing. The physical mount may be a wedge shaped mounting element or bracket or any other means for orienting the sensors relative to the reflective element to accommodate for the typical angle of tilt of the mirror head toward a driver of a vehicle. The typical angle or tilt of the mirror head or casing may be calculated or otherwise determined or approximated and the physical mount may then be formed to compensate or cancel the typical angle of the mirror. The desired mounting orientation may vary depending on the particular vehicle in which the compassized mirror assembly is being installed, since the mirror assembly may be mounted at different heights along the windshield or at the headliner of different vehicle models. In lieu of a physical orientation as described above, software compensation, as known in the art, can be used to negate or cancel out the above effects.

As shown in FIG. 1, display 20 provides a display region 20a at the reflective element 16 which includes ports or portions 20b, which may comprise icons, characters or letters or the like representative of only the cardinal directional points 20b, such as, for example, the characters N, S, E, W, formed or etched in the reflective film coating of the reflective element (and forming a transparent window therein). Display region 20a provides an indication of N, S, E, W information on reflective element 16, and may be positioned at an upper right hand quadrant of the reflective element (although the display region may be positioned elsewhere on the reflective element, without affecting the scope of the present invention). The characters or letters N, S, E, W (or other icons or indicia) may be sandblasted or laser created or chemically etched or otherwise applied or formed on the rearward surface of the reflective element, such as via techniques such as disclosed in commonly assigned U.S. Pat. No. 4,882,565, issued to Gallmeyer on Nov. 21, 1989, which is hereby incorporated herein by reference. Optionally, however, the display of the present invention may be a display on demand type of display, such as disclosed in commonly assigned U.S. Pat. Nos. 5,668,663 and 5,724,187, and U.S. patent application Ser. No. 10/054,633, filed Jan. 22, 2002 by Lynam et al. for VEHICULAR LIGHTING SYSTEM, now U.S. Pat. No. 7,195,381; and Ser. No. 09/793,002, filed Feb. 26, 2001, entitled VIDEO MIRROR SYSTEMS INCORPORATING AN ACCESSORY MODULE, now U.S. Pat. No. 6,690,268, the entire disclosures of which are hereby incorporated by reference herein, without affecting the scope of the present invention.

Display 20 also includes four illumination sources 24, such as light emitting diodes (LEDs), such as described in U.S. patent application Ser. No. 10/054,633, filed Jan. 22, 2002 by Lynam et al. for VEHICULAR LIGHTING SYSTEM, now U.S. Pat. No. 7,195,381, which is hereby incorporated herein by reference, or any other light emitting devices, positioned behind and aligned with respective or corresponding ones of characters or ports or icons or indicia or points 20b (such as letters N, S, E, W). Optionally, the printed circuit board 22 may include the illumination sources or light emitting diodes 24 positioned thereon. Each illumination source 24 is positioned behind the reflective element and generally aligned with the characters or icons 20b of the display. Each illumination source 24 may be energized, either alone or in combination with one or more of the other illumination sources, to provide illumination of the respective port or ports or icon or icons 20b of display region 20a, such that the ports or characters or compass icons are backlit by the respective illumination sources, in order to convey directional information or other information (discussed below) to the driver of the vehicle. A seal or sealant may be provided between the circuit board 22 and the reflective element 16 and may generally surround each light source or port or icon and/or may separate or isolate each light source or port from the other light sources/ports to limit or substantially preclude light emitted by one light source (and thus emitted through a corresponding port) from also emitting through one or more of the other ports or icons of the display.

The ports 20b of display 20 may comprise any form of port or view opening or an at least partially light transmissive portion of the reflective element 16, and are at least partially transmitting, and preferably substantially light transmitting, as compared to the surrounding area of the reflective element. The ports thus may transmit illumination emitted by the illumination sources 24 through reflective element 16 for viewing by the driver or occupant of the vehicle. The ports may be formed on the reflective element via any manner, such as, for example, via etching or ablating the reflective coating or surface from the rear surface of the reflective element, or the ports may be defined as part of display on demand areas or the like for electrochromic reflective elements (or transflective electrochromic reflective elements), or the ports may comprise any other at least partially light transmitting regions formed on a prismatic reflective element or an electro-optic reflective element, without affecting the scope of the present invention. The ports may be formed in any desired shape, such as characters, letters, icons, symbols or other indicia or the like, and preferably may be representative or indicative of the directional heading of the vehicle. It is further envisioned that the illumination sources may define a multi-pixel reconfigurable display element, whereby the individual illumination sources or pixels may be illuminated or energized individually or in various combinations to convey the desired information, as discussed below.

The reflective element 16 may also include a port or aperture or hole 20c in the center area or region of the display area 20a to accommodate a photo detector or sensor (not shown), such as a photo transistor, a photo resistor, a photo diode or the like, which may be operable to sense the ambient light levels surrounding the mirror assembly or the light from headlights of vehicles rearward of the subject vehicle. The photosensor may be positioned or mounted on the printed circuit board 22 and may be positioned, aligned and directed to receive illumination through the aperture or hole 20c in the reflective element coating at the display region 20a or elsewhere on reflective element 16 or casing 14 (such as through an opening formed in a wall of the casing immediately adjacent to the location of the photosensor). The photosensor is operable to detect the ambient light levels generally surrounding the mirror assembly to provide for dimming of the output of display 20 in darkened lighting conditions, such as at nighttime conditions, in order to reduce the intensity of display 20 to reduce glare and distraction and annoyance to the driver of the vehicle. Optionally, such dimming of the display may be performed in response to an instrument panel dimming system of the vehicle, without affecting the scope of the present invention. The printed circuit board may include other electronic components, such as integrated circuits, resistors, capacitors, diodes and/or the like.

Compass system 18 includes processing circuitry which is operable to actuate or energize one or more of the illumination sources 24 in response to an output from the compass sensor. For example, the illumination source behind the letter N may be energized or actuated when the vehicle is heading generally Northward and within a particular range of Northward, while the illumination sources behind both of the letters N and E may be energized or actuated when the vehicle is heading in a direction generally between North and East. Each respective one of the illumination sources is illuminated when the vehicle is within a predetermined range of the particular direction at the respective cardinal point (N, S, E, W). The combination of two adjacent energized illumination sources (e.g. the illumination sources behind and aligned with the N and the E characters), such that two characters are backlit by the energized or illuminated illumination sources, indicates a heading between the two cardinal points, such as within a range about the intercardinal points (northeast, northwest, southeast, southwest). Optionally, the compass system of the present invention may give greater weight (or a broader band or range) to the cardinal octant points and less weight (or a narrower band or range) to the intercardinal points. However, other bands or ranges may be implemented, such as a typical 45 degree band or range about each octant point, without affecting the scope of the present invention.

Thus, the compass mirror system of the present invention may provide a display of directional information using only four individual illumination sources, such as four light emitting diodes. The four illumination sources are operable to convey directional information for all eight directional headings by activating or energizing an individual illumination source or a combination of two adjacent illumination sources (by adjacent, it is meant the adjacent directional heading points, such as N and E; E and S; S and W; and W and N). Thus, economy is achieved via implementation of only four illumination sources, while the directional heading of the vehicle is conveyed within a range of each of the eight cardinal and intercardinal directional headings or points.

Additionally, the processing circuitry may be operable to activate one or more of the illumination sources 24 to convey other information to the driver of the vehicle via display 20. For example, if the compass system is in a calibration mode, one or more, or all four, of the illumination sources may be illuminated or may flash until the calibration of the compass system is complete (clearly, other combinations of illumination may be implemented, without affecting the scope of the present invention).

Also, the compass system may be operable to convey information pertaining to the calibration or zone setting mode for a particular zone in which the vehicle is located via display 20. The zones are regions or zones which indicate to the processing circuitry the appropriate compensation for the compass sensor, depending on the vehicle's location, as is known in the compass art (typically, 1-15 different zones may be desired or selected). The display may convey the zone chosen via a code or map by illuminating or energizing one of the illumination sources and/or two or more of the illumination sources in different combinations or codes. The zone code may be included in the owner's manual of the vehicle so the driver of the vehicle may decipher the code being illuminated on the display. For example, the port or character representative of a North heading indication (e.g., the character N) may be illuminated (and intermittently illuminated or flashed, if desired) if the vehicle is in zone 1, while the character E may be illuminated if the vehicle is in zone 2; S may be illuminated if the vehicle is in zone 3; and W may be illuminated if the vehicle is in zone 4. Additionally, a combination of characters may be illuminated or flashed to indicate that the vehicle is in other zones. For example, N and E may be illuminated or flashed when in zone 5; N and S may be illuminated when in zone 6; N and W may be illuminated when in zone 7; E and W may be illuminated when in zone 8; E and S may be illuminated when in zone 9; W and S may be illuminated when in zone 10; N and E and S may be illuminated when in zone 11; N and S and W may be illuminated when in zone 12; E and S and W may be illuminated when in zone 13 and all four (N, E, S and W) may be illuminated when in zone 14. The individual illumination or combination of illuminated or flashed display characters may thus be selected to provide a distinct display for each particular zone that the vehicle may be positioned in. The illumination source or sources may be continuously or intermittently energized or activated to convey the zone information to the driver of the vehicle.

Optionally, display 20 may include an additional indicator or indicators (not shown), such that when the additional indicator is illuminated, the meaning of or the information conveyed by the combination of display ports or characters being illuminated changes to a second set of meanings, in order to double the amount of information that may be conveyed by the display 20 of the compass system of the present invention. It is envisioned that other information may be conveyed via display 20 and optionally one or more additional indicators may be provided, without affecting the scope of the present invention. It is further envisioned that the display may be actuated to illuminate only combinations of ports or characters which are not compass headings (such as activating the illumination sources behind and generally aligned with the characters N and S; E and W; N and E and S, and the like) to convey non-directional related information, in order to reduce the possibility of confusion to the driver upon seeing illumination of directional headings, such as illumination of one port or character or adjacent ports or characters only, such as illumination of the N and E characters together.

Because the compass system of the present invention may be implemented as part of a low cost prismatic mirror assembly, the initial mirror assembly application may not have a power supply connected thereto (such as a connection to a 12 volt battery power source of the vehicle or the like). The power supply connector may be provided from the headliner of the vehicle and may connect to a connector at or within the mirror casing which houses the compass system in accordance with the present invention. The mirror casing may be formed or may be adapted to provide an opening for connection of the wire harness to the compass system within the casing.

The compass system of the present invention may be implemented as part of an interior rearview mirror assembly supplied to a vehicle manufacturer and installed in a particular vehicle which includes a compass mirror option. It is further envisioned that the compass system may be supplied to a mirror assembler or supplier as a kit. The kit may include a printed circuit board having an electrical connector, a compass sensor, and illumination sources for the display, and may or may not include the reflective element having the characters sandblasted, etched or otherwise formed thereon. The mirror assembler may purchase the compass kit (and attach the kit to an adapted reflective element) or compassized reflective element and may install the reflective element and compass kit into the housing or casing of the mirror assemblies. An operator thus may incorporate, such as via popping or snapping, the compassized reflective element into the casing with minimal extra customization and cost to the casing and thus to the overall mirror assembly. The printed circuit board of the compass system may be sized to fit within the interior space of standard casings, such that minimal changes or modifications to the casing are necessary. For example, the case may be modified or made to have an access hole for accessing a calibration button or other button or buttons or the like (such as for initiating calibration of the compass system if needed or to set a zone of the compass system as needed, as is known in the mirror art), and/or a hole or opening for a power supply connection or the like, but may otherwise be the same as for noncompassized mirror assemblies. Thus, for example, a wiring harness with a plug connector can extend down from the headliner of the vehicle and pass through the hole in the mirror casing and connect directly to the printed circuit board on the back of the reflective element. Correspondingly, the owner or driver of the vehicle may access one or more user control buttons (such as for manual actuation of a compass calibration mode or the like) through openings in the casing, such as with their finger, a pen or other instrument or the like. Preferably, any such openings may be provided on the casing for accessing connectors and buttons and the like on the printed circuit board at the back of the reflective element.

For example, if the compass system is positioned generally at an upper quadrant or portion of the mirror assembly (or around an edge of the mirror assembly), a wire harness may extend down from the headliner of the vehicle to the compass system within the casing of the mirror assembly, whereby the casing of the mirror assembly may include one or more openings or holes for the wire harness and for access to the button or buttons of the compass system (the casing may optionally include an opening for a photosensor as well). The hole or holes may be formed by the mirror assembler or manufacturer to adapt an existing casing for use with the compassized reflective element of the present invention. Alternately, the compass system may include a lead or wire extending from the casing of the mirror assembly which is connectable to a connector at the wire harness of the vehicle, without affecting the scope of the present invention. The printed circuit board and reflector may snap into the mirror casing so any buttons and/or wire connectors align with the corresponding holes in the casing. The compass system of the present invention is thus minimally invasive or not at all invasive to the overall interior rearview mirror assembly design.

The mirror manufacturer may mold the casing or housing and snap the bracket assembly, pivot and/or ball member and/or toggle assembly, and other known components of the mirror assembly, into the casing substantially immediately after molding or heating of the casing and while the casing is still warm and pliable. The reflective element and associated compass system may also then be snapped into the casing while it is warm to ease assembly of the compassized mirror assembly. Accordingly, the mirror manufacturer may assemble a prismatic mirror with a compass system via snapping the compassized reflective element of the present invention into an existing (and may be modified) mirror casing. The manufacturer of the compassized reflective element may then be able to optimize the size and design and layout and attachment of the printed circuit board for the desired area of the mirror casing, such as the upper right hand quadrant of the mirror (as shown in FIG. 1). The mirror manufacturer may mold the casing to accommodate the compassized reflective element with minimal modifications required, and may easily mold separate casings for mirrors with and without compass systems, such as by molding one casing with an opening or openings for wiring and button access and one without any such openings.

Figure 4:
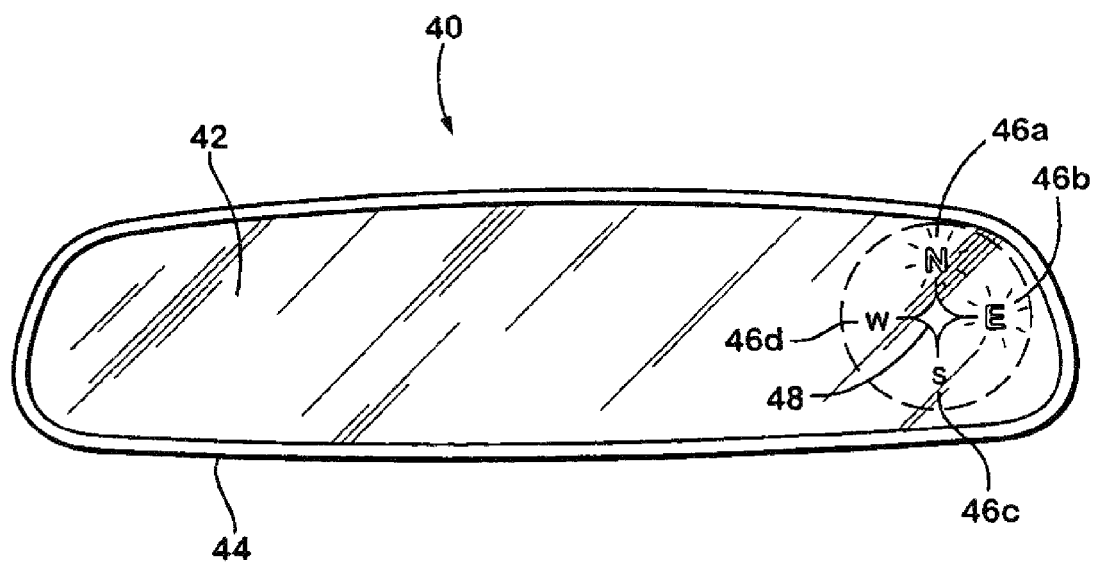
FIG. 4 is a forward facing elevation of another interior rearview mirror assembly in accordance with the present invention, as facing forward with respect to a direction of travel of a vehicle.

An embodiment of the present invention which may be included in a lighted interior prismatic assembly and successfully used in an automobile is shown in FIG. 4, where an interior mirror system or assembly 40 includes prismatic mirror reflector element 42 included in mirror casing 44. A printed circuit board (not shown in FIG. 4), to which a magnetoresponsive compass direction sensing sensor may be mounted (including microprocessor-based compass processing circuitry), may be disposed to the rear of reflector element 42. The compass circuitry may include algorithmic routines for compass calibration and/or compensation, such as are described in U.S. patent application Ser. No. 09/540,702, filed Mar. 31, 2000 by Schierbeek et al. for VEHICLE COMPASS COMPENSATION, now U.S. Pat. No. 6,513,252, the entire disclosure of which is hereby incorporated by reference herein). The silver mirror reflector coating (and its associated copper protective layer and paint protective layer/layers) on the rear surface of reflector element 42 may be removed by a laser etching/ablating to create the ports or light transmitting regions, such as the N, E, S, W transparent/light transmitting indicia/icons 46*a*, 46*b*, 46*c*, 46*d*, respectively. A central transparent/light transmitting central region 48 may also be created. Although shown and described as being letters or characters, the reflector element 42 may provide any other form of ports or light transmitting regions, such as letters, characters, icons, indicia or the like, without affecting the scope of the present invention.

Four individual light emitting diodes (not shown in FIG. 4) may be mounted to the rear of reflector element 42 to individually align with the port or indicia/icon 46*a*, 46*b*, 46*c*, 46*d* so that each LED individually emits light through (and thus illuminate) the transparent or at least partially transparent or light transmissive port or indicia/icon 46*a*, 46*b*, 46*c*, 46*d* when the particular LED aligned with a particular port or indicia/icon is powered. A photosensor (also not shown in FIG. 4) may be aligned behind transparent/light transmitting region 48 and may detect ambient light intensity at the interior mirror assembly. The photosensor may be part of the compass circuitry (not shown) to the rear of reflector element 42. The compass and/or display circuitry may be operable to reduce the intensity of light emitted by the LEDs as the ambient light detected adjacent to mirror assembly 40 reduces in intensity so that the display intensity is reduced at dusk/night so as to avoid glaring a driver of the vehicle when in use such as during nighttime driving. As shown in FIG. 4, the "N" indicia/icon and the "E" indicia/icon may be illuminated to indicate that the vehicle is heading in a north-east (NE) direction. Optionally, an additional LED and a corresponding indicia/icon in the silver reflector coating can be provided to assist in calibration and/or zone setting.

Figure 5:
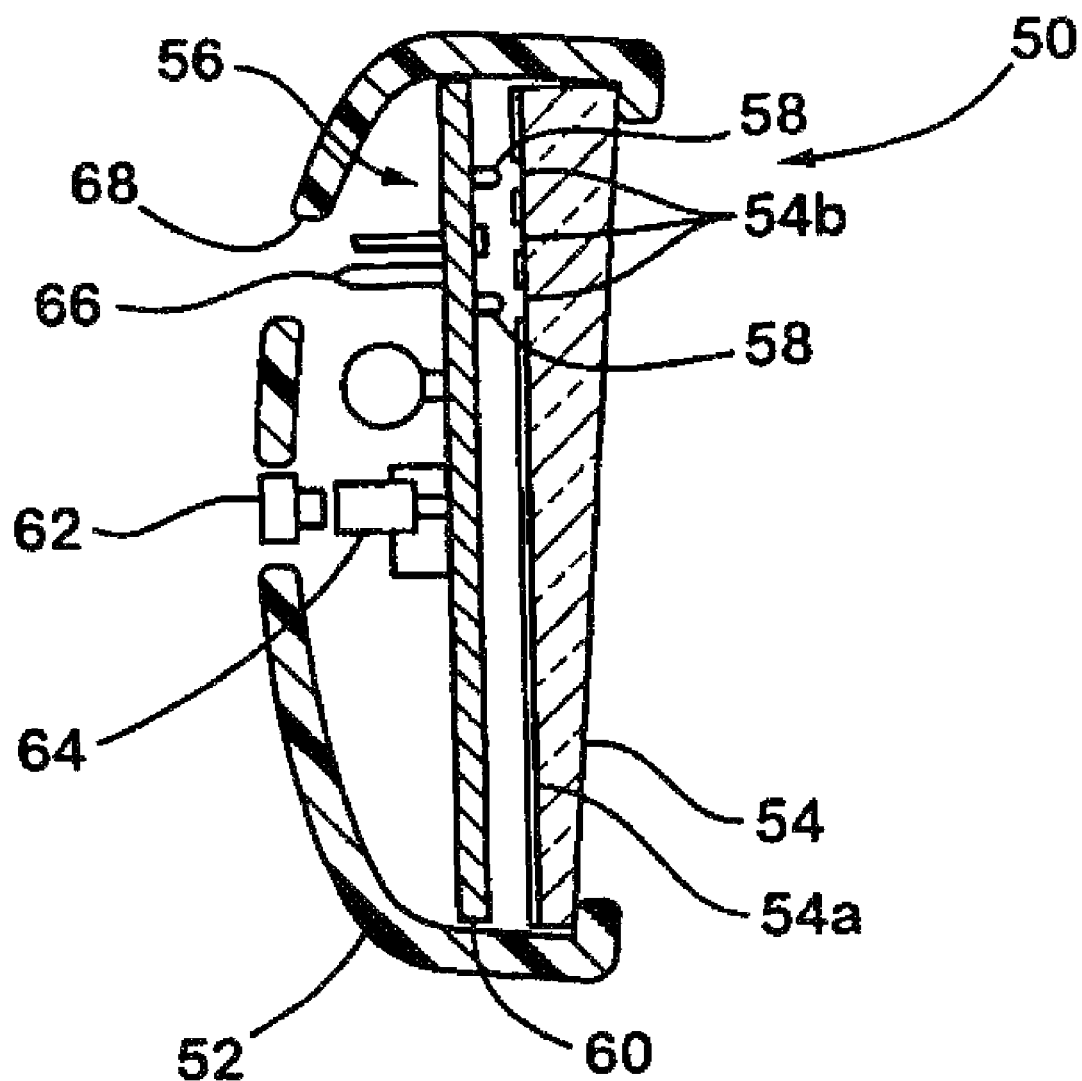
FIG. 5 is a sectional view similar to FIG. 3 of an interior rearview mirror assembly in accordance with the present invention.

Referring now to FIG. 5, a prismatic interior rearview mirror system or assembly 50 includes a casing or housing 52 and a prismatic reflective element or prism glass 54. The prismatic reflective element 54 includes a reflective surface 54*a* on its back surface. The reflective surface 54*a* may be etched or otherwise modified to remove the reflective surface coating in the regions 54*b* for the characters or icons associated with a compass system 56 of the present invention. The illumination sources 58 or light emitting diodes (LEDs) of compass system 56 may be positioned on a printed circuit board 60 of mirror assembly 50 and generally aligned with the etched regions 54*b* to backlight and emit illumination through the etched regions. The printed circuit board 60 may be spaced from the reflector element or prism 54 as shown in FIG. 5.

Housing 52 may comprise a polypropylene material or the like and is adjustably mounted to a mirror mount (not shown) positioned at an interior portion of a vehicle, such as a mirror mounting button on a windshield of the vehicle or any other mounting member at the windshield or at a headliner or overhead console of the vehicle or the like. The mirror housing may be adjustably mounted at the vehicle via connection to a single or double ball mounting arrangement, as discussed above with respect to mirror assembly 10, or via connection to any other mounting arrangement, without affecting the scope of the present invention. Mirror housing 52 may then pivot or actuate around one or more ball and socket joints or connections to be adjusted relative to the interior portion of the vehicle to a desired orientation by the driver of the vehicle.

Mirror assembly 50 may include a switch 64 on the printed circuit board 60, which may be actuatable to actuate a calibration process of the compass system 56. Switch 64 may be positioned on printed circuit board 60 where it is accessible from outside of the housing, such that a user may manually actuate switch 64 from outside the housing, such as via a pen or other device for actuating switch 64. Optionally, switch 64 may be actuated via depression of an actuator 62 at housing 52, whereby inward movement of actuator 62 contacts and actuates switch 64, as can be seen in FIG. 5. Optionally, the mirror assembly may include a movable or removable cover or plug, which could be moved or removed from the opening in housing 52 to provide access to the switch 64, without affecting the scope of the present invention. Mirror assembly 50 further includes an electrical connector 66 on printed circuit board 60 for connecting an electrical wire or harness (not shown) to provide electrical connection from the vehicle to the mirror assembly and compass system. The wire may extend down from the headliner of the vehicle and through an opening 68 in housing 52 of mirror assembly 50 to connect to connector 66.

As described above, adjustment of the mirror housing (that includes the mirror reflective element) about its pivot connection to its support (typically a double-ball support arm as described above, although a single-ball support arm can also be used, without affecting the scope of the present invention) to the windshield (or to a header region at the joint of the windshield and the roof of the interior cabin of the vehicle) can cause the compass direction sensing sensor attached to the rear of the mirror reflective element to also move. Thus, the compass control circuitry may detect a change in sensed compass directional signal (for example, about 3 degrees to about 8 degrees or thereabouts) when the mirror is adjusted by a driver of the vehicle. Should the vehicle be heading in a direction that is close to half-way between one octant or another in an 8-octant resolving compass display system, this adjustment by the driver of the mirror housing to set the rearward field of view of the mirror reflective element to suit that driver's needs/preference (typically occurring when the driver starts the journey) may cause the heading displayed to the driver to change from, for example, NW to N because the adjustment by the driver of the mirror housing has changed the orientation/alignment of the compass sensor (for example, a magnetoresistive sensor) relative to the Earth's magnetic field. Modern automatic automotive compass control systems, such as those described in U.S. Pat. Nos. 4,546,551; 5,699,044; 4,953,305; 5,576,687; 5,632,092; 5,644,851; 5,708,410; 5,737,226; 5,802,727; 5,878,370; 6,087,953; 6,173,501; and 6,222,460, U.S. patent application Ser. No. 09/540,702, filed Mar. 31, 2000 by Schierbeek et al. for VEHICLE COMPASS COMPENSATION, now U.S. Pat. No. 6,513,252, and European patent application, published Oct. 11, 2000 under Publication No. EP 0 1043566, which are all hereby incorporated herein by reference, comprise processing circuitry that includes compensation methods that correct for such changes in sensed compass heading. Thus, and as indicated in co-pending U.S. patent application Ser. No. 09/999,429, filed Nov. 15, 2001 by DeLine et al. for INTERIOR REARVIEW MIRROR SYSTEM INCORPORATING A DIRECTIONAL INFORMATION DISPLAY, now U.S. Pat. No. 6,642,851, such known compensation methods can be used to recalibrate the compass mirror system of the present invention after adjustment of the mirror housing by the driver.

Techniques and methods for compensating for such adjustments such as suggested in U.S. Pat. No. 6,418,376 (the entire disclosure of which is hereby incorporated herein by reference) may be used in conjunction with the present invention, but are less desirable as such use a position sensor (such as a tilt sensor) that determines displacement of the mirror housing with respect to a generally horizontal plane, and thus can add cost to the product. Likewise, the techniques and methods described in U.S. Pat. Nos. 6,140,933 and 6,023,229, which are hereby incorporated herein by reference, can add cost to the product.

For the low-cost prismatic mirrors of the present invention (note though that many of the aspects or inventions of the present invention may optionally be used when an electro-optic reflective element, such as an electrochromic reflective element, is used), it is preferred not to use the techniques and methods of those patents cited in the preceding paragraph, but instead it is preferred to use an algorithmic technique whereby, when an abrupt change in detected heading is detected that is characteristic of an adjustment of the mirror housing by the driver of the vehicle, then the automatic compass circuitry changes its calibration status from its ongoing state (that compensates for such heading changes over a prolonged period, and one that typically may span an ignition cycle of the vehicle or several vehicle ignition cycles) to a more aggressive, faster calibration stage that more rapidly, and preferably within that same ignition cycle, recalibrates the compass system and so compensates for the driver's adjustment of the mirror housing/casing and for the concomitant movement of the compass sensor housed therein.

Figure 6:
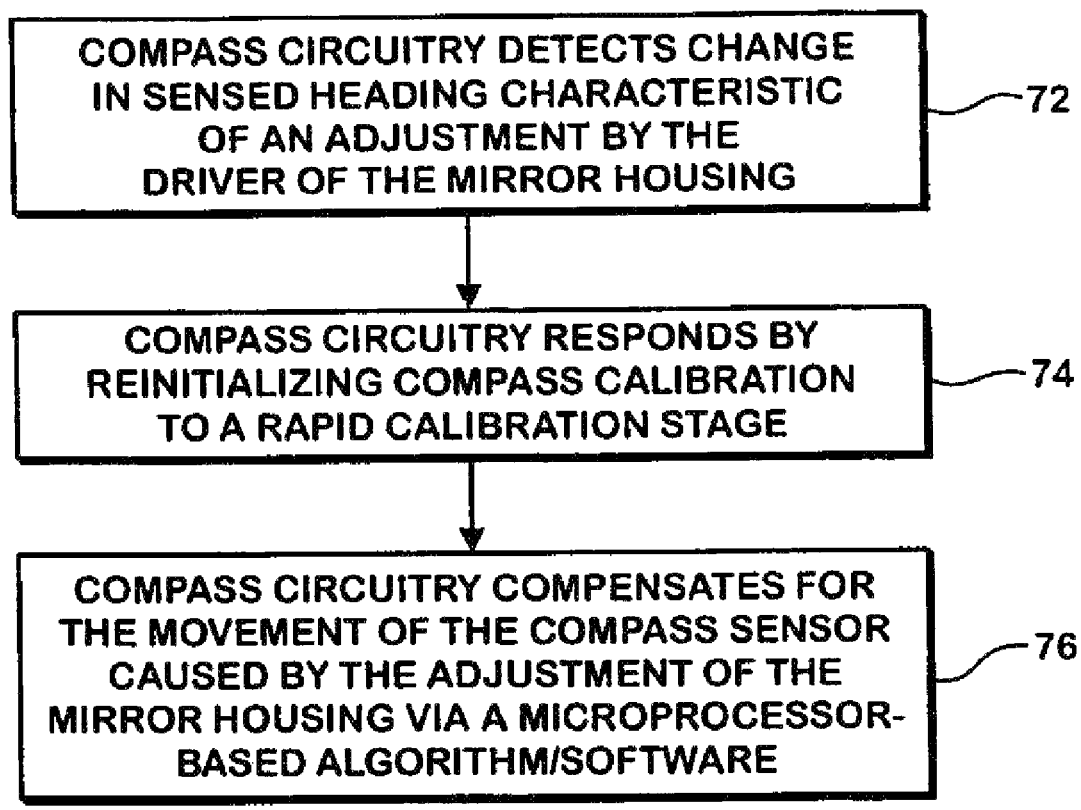
FIG. 6 is a flow diagram of a compass calibration process in accordance with the present invention.

Thus, for example, when a change in compass heading is detected that is indicative of and characteristic of an adjustment of the mirror housing by the driver (such adjustment causes an abnormal change of the compass output that is different, such as by magnitude and/or rate of change, than what would occur during normal driving), then the calibration changes to a faster compensation algorithm/method. Thus, and referring to U.S. patent application Ser. No. 09/540,702, filed Mar. 31, 2000 by Schierbeek et al. for VEHICLE COMPASS COMPENSATION, now U.S. Pat. No. 6,513,252, which is hereby incorporated herein by reference, upon detection of a change in compass heading that is indicative of and characteristic of an adjustment of the mirror housing by the driver, the calibration of the compass system would reinitiate back from Cal-3 (or Cal-2) to the beginning of Cal-1. A flow diagram of this is shown in FIG. 6. Note that a mechanical element such as a mechanical movement detector can be used to detect adjustment by the driver of the mirror housing, and the recalibration can be initiated in response to a signal output of such a mechanical element.

As shown in FIG. 6, a compass compensation process 70 may provide for initialization of a rapid calibration stage in response to movement of the mirror housing. The compass circuitry may be operable to detect a change in the sensed heading which is characteristic of an adjustment of the mirror housing by a driver of the vehicle at 72. The compass circuitry then responds by reinitializing compass calibration to a rapid calibration stage at 74. The compass circuitry then compensates for the movement of the compass sensor caused by the adjustment of the mirror housing via a microprocessor-based algorithm/software at 76. After completion of the rapid calibration stage, the compass circuitry may return to its normal operation.

Optionally, the compass circuitry/software can set or return to the beginning of a rapid calibration stage (such as to the beginning of Cal-1 as described above) each time the mirror compass circuitry is initially powered, such as by a fresh ignition cycle of the vehicle. Thus, for example, should a driver or occupant of the vehicle adjust the interior rearview mirror orientation during the immediately previous ignition cycle, and thus potentially disturb the established proper compass calibration, then an aggressive and rapid recalibration may automatically occur at the start of the following or next ignition cycle (and thus any potential calibration misalignment may only be temporarily experienced by the driver).

Also, and optionally, a glare sensor and/or an ambient light sensor and electrochromic automatic dimming circuitry (such as described in commonly assigned U.S. Pat. Nos. 4,793,690 and 5,193,029, which are hereby incorporated herein by reference) can be included in the compass system and/or mirror assembly of the present invention. The ambient light sensor and glare sensor may be positioned such that the ambient sensor and glare sensor are both facing into the interior cabin of the vehicle. The ambient sensor may be angled and thus sampling light in a direction which is generally different from the glare sensor so it differentiates from glare detection. For example, the ambient sensor may be directed generally upward toward the ceiling of the vehicle, while the glare sensor is directed generally rearwardly. The ambient sensor and glare sensor may both be positioned on the printed circuit board within the mirror housing and behind the glass or reflective element and looking through the glass or reflective element, such as through a transparent window or region, as discussed above.

Figure 7:
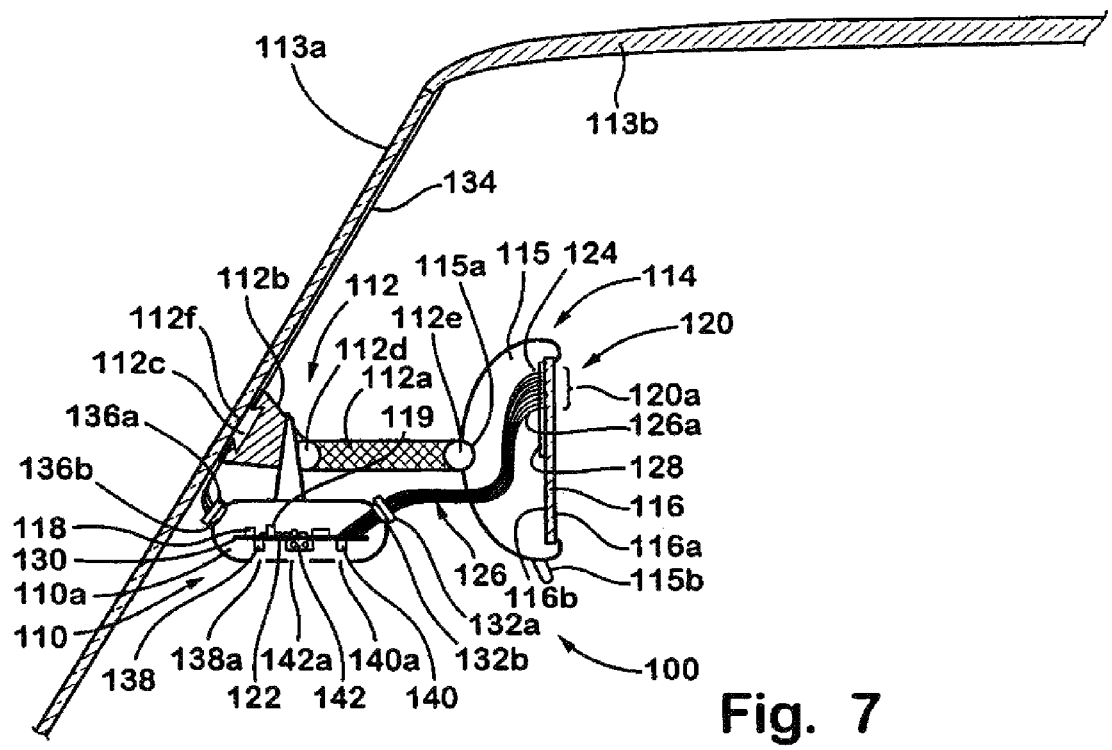
FIG. 7 is a side elevation and partial sectional view of a compass system in accordance with the present invention, with a compass module mounted at an interior rearview mirror assembly of a vehicle.
Figure 7A:
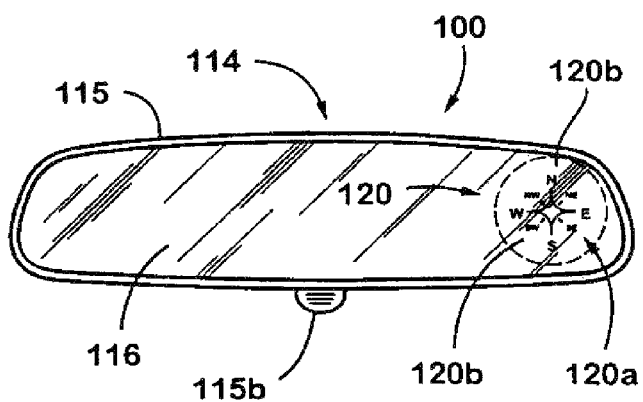
FIG. 7A is a forward facing elevation of the mirror assembly of FIG. 7.

Referring now to FIGS. 7 and 7A, an interior rearview mirror system 100 includes a compass module or pod 110 that is generally fixedly mounted at a mirror mounting arrangement 112 of an interior rearview mirror assembly 114 of a vehicle. Mirror assembly 114 includes a casing 115 and a reflective element 116 adjustably mounted to the vehicle by the mirror mounting arrangement 112, which may include a mounting arm 112a and a double ball or single ball mounting arrangement mounted to a mirror mount 112b, as is known in the mirror art. Compass module 110 includes a compass sensor 118, a microprocessor 119 and compass control circuitry 122, which may include compensation circuitry and the like. The microprocessor 119 and compass control circuitry 122 are in electrical communication with a display 120 mounted or positioned at the reflective element 116 or casing 115 of the mirror assembly 114. The microprocessor 119 and compass control circuitry 122 may be operable to illuminate or energize one or more illumination sources 124 of display 120 to illuminate a corresponding port or light transmitting region 120b, such as a character or letter or icon or the like 120b at a display area 120a (FIG. 7A) to display a directional heading of the vehicle or other information to a driver of the vehicle, as discussed below.

Mirror casing 115 may be adjustably or pivotally mounted to mirror mount 112b via a double ball or double pivot mirror mounting arrangement, which includes a mounting arm 112a pivotally mounted at to mirror mount 112b (mounted at the windshield 13a or headliner 113b of the vehicle, such as at a mounting button 112c, which may be adhered or otherwise bonded or secured to the interior surface of the windshield 113a of the vehicle, such as by using suitable adhesives 112f or the like) at one pivot joint 112d and to a mirror casing mount 115a at another pivot joint 112e. An example of a double pivot or double ball mounting arrangement is disclosed in commonly assigned U.S. Pat. Nos. 4,646,210 and 6,331,066, which are hereby incorporated herein by reference. Preferably, the mirror mounting components provide a breakaway type connection or mount, such as the types disclosed in U.S. Pat. Nos. 6,172,613; 6,087,953; 5,820,097; 5,377,949; and/or 5,330,149, which are hereby incorporated herein by reference.

Reflective element 116 may comprise a prismatic reflective element. The prismatic reflective element 116 may be formed from various materials such as plastic or glass, but preferably is glass, and preferably has a planar front surface 116a extending at an angle to a planar rear surface 116b. Rear surface 116b is preferably coated with a reflective layer of metal such as chromium, aluminum or alloys thereof as is conventionally known in the industry. The mirror casing 115 is pivotable, such as via a toggle or flip mechanism 115b or the like, relative to mounting arm 112a and mirror mount 112b to pivot the reflective surface 116b in order to reduce glare during nighttime conditions, as is known in the mirror art.

Display 120 provides a display region 120a, which is preferably positioned at reflective element 116 (as best shown in FIG. 7A) and is operable to display a directional heading of the vehicle in response to compass control circuitry 122, as discussed below. Alternately, however, display 120 may be positioned elsewhere on the mirror assembly, such as at an eyebrow or chin or bezel portion or the like, or elsewhere in the vehicle, without affecting the scope of the present invention.

The display ports or icons or characters or indicia or the like 120b of display 120 may include characters or indicia or the like representative of the cardinal and intercardinal directional points (such as, for example, the characters N, NE, E, SE, S, SW, W, NW, as shown in FIG. 7A) or may include characters or indicia or the like representative of only the cardinal directional points (such as, for example, the characters N, S, E, W, as shown in FIGS. 8A-12A) formed or etched in the reflective film coating of the reflective element 116 (and forming a transparent window therein). By etching or demarcating the ports or indicia representative of compass headings into the mirror reflector coating of the reflective element, and hence creating a substantially or fully transparent window therein or therethrough, the reflective element itself forms part of the display element.

Display region 120a provides an indication of the directional information on reflective element 116, and is preferably positioned at an upper right hand quadrant of the reflective element (although the display region may be positioned elsewhere on the reflective element or elsewhere on the mirror assembly, without affecting the scope of the present invention). The ports or characters or letters 120b may be sandblasted or laser created or chemically etched or otherwise applied or formed on the rearward surface of the reflective element, such as via techniques such as disclosed in commonly assigned U.S. Pat. No. 4,882,565, issued to Gallmeyer on Nov. 21, 1989, which is hereby incorporated herein by reference. Optionally, however, the display of the present invention may be a display on demand type of display, such as disclosed in commonly assigned U.S. Pat. Nos. 5,668,663 and 5,724,187, and U.S. patent application Ser. No. 10/054,633, filed Jan. 22, 2002 by Lynam et al. for VEHICULAR LIGHTING SYSTEM, now U.S. Pat. No. 7,195,381; and Ser. No. 09/793,002, filed Feb. 26, 2001, entitled VIDEO MIRROR SYSTEMS INCORPORATING AN ACCESSORY MODULE, now U.S. Pat. No. 6,690,268, the entire disclosures of which are hereby incorporated by reference herein, without affecting the scope of the present invention.

In the illustrated embodiment of FIGS. 7 and 7A, display 120 includes eight illumination sources 124, such as light emitting diodes (LEDs), such as described in U.S. patent application Ser. No. 10/054,633, filed Jan. 22, 2002 by Lynam et al. for VEHICULAR LIGHTING SYSTEM, now U.S. Pat. No. 7,195,381, which is hereby incorporated herein by reference, or any other light emitting devices, positioned behind and aligned with respective or corresponding ones of the ports, such as the eight directional characters or points 120b. Preferably, the illumination sources or light emitting diodes 124 are positioned on a display block or printed circuit board 128 mounted at or secured or bonded to the rear surface of the reflective element 116. Each illumination source 124 is positioned behind the reflective element and aligned with a corresponding one of the ports or characters 120b of display 120. Each individual illumination source 124 may be energized, either alone or in combination with one or more of the other illumination sources, to emit light through, and thus provide illumination or back lighting of, the respective transparent or partially transparent or light transmitting port or ports, such as the respective character or characters, indicia or icons 120b of display region 120a, such that the ports or characters are backlit by the respective illumination sources, in order to convey directional information or other information (discussed below) to the driver of the vehicle, in response to energizing or powering of a corresponding wire of cable 126 by microprocessor 119 and/or compass control circuitry 122, as discussed below.

Preferably, illumination sources 124 comprise individual light emitting diodes. The illumination sources may be high intensity illumination sources which may be operable in response to a low current input, preferably less than approximately 50 mA, and more preferably less than approximately 20 mA. Preferably, the illumination sources are highly visible to the driver of the vehicle when they are illuminated, even in high ambient lighting conditions, such as in a convertible on a sunny day. Each illumination source 124 may comprise a blue light emitting diode, such as an OSRAM LBT673-M2N2-35 light emitting diode or the like, which is particularly visible in such high ambient lighting conditions. However, other color illumination sources may be implemented, such as red, yellow, amber or any other color, without affecting the scope of the present invention.

Each illumination source 124 of display 120 is energized in response to a power input from microprocessor 119 via a respective wire 126a of a connector cable 126, such that microprocessor 119 activates or energizes or powers a particular wire or wires of the connector cable to activate or energize or power a corresponding illumination source or sources 124 of display 120, as discussed below. Preferably, microprocessor 119 has sufficient current handling capability so that the microprocessor can directly address and power or energize the illumination sources of display 120. Alternately, the illumination sources 124 may be controlled from microprocessor 119 via a single transistor or the like or via a restricted/economical circuit, such as a simple, low cost, low component count circuit that ties each of the individual illumination sources directly to an individual output port/lead/channel of the microprocessor 119. The microprocessor 119 thus has direct connection to the illumination sources, which may require between 1 and 5 volts and between approximately 10 mA and 50 mA each. Accordingly, the microprocessor is preferably selected to provide at least four or eight channels with such power handling capability, depending on the number of illumination sources provided at the display, as discussed below.

Compass module 110 may be generally fixedly mounted to mirror mount 112b, such as by utilizing the principles disclosed in U.S. Pat. Nos. 5,708,410 and/or 5,576,687, which are hereby incorporated herein by reference. Compass module 110 may include a printed circuit board (PCB) 130 which is mounted or positioned within a housing 110a of module 110, such as generally horizontally within housing 110a, as shown in FIG. 7. The microprocessor 119 and all of the compass control circuitry 122, including the compass compensation circuitry/software and the like, and compass sensor 118 may be positioned on printed circuit board 130. Because compass module 110 may be generally fixedly mounted to mirror mount 112b, the housing 110a, circuit board 130 and the associated compass sensors 118, microprocessor 119 and compass control circuitry 122 thus may be generally fixedly mounted relative to the mirror mount 112b, and thus relative to the vehicle. Accordingly, additional compensation circuitry or algorithms or devices for approximating or canceling any adjustment or repositioning of the compass sensors and circuitry are not necessary.

Microprocessor 119 and/or compass circuitry 122 are in electrical communication with each illumination source 124 of display 120 via cable 126, which comprises multiple individual wires 126a connected between the printed circuit board 130 of compass module 110 and the illumination sources 124 of display 120 (or the display block or circuit board 128 of reflective element 116). The cable 126 may be conduited along and through the support arm 112a and into casing 115 or may otherwise be routed from compass module 110 to mirror casing 115, without affecting the scope of the present invention.

In the illustrated embodiment of FIGS. 7 and 7A, cable 126 comprises nine individual wires 126a, with one wire connecting between a particular output of microprocessor 119 and a corresponding particular illumination source 124 of display 120. Eight of the wires 126a thus may individually provide power to a respective illumination source 124, such that when one of the wires 126a is energized by microprocessor 119, the corresponding illumination source 124 will be energized or actuated to illuminate the appropriate corresponding port or character 120b of display 120. The ninth wire of cable 126 may be provided as a return or ground wire from display 120 or display block or circuit board 128 to circuit board 130 of compass module 110. The cable 126 may be connected to circuit board 130, such as via a plug connector 132a and a corresponding socket connector 132b, such as at casing or housing 110a of compass module 110, to ease assembly and connection of the compass module 110 to the mirror mount 112b and to the display 120, as discussed below. An appropriate opening (not shown) may be formed in casing 115 of mirror assembly 114 for cable 126 to pass therethrough to connect to display 120 and compass module 110, as can be seen in FIG. 7.

Because compass module 110 is suitable for implementation with a low cost mirror assembly, which may not contain or include electrical components and circuitry, a wire harness or cable 134 may be provided to connect compass module 110 to the vehicle battery and/or ignition. The wire harness 134 may extend down from the headliner 113b of the vehicle and connect to compass module 110 and circuit board 130, such as via a plug connector 136a and a corresponding socket connector 136b (as shown in FIG. 7) or the like. Wire harness 134 provides power to circuit board 130, and may provide power only when the ignition of the vehicle is on. Optionally, the wire harness 134 may provide power and/or control to other accessories or devices (such as the accessories discussed below) positioned at, near or within the compass module 110 and/or the mirror assembly 114, without affecting the scope of the present invention.

The compass sensor 118 of compass module 110 functions to detect a directional heading of the vehicle relative to the earth's magnetic field, as is known in the art. Compass sensor 118 may be any known sensor type, such as a magnetoresponsive sensor, such as a magnetoresistive sensor (such as described in U.S. Pat. Nos. 6,427,349; 5,802,727; and 5,255,442, and U.S. patent application Ser. No. 09/540,702, filed Mar. 31, 2000 by Schierbeek et al. for VEHICLE COMPASS COMPENSATION, now U.S. Pat. No. 6,513,252, which are hereby incorporated herein by reference), a magnetocapacitive sensor, a magnetoinductive sensor, or a flux-gate sensor or the like, without affecting the scope of the present invention. The compass sensor may include a pair of magnetoresponsive sensors positioned generally orthogonal to one another. The pair of generally orthogonal sensors are preferably oriented relative to the vehicle such that one of the sensors is generally parallel to the floor of the vehicle and pointing generally forwardly in the direction of travel of the vehicle, while the other is generally orthogonal or perpendicular to the first sensor.

The compass sensor or sensors 118 may provide an output signal to compass processing circuitry 122, which may be operable to process the output signal to determine the vehicle heading and to actuate or control or adjust an output of display 120 via microprocessor 119 in response to the output signal of sensor 118. Such processing circuitry may include various compensation methods, such as described in U.S. Pat. Nos. 4,546,551; 5,699,044; 4,953,305; 5,576,687; 5,632,092; 5,644,851; 5,708,410; 5,737,226; 5,802,727; 5,878,370; 6,087,953; 6,173,501; and 6,222,460, and U.S. patent application Ser. No. 09/999,429, filed Nov. 15, 2001 by DeLine et al. for INTERIOR REARVIEW MIRROR SYSTEM INCORPORATING A DIRECTIONAL INFORMATION DISPLAY, now U.S. Pat. No. 6,642,851, and European patent application, published Oct. 11, 2000 under Publication No. EP 0 1043566, which are all hereby incorporated herein by reference.

Microprocessor 119 and compass control circuitry 122 may be operable to energize or power (or make hot) one of the wires 126a of cable 126, in order to provide power to an appropriate, corresponding illumination source 124 of display 120, such that the appropriate illumination source may be illuminated, and thus the appropriate port or icon or character or indicia 120b may be illuminated, to indicate the directional heading of the vehicle at display 120. Accordingly, each illumination source 124 of display 120 may be independently actuated or energized via electrical power provided by a respective wire of the connector cable in response to microprocessor 119.

In applications where the display may include only the four cardinal point characters N, S, E, W (or icons or indicia or the like representative of the four cardinal directional points), such as shown in FIGS. 8-12 discussed below, then the compass control circuitry and microprocessor may be operable to individually or simultaneously energize one or two wires of the cable (which may be a four or five wire cable) to illuminate an appropriate one or two characters, without affecting the scope of the present invention. For example, if the directional heading is generally north, then the single wire to the illumination source behind the N character may be powered, while if the directional heading is generally northeast, then the wires to both of the illumination sources behind the N and the E may be powered.

Microprocessor 119 and compass control circuitry 122 thus include processing circuitry which may be operable to actuate or energize one or more of the illumination sources 124 in response to an output from the compass sensor or sensors 118. For example, the illumination source behind the letter N may be energized or actuated when the vehicle is heading generally Northward and within a particular range of Northward. As discussed above with respect to mirror assembly 10, each respective one of the illumination sources may be illuminated when the vehicle is within a predetermined range of the particular direction at the respective cardinal point (N, S, E, W) or inter-cardinal point (NE, SE, SW, NW).

Compass module 110 and circuit board 130 may also include a calibration button or switch 138 and a zone button or switch 140 for manually triggering a calibration mode and zone setting mode, respectively, of the compass circuitry 122. An access hole or holes 138a and 140a for accessing calibration button 138 and zone button 140 or other button or buttons or the like (such as for initiating calibration of the compass system if needed or to set a zone of the compass system as needed, as is known in the compass art), may be provided in housing 110a for manual access of the buttons or switches associated with compass circuitry 122 or compass module 110. Correspondingly, the owner or driver of the vehicle may access one or more user control buttons (such as for manual actuation of a compass calibration mode or the like) through openings in the compass module casing, such as with their finger, a pen or other instrument or the like. Preferably, any such openings are provided on the casing for accessing connectors and buttons and the like on the printed circuit board within the compass module casing.

Circuit board 130 may also include a photo detector or sensor 142, such as a photo transistor, a photo resistor, a photo diode or the like, which may be operable to sense the ambient light intensity levels surrounding the mirror assembly or the light from headlights of vehicles rearward of the subject vehicle. The photosensor 142 preferably is positioned or mounted on the printed circuit board 130 and may be positioned, aligned and directed to receive illumination through an aperture or hole 142a in the housing 110a of compass module 110. The photosensor 142 is operable to detect the ambient light levels generally surrounding the compass module 110 and the mirror assembly 114 in order to provide for dimming of the output of illumination sources 124 of display 120 in darkened lighting conditions, such as at nighttime conditions, in order to reduce the intensity of display 120 to reduce glare and distraction and annoyance to the driver of the vehicle. The photosensor 142 may comprise a silicon photosensor, such as a TSL235R Light-to-Frequency converter (available from Texas Advanced Optoelectronic Solutions Inc. of Plano, Tex.). Such light-to-frequency converters comprise the combination of a silicon photodiode and a current-to-frequency converter on a single monolithic CMOS integrated circuit. Such light-to-frequency converters have the advantage of being operable to directly provide input to the microprocessor 119, thus simplifying circuitry and reducing costs. Alternately, light-to-digital output (such as pulse width modulation or serial output) photosensors can be used, such as are known in the art. As described above and hereunder, microprocessor 119 may receive inputs directly from whatever transducers are involved, such as from a light-to-frequency converter, compass sensor or sensors, user input switches and/or the like, and, having processed the inputs to provide a compensated compass heading corrected for the geographic zone involved, may directly power the illumination sources of the display. Further, the microprocessor may be operable to perform other functions as well, without affecting the scope of the present invention.

Photosensor 142 may provide an output signal directly to microprocessor 119, such as via a frequency input or pulse-width modulated signal, or serial digital signal or other digital signal or the like. Microprocessor 119 and control circuitry 122 thus may be operable in response to photosensor 142 to reduce the intensity of light emitted by the illumination sources or light emitting diodes 124 as the ambient light detected adjacent to compass module 110 reduces in intensity so that the display intensity is reduced at dusk/night so as to limit or reduce or avoid glaring a driver of the vehicle when in use such as during nighttime driving. Optionally, such dimming of the display 120 may be performed in response to an instrument panel dimming system of the vehicle, without affecting the scope of the present invention. The printed circuit board 130 may include other electronic components, such as integrated circuits, resistors, capacitors, diodes and/or the like.

Optionally, and preferably, when a near infrared sensitive photosensor, such as the silicon photodiode described above, is utilized, a near infrared absorbing filter may be disposed in front of the photosensor to reduce the intensity of near infrared/infrared radiation incident on the photosensor detector surface, and thus reduce the intensity of solar near infrared radiation and/or headlamp near infrared radiation incident on the photosensor detector surface. In this regard, it is preferred that a lens, such as an optical lens or the like, that includes an infrared filter be utilized, such as can be economically achieved by adding near infrared/infrared absorbing compounds (such as disclosed in U.S. Pat. Nos. 6,117,370; 5,959,105 and 5,024,923, which are hereby incorporated herein by reference) into an optical lens material, such as an acrylic or polycarbonate or polystyrene or the like. More preferably, the near infrared/infrared filtering compound may be added to or compounded with the transparent optical lens material during an injection molding operation (i.e., the near infrared/infrared filtering compound and the optical molding resin are mixed together, injected into the molding tool cavity, and thus formed into the substantially visible light transmitting, reduced near infrared/infrared transmitting, optical lens/filter). For example, a filter, lens, light pipe, light conduit or the like can be formed from an optical molding resin (such as acrylic, polycarbonate, CR39, cyclic olefin copolymer, polystyrene or the like) that may include a near infrared absorbing dihydroperimidine squarylium compound or the like, or can be, for example, formed of an acrylic or similar optical resin material containing a phosphoric acid-group containing a metal ion (such as, for example, a bivalent copper ion or the like). Alternately, a diammonium compound can be used or a dithiol-nickel complex can be used. Alternately, a glass filter utilizing a phosphate glass can be used or near infrared/infrared absorbing filters can be used, such as described in U.S. Pat. No. 4,799,768, which is hereby incorporated herein by reference. Also, and optionally, the near infrared filter can be integrally molded with or otherwise established with the photosensor device so that the photosensor device can be obtained from a photosensor supplier with the infrared filter absorbing compound incorporated into/compounded into the lens cover provided with the photosensor device. Or, alternatively, a separate and distinct near infrared filtering lens or light conduit or light pipe (formed by molding as described above to include near infrared absorbing material) can be provided as a separate part from the photosensor device.

Optionally, as discussed above with respect to the processing circuitry of mirror assembly 10, compass control or microprocessor 119 and processing circuitry 122 may also be operable to activate one or more of the illumination sources 124 to convey other information to the driver of the vehicle via display 124. For example, if the compass system is in a calibration mode, one or more, or all four or eight, of the illumination sources may be illuminated or may be flashed until the calibration of the compass system is complete (clearly, other combinations of illumination may be implemented, without affecting the scope of the present invention). Also, the microprocessor 119 may be operable to convey information pertaining to the calibration mode or zone setting mode for a particular zone in which the vehicle is located via display 120, in a similar manner as discussed above. Optionally, as also discussed above, display 120 may include an additional indicator or indicators (not shown), such that when the additional indicator is illuminated or energized by microprocessor 119, the meaning of or the information conveyed by the combination of display characters being illuminated changes to a second set of meanings, in order to double the amount of information that may be conveyed by the display 120. It is envisioned that other information may be conveyed via display 120 and optionally one or more additional indicators may be provided, without affecting the scope of the present invention.

Because microprocessor 119 and control circuitry 122 are operable to provide electrical power to one or more illumination sources of the display, no encoding or decoding of the signal is required at display 120 to provide a correct display output in response to the signal from compass control circuitry 122 and microprocessor 119. The present invention thus obviates the need for such costly processing and thus provides a low cost compass module and display system for providing directional information to a driver of a vehicle. Additionally, because the circuitry and microprocessor and circuit board are within the module or pod which is remote from the mirror assembly, the mirror assembly may comprise a lighter mirror assembly, which may result in reduced vibration over conventional compassized mirror assemblies.

Figure 8:
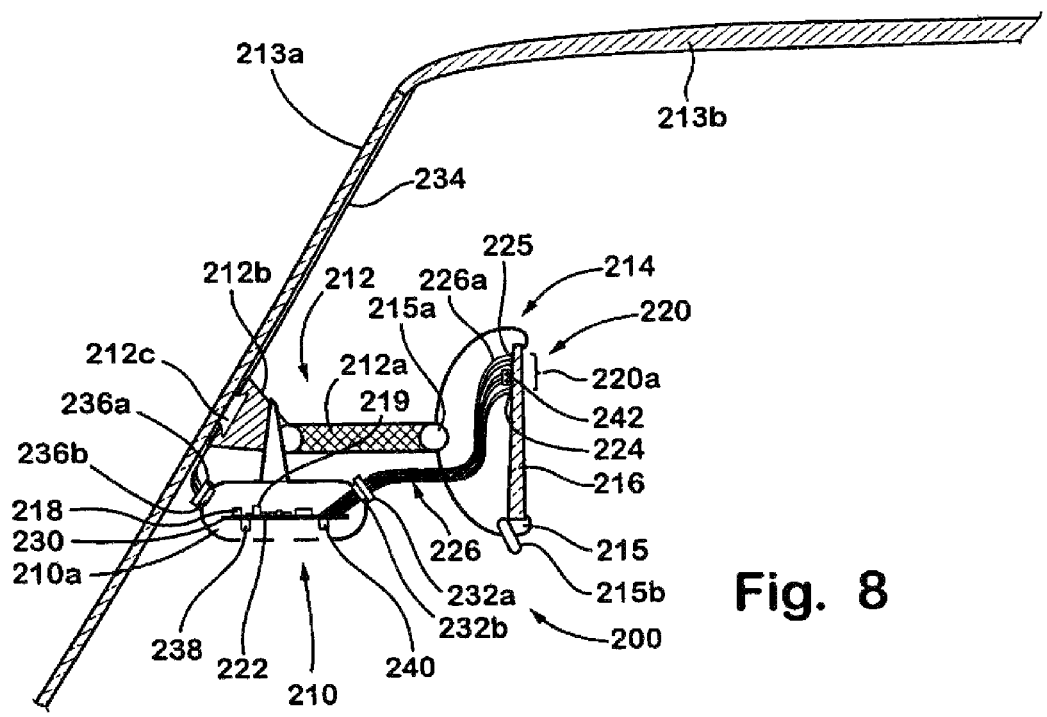
FIG. 8 is a side elevation and partial sectional view of another compass system in accordance with the present invention, with a compass module mounted on a prismatic interior rearview mirror assembly of a vehicle.
Figure 8A:
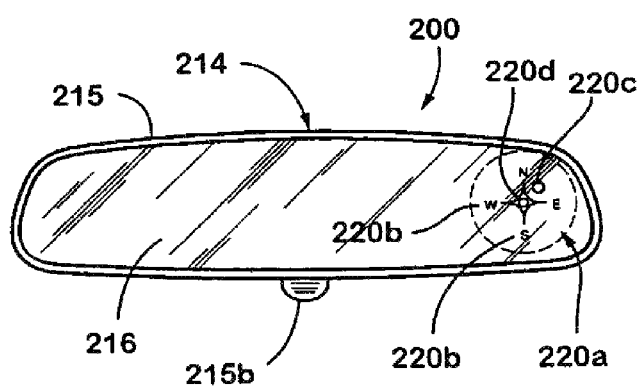
FIG. 8A is a forward facing elevation of the mirror assembly of FIG. 8.

Referring now to FIGS. 8 and 8A, an interior rearview mirror system 200 includes a compass pod or module 210 that is generally fixedly mounted at a mirror mount 212b of a prismatic interior rearview mirror assembly 214 of a vehicle. Mirror assembly 214 includes a casing 215 and a prismatic reflective element 216 adjustably mounted to mirror mount 212b, such as via a mounting arm 212a and a double ball or single ball mounting arrangement, as is known in the mirror art. Compass module 210 includes a compass sensor 218, a microprocessor 219 and compass control circuitry 222, which includes compensation circuitry and the like, similar to compass module 110 discussed above. The microprocessor 219 and compass control circuitry 222 are in electrical communication with a display 220 mounted or positioned at the reflective element 216 or casing 215 of the mirror assembly 214, and are operable to illuminate or energize one or more illumination sources 224 of display 220 to illuminate a corresponding light transmitting port 220b, which may comprise a character or letter or icon or the like, to display a directional heading of the vehicle to a driver of the vehicle. Each illumination source 224 of display 220 may be energized in response to a power input from microprocessor 219 via a respective wire 226a of a connector cable 226, such that microprocessor 219 may activate or energize or power a particular wire or wires of the connector cable to activate or energize or power a corresponding illumination source or sources 224 of display 220, as discussed above.

Mirror assembly 214 and compass module 210 of mirror system 200 are substantially similar to mirror assembly 114 and compass module 110 of mirror system 100 discussed above, such that a detailed discussion of the mirror assembly and compass module will not be repeated herein. The common components of the compass modules and mirror assemblies are shown in FIGS. 8 and 8A with the reference numbers of mirror assembly 114 and compass module 110 having 100 added thereto.

Display 220 provides a display region 220a operable to display a directional heading of the vehicle in response to microprocessor 219 and compass control circuitry 222. Display 220 includes a plurality of illumination sources 224, such as light emitting diodes and such as blue light emitting diodes, such as an OSRAM LBT673-M2N2-35 light emitting diode or the like, operable to illuminate one or more ports or regions or appropriate characters or letters 220b (FIG. 8A) to indicate the direction in which the vehicle is driving. The display ports or characters 220b of display 220 include only the four cardinal directional points (such as, for example, the characters N, S, E, W) formed or etched in the reflective film coating of the reflective element 216 (and forming a transparent window therein).

Display 220 may include a calibration indicator or illumination source 225, such as a light emitting diode, and preferably a red, yellow or amber light emitting diode, and a corresponding calibration indicator view port 220c at display area 220a, such that light emitted from indicator 225 is viewable through view port 220c at reflective element 216. Display 220 may also include an ambient light photosensor 242 for sensing ambient light at the reflective element 216, while display area 220a includes a photosensor port 220d, such as at a central region of the compass display, through which photosensor 242 receives light surrounding reflective element 216.

Microprocessor 219 and compass circuitry 222 on printed circuit board 230 within compass module 210 are in electrical communication with each illumination source 224, 225 and photosensor 242 of display 220 via cable 226, which preferably comprises a multiwire cable having multiple individual wires 226a connected between the printed circuit board 230 and the illumination sources 224, 225 and photosensor 242 (or the display block or circuit board 228 of reflective element 216). In the illustrated embodiment of FIGS. 8 and 8A, cable 226 comprises seven individual wires 226a, with one wire connecting between a particular output of microprocessor 219 and a corresponding particular illumination source 224, calibration indicator 225 or photosensor 242. Four of the wires 226a thus may individually provide power to a respective illumination source 224, such that when one of the wires 226a is energized by microprocessor 219, the corresponding illumination source 224 will be energized or actuated to illuminate the appropriate corresponding character 224b of display 220. Likewise, if two wires 226a are energized or made hot, two illumination sources 224 may be energized, such as the illumination sources behind the N and E characters of display 220, so as to indicate to the driver of the vehicle that the vehicle is heading in a northeasterly direction. Another wire 226a may connect between microprocessor 219 and calibration indicator 225, such that indicator 225 may be energized in a similar manner as discussed above. The remaining two wires 226a of cable 226 are connected between microprocessor 219 and photosensor 242 to provide an output of photosensor 242 to microprocessor 219.

Each illumination source 224 may be energized, either alone or in combination with one or more of the other illumination sources, to provide illumination of or through the respective port or ports (or letter or letters) 220b of display region 220a, such that the ports or characters are backlit or illuminated by the respective illumination sources, in order to convey directional information or other information to the driver of the vehicle, in response to energizing or powering of a corresponding wire of cable 226 by microprocessor 219 and/or compass control circuitry 222. Indicator 225 likewise may be energized to provide illumination through view port 220c to indicate to the driver of the vehicle that the compass circuitry is operating in its calibration mode. Microprocessor 219 and/or compass circuitry 222 may be operable to adjust the intensity of the illumination sources 224 and indicator 225 in response to photosensor 242.

Figure 9:
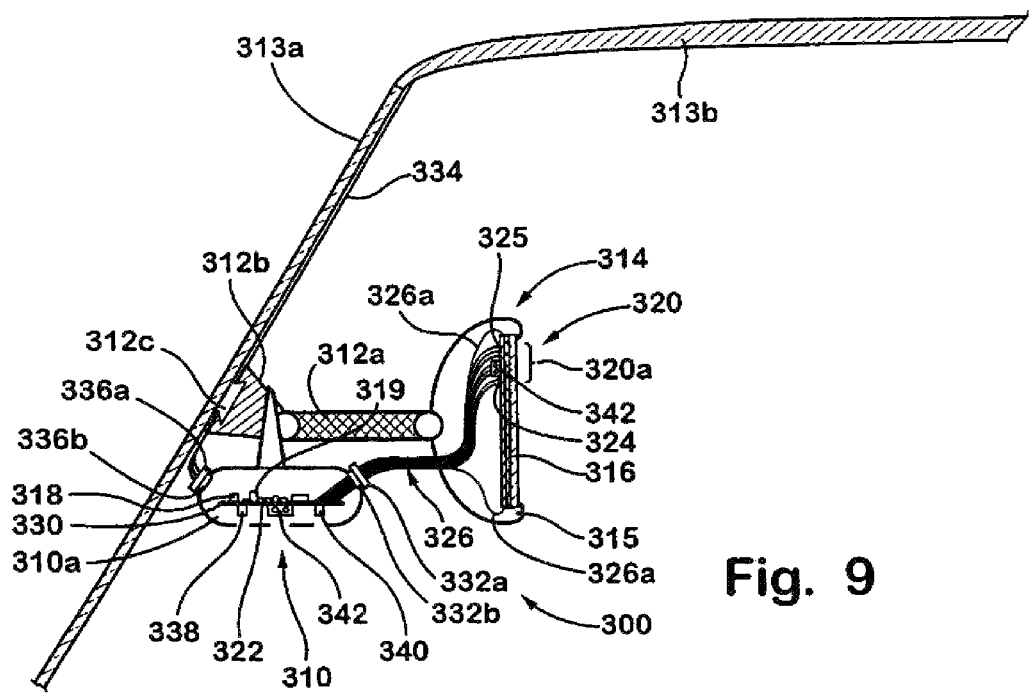
FIG. 9 is a side elevation and partial sectional view of another compass system in accordance with the present invention, with a compass module mounted on an electro-optic interior rearview mirror assembly of a vehicle.
Figure 9A:
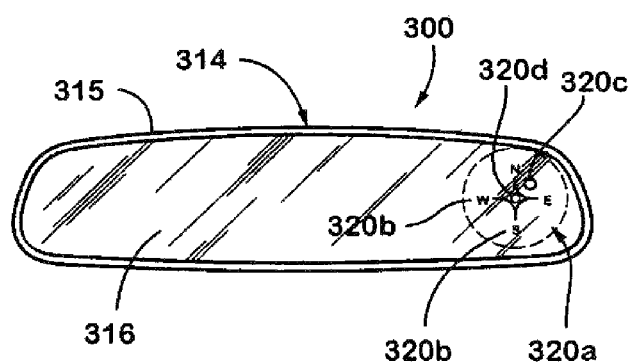
FIG. 9A is a forward facing elevation of the mirror assembly of FIG. 9.

Referring now to FIGS. 9 and 9A, an interior rearview mirror system 300 includes a compass pod or module 310 that is generally fixedly mounted at a mirror mount 312b of an electro-optic interior rearview mirror assembly 314 of a vehicle. Mirror assembly 314 includes a casing 315 and an electro-optic reflective element 316 adjustably mounted to mirror mount 312b (which may be mounted to or at the windshield 313a, such as at a mounting button 312c adhered or bonded or otherwise affixed to the windshield, or headliner 313b of the vehicle), such as via a mounting arm 312a and a double ball or single ball mounting arrangement, as is known in the mirror art. Compass module 310 includes a compass sensor 318, a microprocessor 319 and control circuitry 322, which includes the compass and display control circuitry and compass compensation circuitry and the like, similar to compass module 110 discussed above. Control circuitry 322 may also include electro-optic reflective element automatic dimming or powering circuitry, and microprocessor 319 may be further operable to control the electro-optic reflective element 316 via flowing electricity across reflective element 316 to darken the electrochromic medium as desired or in response to photosensors 343, 342, discussed below.

Advantageously, the microprocessor of the present invention thus may perform multiple functions, such as receive inputs from a compass sensor and/or temperature sensor or the like, and process the input and generate an appropriate output signal. Optionally, the microprocessor may control an electro-optic dimming device, and may do so in response to an input from one or more photosensors or the like.

Mirror assembly 314 and compass module 310 of mirror system 300 are substantially similar to mirror assembly 114 and compass module 110 of mirror system 100 discussed above, such that a detailed discussion of the mirror assembly and compass module will not be repeated herein. The microprocessor 319 and compass control circuitry 322 are in electrical communication with a display 320 mounted or positioned at the reflective element 316 or casing 315 of the mirror assembly 314, and are operable to illuminate or energize one or more illumination sources 324 of display 320 to illuminate a corresponding port or region or character, letter, icon or indicia 320b of a display region 320a to display a directional heading of the vehicle to a driver of the vehicle. Each illumination source 324 of display 320 may be energized in response to a power input from microprocessor 319 and/or compass control circuitry 322 via a respective wire 326a of a connector cable 326, such that microprocessor 319 may activate or energize or power a particular wire or wires of the connector cable to activate or energize or power a corresponding illumination source or sources 324 of display 320, as discussed above.

Display 320 includes a calibration indicator or illumination source 325 and a corresponding calibration indicator view port 320c at display area 320a, such that light emitted from indicator 325 is viewable through view port 320c at reflective element 316. Display 320 also includes a glare detecting photosensor 343 for sensing or detecting headlamps of a vehicle that is approaching the subject vehicle from the rear, while display area 320a includes a photosensor port 320d, such as at a central region of the compass display, through which photosensor 343 receives light surrounding reflective element 316.

In the illustrated embodiment of FIGS. 9 and 9A, cable 326 comprises nine individual wires 326a, with one wire connecting between a particular output of microprocessor 319 and a corresponding particular illumination source 324, calibration indicator 325 or photosensor 343. Four of the wires 326a thus may individually or in combination provide power to one or more respective illumination sources 324, as discussed above. Another wire 326a may connect between microprocessor 319 and calibration indicator 325, such that indicator 325 may be energized in a similar manner as discussed above. Also, two wires 326a of cable 326 are connected between microprocessor 319 and photosensor 343 to provide an output of photosensor 343 to compass circuitry 322. The remaining two wires 326a may be connected to the connectors or bus bars (not shown) of the electro-optic reflective element 316 to provide a flow of electricity across reflective element 316 to darken the electrochromic medium as desired or in response to photosensors 343, 342.

Microprocessor 319 and control circuitry 322 include the electro-optic reflective element automatic dimming powering circuitry, and are thus operable to control or automatically dim or darken the electro-optic element 316 in response to the glare detecting photosensor 343 at reflective element 316 and/or the ambient light photosensor 342 at compass module 310. Microprocessor 319 and control circuitry 322 may also be operable to adjust the intensity of the illumination sources 324 and indicator 325 in response to glare detecting photosensor 343 and/or an ambient light photosensor 342. The photosensor 342 and/or 343 may thus be operable in conjunction with the electro-optic reflective element automatic dimming circuitry and with the night time dimming of the illumination sources 324 and/or 325. Preferably, microprocessor 319 has sufficient current handling capability to directly address the illumination sources 324, 325 of display 320. However, the illumination sources may be controlled by microprocessor 319 via a single transistor or the like, without affecting the scope of the preset invention.

Photosensors 342, 343 may directly feed to microprocessor 319, such as via a frequency input or a pulse width modulated signal, or a serial digital signal or other digital signal or the like. The glare detecting photosensor 342 may comprise a rearward viewing glare detector or sensor, while photosensor 342 may comprise a forward viewing and/or sideward viewing ambient light detector or sensor, such as described in U.S. Pat. No. 4,793,690, which is hereby incorporated herein by reference. Optionally, photosensors 342, 343 may comprise a silicon photosensor, such as a TSL235R Light-to-Frequency converter (available from Texas Advanced Optoelectronic Solutions Inc. of Plano, Tex.). Such light-to-frequency converters comprise the combination of a silicon photodiode and a current-to-frequency converter on a single monolithic CMOS integrated circuit. Optionally, the microprocessor of compass module 310 may be operable in response to a single photosensor, such as described in U.S. Pat. No. 5,193,029, which is hereby incorporated herein by reference, without affecting the scope of the present invention.

Similar to compass module 110, cable 326 of compass module 310 may be connected to circuit board 330 via a plug connector 332a and a corresponding socket connector 332b or the like to ease assembly and connection of the compass module 310 to the mirror mount 312b and to the display 320, as discussed below. Likewise, similar to compass module 310, a wire harness or cable 334 may be provided to connect compass module 310 to the vehicle battery and/or ignition. The wire harness 334 may extend down from the headliner 313b of the vehicle and connect to compass module 310 and circuit board 330 via a plug connector 336a and a corresponding socket connector 336b or the like. Wire harness 334 provides power to circuit board 330, and may provide power only when the ignition of the vehicle is on. Optionally, the wire harness 334 may provide power and/or control to other accessories or devices (such as the accessories discussed below) positioned at, near or within the compass module 310 and/or the mirror assembly 314, without affecting the scope of the present invention. Also similar to compass module 110, discussed above, compass module 310 and circuit board 330 may also include a calibration button or switch 338 and a zone button or switch 340 for manually triggering a calibration mode or a zone setting mode or resetting the compass circuitry 322.

Because the microprocessor 319 and control circuitry 322 are operable to provide electrical power to one or more illumination sources of the compass display, no encoding or decoding of the signal is required to provide a correct compass display output in response to the signal from microprocessor 319. The present invention thus obviates the need for such costly processing and thus provides a low cost compass module and display system for providing directional information to a driver of a vehicle. Also, because microprocessor 319 provides the controls for an electro-optic reflective element, no such circuitry is required within the mirror case 315, such that a low cost prismatic interior rearview mirror assembly may be converted to an electro-optic mirror assembly by providing an electro-optic or electrochromic reflective element within the casing.

The compass and electrochromic circuitry module 310 may thus be incorporated at or near or with a mirror assembly which may not include the electrochromic circuitry (such as a mirror assembly designed to be a prismatic mirror assembly). An electrochromic reflective element may be snapped into or otherwise mounted or installed to the mirror assembly, in order to transform the mirror assembly into an electro-optic or electrochromic mirror assembly with a compass display. The microprocessor of compass module 310 may then control the electrochromic reflective element via the multiwire cable connection. The output of the microprocessor may also control an outside electrochromic mirror as well as the interior rearview electrochromic mirror, without affecting the scope of the present invention.

Figure 10:
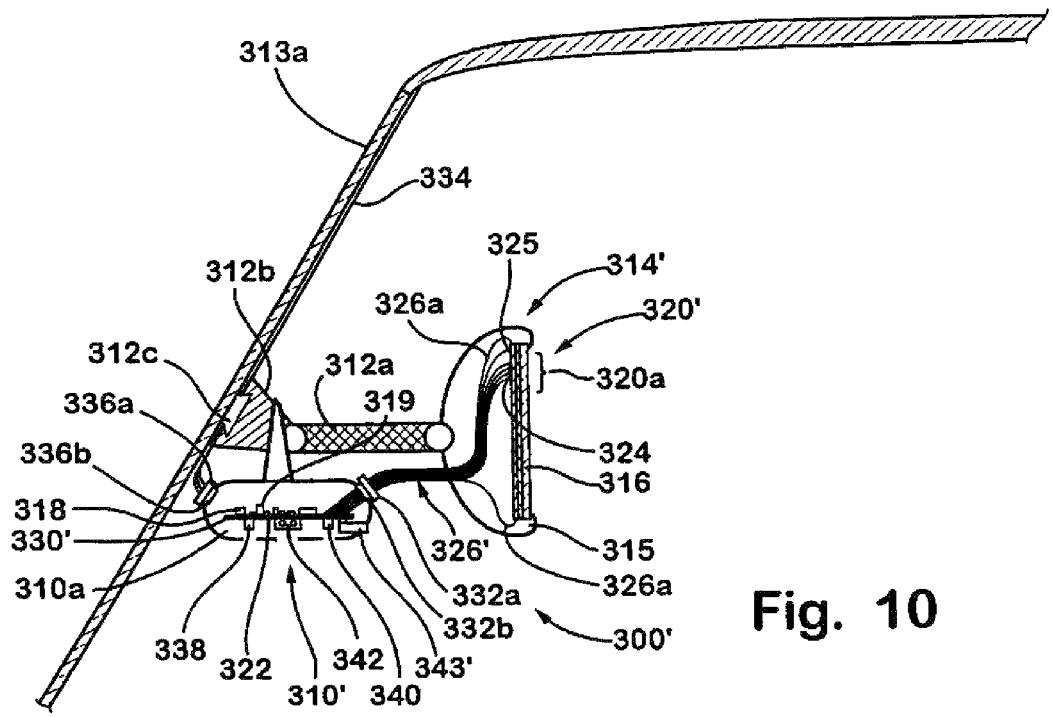
FIG. 10 is a side elevation and partial sectional view of another compass system in accordance with the present invention, with a compass module mounted on an electro-optic interior rearview mirror assembly of a vehicle.
Figure 10A:
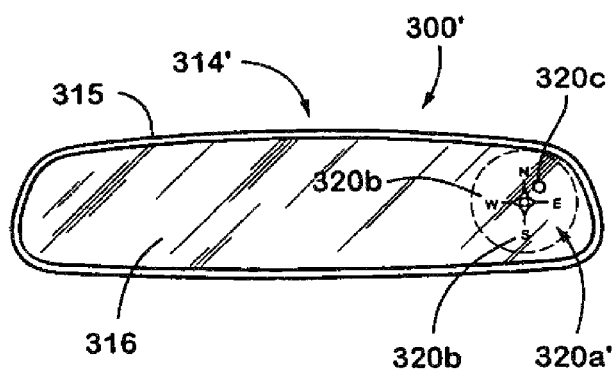
FIG. 10A is a forward facing elevation of the mirror assembly of FIG. 10.

Referring now to FIGS. 10 and 10A, an interior rearview mirror system 300' includes a compass pod or module 310' that is generally fixedly mounted at a mirror mount 312*b* of an electro-optic interior rearview mirror assembly 314' of a vehicle. Mirror assembly 314' and compass module 310' of mirror system 300' are substantially similar to mirror assembly 314 and compass module 310 of mirror system 300 discussed above, such that a detailed discussion of the mirror assembly and compass module will not be repeated herein. The common components of the mirror systems are shown in FIGS. 10 and 10A with the same reference numbers as assigned to the respective components in FIGS. 9 and 9A. Compass module 310' includes a glare detecting photosensor 343' for sensing ambient light at the compass module. Microprocessor 319, compass circuitry 322 and photosensor 343' are positioned on circuit board 330 within compass module 310'.

Display 320' provides a display region 320*a*' operable to display a directional heading of the vehicle in response to microprocessor 319 and compass control circuitry 322. Display 320' includes a plurality of illumination sources 324 operable to illuminate one or more appropriate ports or light transmitting regions 320*b*, which may define characters, letters, icons or other indicia or the like, to indicate the direction in which the vehicle is driving. Display 320' also includes a calibration indicator or illumination source 325 and a corresponding calibration indicator view port 320*c* at display area 320*a*, such that light emitted from indicator 325 is viewable through view port 320*c* at reflective element 316.

In the illustrated embodiment of FIGS. 10 and 10A, cable 326' comprises eight individual wires 326*a*, with one wire connecting between a particular output of microprocessor 319 and a corresponding particular illumination source 324 and calibration indicator 325. Four of the wires 326*a* thus may individually or in combination provide power to one or more respective illumination sources 324, as discussed above. Another wire 326*a* may connect between microprocessor 319 and calibration indicator 325, such that indicator 325 may be energized in a similar manner as discussed above. Another wire may then act as a return or ground wire from the illumination sources to the circuit board 330'. The remaining two wires 326*a* may be connected to the connectors or bus bars (not shown) of the electro-optic reflective element 316 to provide a flow of electricity across reflective element 316 to darken the electrochromic medium as desired or in response to photosensors 343', 342.

Similar to compass module 310, discussed above, microprocessor 319 of compass module 310' may be operable to control or energize the illumination sources 324, 325 via cable 326' in response to control circuitry 322. Microprocessor 319 may be further operable to adjust the intensity of illumination sources 324, 325 in response to photosensor 342. Also, microprocessor 319 may be operable to control or adjust the dimming or darkening of electro-optic reflective element 316 in response to glare detecting photosensor 343' and ambient sensing photosensor 342. The photosensors 342 and/or 343' may thus be operable in conjunction with the electro-optic reflective element automatic dimming circuitry and with the night time dimming of the illumination sources 324 and/or 325.

Figure 11:
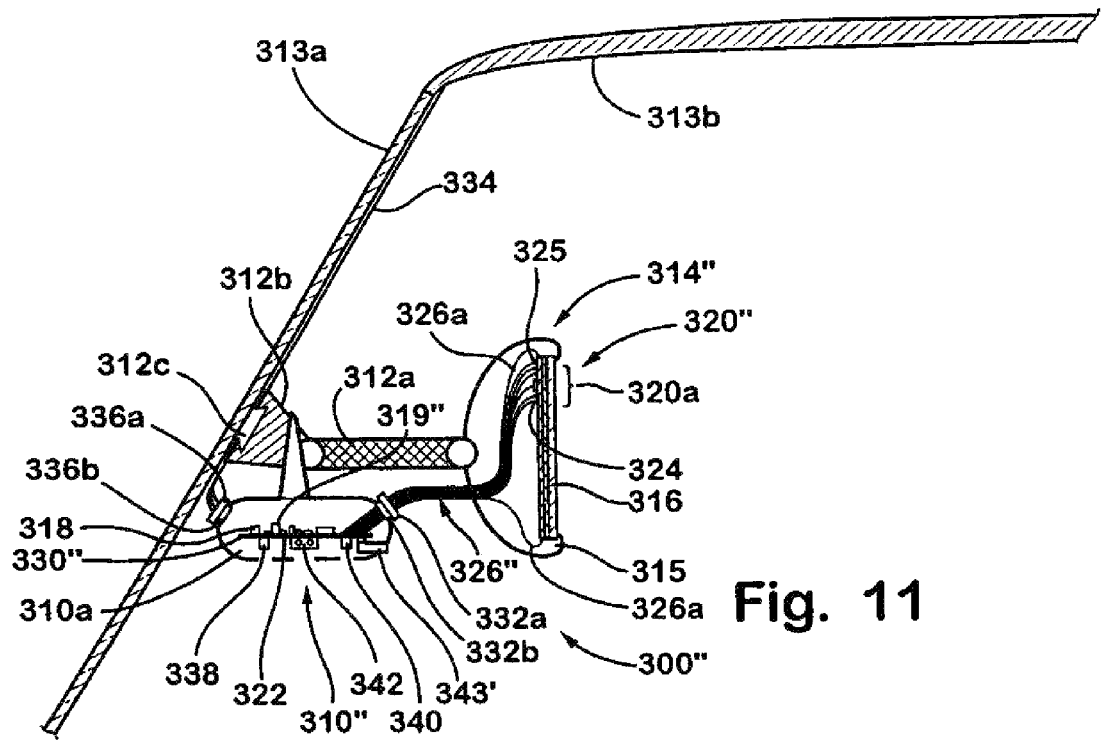
FIG. 11 is a side elevation and partial sectional view of another compass system in accordance with the present invention, with a compass module mounted on an electro-optic interior rearview mirror assembly of a vehicle.
Figure 11A:
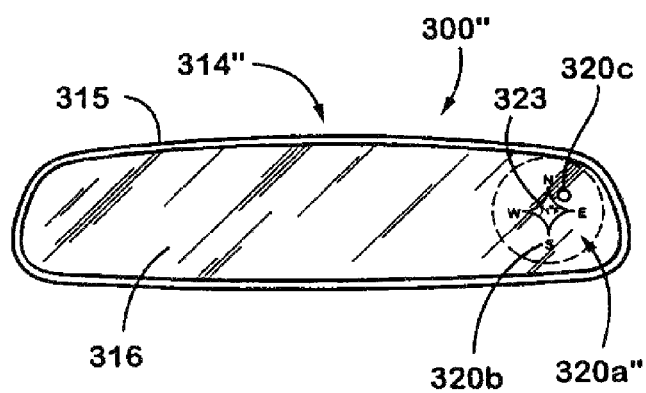
FIG. 11A is a forward facing elevation of the mirror assembly of FIG. 11.

Referring now to FIGS. 11 and 11A, an interior rearview mirror system 300" includes a compass pod or module 310" that is generally fixedly mounted at a mirror mount 312*b* of an electro-optic interior rearview mirror assembly 314" of a vehicle. Mirror assembly 314" and compass module 310" of mirror system 300" are substantially similar to mirror assembly 314 and compass module 310 of mirror system 300 discussed above, such that a detailed discussion of the mirror assembly and compass module will not be repeated herein. The common components of the mirror systems are shown in FIGS. 11 and 11A with the same reference numbers as assigned to the respective components in FIGS. 9 and 9A.

A display 320" provides a display region 320*a*" operable to display a directional heading of the vehicle in response to compass control circuitry 322. Display 320" includes a plurality of illumination sources 324 operable to illuminate one or more appropriate ports or light transmitting regions 320*b*, which may define characters, letters, icons, indicia or the like, to indicate the direction in which the vehicle is driving. Display 320" also includes a calibration indicator or illumination source 325, such as a light emitting diode, and preferably a red, yellow or amber light emitting diode, and a corresponding calibration indicator view port 320*c* at display area 320*a*, such that light emitted from indicator 325 is viewable through view port 320*c* at reflective element 316.

Display 320" further includes a temperature display 323, such as at a generally central region of display area 320*a*". Microprocessor 319" is operable to receive an input from a temperature sensor (not shown), which may be positioned within the vehicle (such as within the compass module) to provide an interior temperature reading or outside of the vehicle cabin to provide an exterior temperature reading. Compass module 310" and microprocessor 319" are operable to control temperature display 323 to display an interior or exterior temperature to the driver of the vehicle at display area 320*a*" in response to the temperature sensor. The compass module 310" of mirror system 300" thus provides a low cost temperature display to an interior rearview mirror assembly of a vehicle. Although shown and described as comprising a temperature display 323, it is envisioned that other display information, characters, indicia or other accessories may be provided at the display, such as discussed below, without affecting the scope of the present invention.

Temperature display 323 may comprise one of many types of displays, such as a vacuum fluorescent (VF) display, a light emitting diode (LED) display, an organic light emitting diode (OLED) display, a liquid crystal display (LCD), an electroluminescent (EL) display, a video screen display or the like. Optionally, however, the temperature display may comprise a display on demand type of display, such as disclosed in commonly assigned U.S. Pat. Nos. 5,668,663 and 5,724,187, and U.S. patent application Ser. No. 10/054,633, filed Jan. 22, 2002 by Lynam et al. for VEHICULAR LIGHTING SYSTEM, now U.S. Pat. No. 7,195,381; and Ser. No. 09/793,002, filed Feb. 26, 2001, entitled VIDEO MIRROR SYSTEMS INCORPORATING AN ACCESSORY MODULE, now U.S. Pat. No. 6,690,268, the entire disclosures of which are hereby incorporated by reference herein, without affecting the scope of the present invention. For economy, a liquid crystal display may be preferred.

Similar to compass module 310', compass module 310" includes a glare detecting photosensor 343' for sensing ambient light at the compass module. Microprocessor 319" and compass circuitry 322 are mounted to or positioned on a printed circuit board 330" and are in electrical communication with photosensor 343' and may also be operable to adjust the intensity of illumination sources 324, 325 and/or to adjust the dimming or darkening of electro-optic reflective element 316 in response to glare detecting photosensor 343' and ambient sensing photosensor 342. The photosensor 342 and/or 343' may thus be operable in conjunction with the electro-optic reflective element automatic dimming circuitry and with the night time dimming of the illumination sources 324 and/or 325.

In the illustrated embodiment of FIGS. 11 and 11A, cable 326" comprises nine individual wires 326a, with one wire connecting between a particular output of microprocessor 319" and a corresponding particular illumination source 324 and calibration indicator 325. Four of the wires 326a thus may individually or in combination provide power to one or more respective illumination sources 324, while a fifth wire 326a connects between microprocessor 319" and calibration indicator 325, as discussed above. Two wires 326a may connect between microprocessor 319" and temperature display 323. The remaining two wires 326a may be connected to the connectors or bus bars (not shown) of the electro-optic reflective element 316 to provide a flow of electricity across reflective element 316 to darken the electrochromic medium as desired or in response to photosensors 343', 342.

Figure 12:
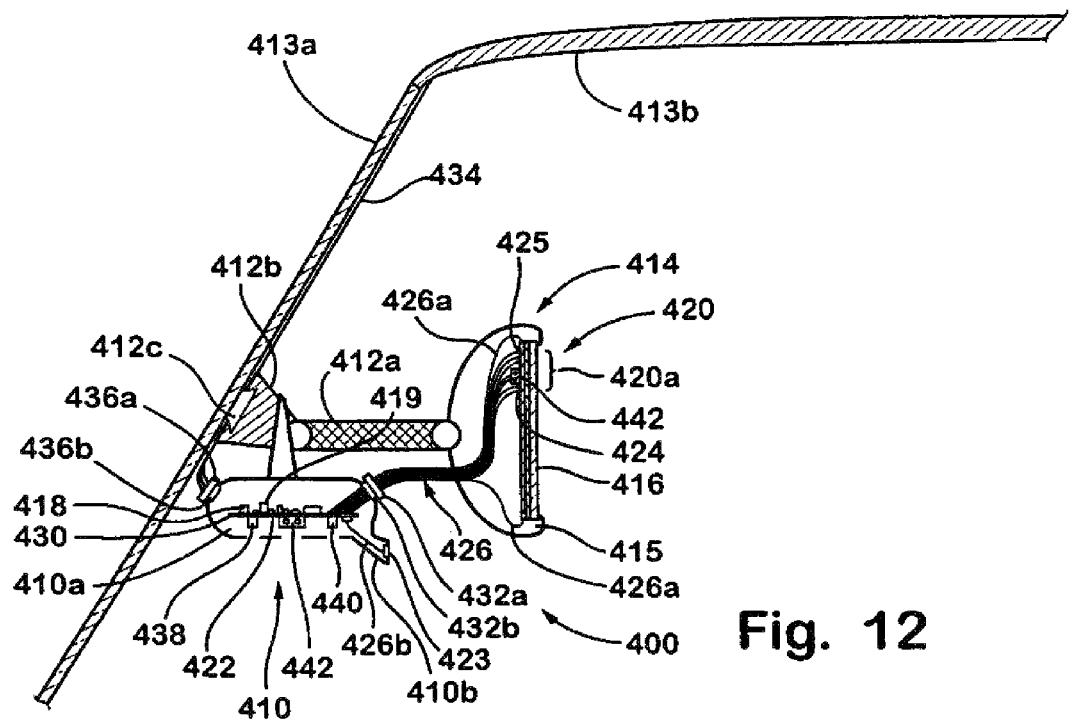
FIG. 12 is a side elevation and partial sectional view of another compass system in accordance with the present invention, with a compass module mounted on an electro-optic interior rearview mirror assembly of a vehicle.
Figure 12A:
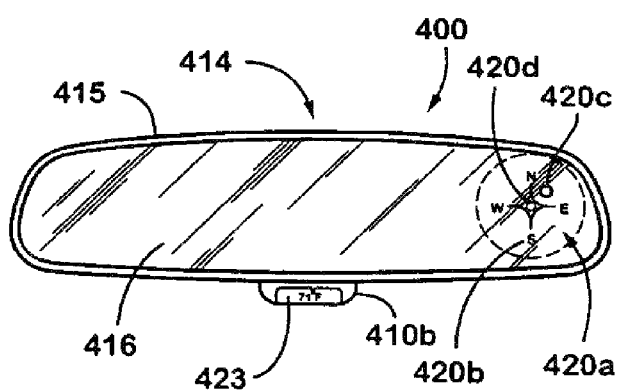
FIG. 12A is a forward facing elevation of the mirror assembly and compass module of FIG. 12.

Referring now to FIGS. 12 and 12A, an interior rearview mirror system 400 includes a compass pod or module 410 that is generally fixedly mounted at a mirror mount 412b of an electro-optic interior rearview mirror assembly 414 of a vehicle. Mirror assembly 414 includes a casing 415 and an electro-optic reflective element 416 adjustably mounted to mirror mount 412b, such as via a mounting arm 412a and a double ball or single ball mounting arrangement, as is known in the mirror art. Compass module 410 includes a compass sensor 418, a microprocessor 419 and compass control circuitry 422, which includes compensation circuitry and the like, similar to compass module 310 discussed above. Microprocessor 419 and compass control circuitry 422 may be operable to control a display 420 at reflective element 416 via wires 426a, and may dim or adjust the intensity of the illumination sources 424, 425 of display 420, and may dim or adjust dimming or darkening of electro-optic reflective element 416 in response to glare detecting photosensor 443 and ambient sensing photosensor 442, such as in the manner described above. Mirror assembly 414 and compass module 410 of mirror system 400 are substantially similar to mirror assembly 314 and compass module 310 of mirror system 300 discussed above and as shown in FIGS. 9 and 9A, such that a detailed discussion of the mirror assembly and compass module will not be repeated herein. The common components of the compass modules and mirror assemblies and mirror systems are shown in FIGS. 12 and 12A with the reference numbers of mirror assembly 314 and compass module 310 of mirror system 300 having 100 added thereto.

Compass module 410 includes a temperature display 423 positioned at module housing 410a to display a measured temperature to the driver of the vehicle. In the illustrated embodiment, temperature display 423 is positioned at a lower portion or extension 410b of module 410 and is positioned so as to be viewable beneath the mirror assembly 414 by a driver of the vehicle, as can be seen in FIG. 12A. By positioning the temperature display 423 in the compass module 410, compass module 410 may provide an additional display, while the display 420 at reflective element 416 may include glare detecting photosensor 443, without requiring additional wiring to the mirror casing or controls within the mirror casing. Although shown and described as comprising a temperature display 423, it is envisioned that the compass module of the present invention may provide other auxiliary or additional display or displays, such as a tire pressure display, a passenger side inflatable restraint (PSIR) status display, a time display or clock, a seat belt status display, a door status display, an accessory status display, or other accessory status or the like or other display information, characters, indicia or the like, or other accessories or the like or an illumination source or light source at the compass module, such as discussed below, without affecting the scope of the present invention.

Microprocessor 419 is operable to receive an input from a temperature sensor (not shown), which may be positioned within the vehicle (such as within the compass module) to provide an interior temperature reading or outside of the vehicle to provide an exterior temperature reading. Compass module 410 and microprocessor 419 are operable to control temperature display 423 (such as via one or more wires 426b connected to temperature display 423) to display an interior or exterior temperature to the driver of the vehicle in response to the temperature sensor. The compass module 410 thus provides a low cost temperature display to an interior rearview mirror assembly of a vehicle. Additionally, because microprocessor 419 and circuit board 430 are operable to control temperature display 423, which is positioned at compass module 410, a temperature display (or other display or accessory, as discussed below) may be provided at the interior rearview mirror assembly, without requiring any additional circuitry and controls within the mirror casing.

Although shown and described as providing a generally rosette shaped compass display with four or eight illumination sources and ports for indicating a directional heading of the vehicle, clearly other quantities or combination or arrangement of illumination sources and ports of the display may be implemented without affecting the scope of the present invention. Also, each illumination source may not require its own separate port, since multiple illumination sources may emit illumination or illuminate or back light respective areas of a single port such as to form an illuminated character or icon or indicia or the like via selective activation of multiple illumination sources. It is also envisioned that a reconfigurable multi-pixel or multi-element display element (such as a liquid crystal or electroluminescent or light emitting diode display element or the like) may be provided, wherein each pixel or particular groups of pixels may be independently energized or illuminated to form the desired character or icon or symbol or indicia of the like to indicate or display the directional heading or other information to the driver or occupant of the vehicle. For example, certain pixels of a multi-pixel display (often referred to as a dot matrix display) may be independently energized to form an "N" or "NE" indication (or any other indicia or character or icon to convey the desired information) on the display. Each pixel of the multi-pixel array or display may be positioned adjacent to a respective port in the reflective element or at least some of the pixels of the multi-pixel display may be positioned adjacent to a single port in the reflective element. Optionally, the multi-pixel display may be positioned elsewhere at the mirror assembly (such as at the bezel portion or chin of the mirror assembly) or at the accessory module, without affecting the scope of the present invention. The pixels may be independently energized via multiple wires connected between the individual pixels or groups of pixels and the microprocessor (which may be located at the compass module or the like), or they may be independently energized via display addressing circuitry at the display (such as at a printed circuit board at or adjacent to the display area), which may be powered by and in communication with the microprocessor or the like and/or compass circuitry (which may be located at the compass module or the like). The pixels of the multi-pixel reconfigurable display may comprise liquid crystal elements, vacuum fluorescent (VF) elements, electroluminescent (EL) elements, or light emitting diodes (LEDs) or the like. The multi-pixel display thus may provide a reconfigurable pixelated array which includes a plurality of pixels that may be selectively energized to form the desired character, symbol, icon, indicia or the like to convey the desired information to the driver or occupant of the vehicle.

Therefore, the present invention thus provides a low cost compass mirror and establishes the display of the compass directional headings at the reflective element of the mirror assembly. The compass system may only require a power supply, such as a 12 volt power supply, from the vehicle, and does not require encoding or decoding of the signal from the compass circuitry to the display.

The compass module and compass system of the present invention may be implemented as part of an interior rearview mirror assembly supplied to a vehicle manufacturer and installed in a particular vehicle which includes a compass mirror option. It is further envisioned that the compass module and system may be supplied to a mirror assembler or supplier as a kit. The kit may include a compass pod or module as described above (and with appropriate mounting configuration for mounting to the desired mirror mount) and a display block or circuit board having an electrical connector and illumination sources for the display (and other display devices, such as a temperature display or the like), and may or may not include the reflective element having the characters or icons or indicia sandblasted, etched or otherwise formed thereon.

The mirror assembler may purchase the compass kit (and attach the display block to an adapted reflective element, such as by suitable adhesives or the like, such that the illumination sources are aligned with the respective characters formed on the reflective element) and install the reflective element into the housing or casing of the mirror assembly, and mount the compass pod to the mirror mount. The connector cable from the display may be routed through an opening in the mirror casing and plugged into the corresponding connector at the self-contained, stand alone, low cost compass module. An operator thus may incorporate, such as via popping or snapping, the display and reflective element into the casing with minimal extra customization and cost to the casing and thus to the overall mirror assembly. The illumination source block or display block (or a printed circuit board having the illumination sources thereon) of the compass display may be sized to fit within the interior space of standard casings, such that minimal changes or modifications to the casing are necessary. For example, the case may be modified or made to have a hole or passageway for passing the connector cable to connect the display to the circuit board of the compass module, but may otherwise be the same as for noncompassized mirror assemblies.

Optionally, the compass display may be inserted into or installed or backloaded into the mirror casing after the reflective element has been attached thereto (such as via snapping the reflective element into the bezel portion of the casing substantially immediately after molding or heating of the casing and while the casing and bezel portion are warm and pliable), such as disclosed in U.S. provisional application Ser. No. 60/471,546, filed May 19, 2003 by Uken et al. for MIRROR ASSEMBLY FOR VEHICLE, which is hereby incorporated herein by reference. The compass display thus may be mounted to or attached to one or more casing cap portions, which may be snapped or otherwise attached to the rear portion of the casing, such that the compass display components are positioned within the casing and generally adjacent to or against the rear surface of the reflective element. The casing for the mirrors thus may comprise a common casing, whereby corresponding reflective elements and cap portions (with the appropriate circuitry/components/accessories/etc.) may be installed or attached to the common mirror casings.

It is envisioned that the compass sensor (such as a magnetoresistive sensor or a magnetoinductive sensor or the like) or compass circuitry or system or other circuitry or system or accessory of the rearview mirror system or rearview mirror assembly or accessory module of the present invention may be operable in communication or cooperation with circuitry and components of a global positioning system (GPS) of the vehicle. Alternately, the global positioning system of the vehicle can serve as the directional sensing means, and thus may obviate the need for a magnetoresponsive sensor or the like in the vehicle that detects local earth's magnetic fields. As described below, the global positioning system of the vehicle can calculate or deduce the directional heading of the vehicle by deducing such from geographical positional point-to-point data as the vehicle moves across the earth's surface (without any regard to the local earth's magnetic field or any local vehicle magnetic field), and optionally a magnetoresponsive sensor that is responsive to the earth's magnetic field can be used to fill in any gaps, such as may occur in urban canyons or the like, that may occur in the GPS-driven calculation of the vehicle directional heading. Because the magnetoresponsive sensor, such as a magnetoresistive sensor, a magnetoinductive sensor or the like, may thus be an auxiliary sensor to the main or primary GPS-derived compass system, algorithms and complexities known for compass calibration and/or for obviation of vehicle deviating fields and/or for obviation of the affects of stray external magnetic anomalies (and/or for compensation of deviations in vehicle magnetic fields, such as may occur as the vehicle ages or the like) need not be utilized.

The vehicular global positioning system may comprise an in-vehicle GPS antenna and a GPS receiver/signal processor that receives a satellite communication to determine the geographic location of the vehicle, as is known in the art. Such global positioning system receivers/processors, sometimes referred to as a GPS chip set, are available from various suppliers, such as, for example, Motorola of Schaumburg, Ill.

and Trimble Navigation of Sunnyvale, Calif. By deduction of the point-to-point locational movement of the vehicle, the directional heading (e.g., N, S, E, W, etc., which may be displayed as characters, icons, indicial or other indicators or the like) of the vehicle can be deduced, and this directional heading may be displayed to a driver or occupant of the vehicle, such as by the display of the mirror system of the present invention. The locational data provided by the global positioning system to the GPS-derived compass system may include longitudinal and latitudinal locational or position data and may include height or altitude data, so that a vehicle location in three dimensional space may be established.

In such a GPS-derived or GPS-based compass system, the directional heading deduced is not affected by vehicle sheet metal or local magnetic anomalies (such as bridges, signs, etc.). This is because the directional heading is deduced from electromagnetic signals, such as radio frequency signals or microwave signals or the like received from satellites, which are not affected by such local magnetic anomalies. Thus, traditional calibration and re-calibration of the compass system is not needed, nor is there any need to compensate for any vehicle magnetic field or change thereto over the lifetime of usage of the vehicle. Likewise, such a system does not require a zone input to set the compass system to the appropriate zone, since the GPS-derived data will indicate the geographic location of the vehicle irrespective of which zone the vehicle is in. It is envisioned that such a GPS-derived compass system may determine or deduce the directional heading as degrees from a particular direction, such as 42 degrees from a North heading or the like, and thus the directional heading output of the GPS-derived compass system may be displayed as degrees to provide a more accurate representation to the driver or occupant of the vehicle as to the actual directional heading of the vehicle.

Optionally, the magnetoresponsive compass sensor or circuitry responsive to the earth's magnetic field may be operable in conjunction with the global positioning system of the vehicle to provide directional heading data to the global positioning system, such as disclosed in U.S. patent application Ser. No. 10/422,378, filed Apr. 24, 2003 by Schofield for IMAGING SYSTEM FOR VEHICLE, now U.S. Pat. No. 6,946,978, which is hereby incorporated herein by reference. The compass sensor circuitry may provide such directional heading data to assist the global positioning system in maintaining tracking of the location of the vehicle, such as between waypoints or the like, when the satellite signal to the global positioning system is interrupted, such as may occur in cities between tall buildings (often referred to as "urban canyons") or the like. Other vehicle movement data may also be provided, such as vehicle speed data or vehicle odometer data or the like, to further assist in determining and tracking the location of the vehicle in situations where the satellite communication to the global positioning system of the vehicle may be temporarily interrupted or compromised. Optionally, an imaging system (such as described in U.S. patent application Ser. No. 10/422,378, filed Apr. 24, 2003 by Schofield for IMAGING SYSTEM FOR VEHICLE, which is hereby incorporated herein by reference) may be used to further assist in determining and tracking the location of the vehicle in situations where the satellite communication to the global positioning system may be temporarily interrupted or compromised.

The GPS-derived compass system may provide directional heading data deduced or calculated from point-to-point geographic positional locators provided by a GPS navigational system. However, the GPS-derived compass system may take a period of time to lock into or deduce accurate data after first turning on the vehicle ignition after the vehicle has been parked for a period of time with the ignition off. After the ignition is initially started (sometimes referred to as a "cold start"), it can take several minutes of driving until the GPS navigational system is fully operational and accurate. During this initial driving period, a directional heading that the vehicle was faced in immediately prior to parking can be displayed (such previous ignition cycle heading or last directional heading may be stored in an electronic memory within the vehicle when the vehicle is parked and the ignition is off). Also, where a magnetoresponsive sensor compass system (such as a compass system having a magnetoresistive sensor, a magnetoinductive sensor or the like) is used as an auxiliary or back up system to the GPS-derived compass system, the auxiliary magnetoresponsive sensor can provide the compass sensing during the initial period immediately after the ignition restarts and during the first or initial driving of the vehicle.

The magnetoresponsive sensor (typically an orthogonal pair of magnetoresponsive elements or the like, as known in the compass art, and such as described in U.S. Pat. No. 5,255,442, which is hereby incorporated herein by reference) may be calibrated during the previous ignition cycle of the vehicle, and the correct calibration may be established by the main GPS-derived compass system during the previous ignition cycle while the vehicle is driven. The auxiliary compass system (the magnetoresponsive sensor compass system) thus may be calibrated during the prior use or movement of the vehicle via the main compass system (the GPS-derived compass system), and then may temporarily function as the primary compass system initially after a cold start until such time as the main GPS-derived compass system is ready to take over. Alternately, or additionally, the auxiliary magnetoresponsive compass system may switch to a rapid calibration mode (such as the Cal-1 mode discussed above) at the time of the initial ignition of the cold start to quickly calibrate the magnetoresponsive sensor or sensors when the vehicle is first started and driven.

Thus, use of a magnetoresponsive sensor to augment or back up a GPS-derived compass system can be useful when commencing driving of the vehicle after the vehicle has been stopped and parked. The magnetoresponsive sensor element can serve to detect the earth's magnetic field and thus may temporarily provide a directional heading signal until such time as the global positioning system can detect sufficient point-to-point data for the GPS-derived compass system to provide the accurate directional heading of the vehicle. This approach can also be useful when, for example, a vehicle turns a corner or otherwise executes a sharp directional change.

Also, and as described in U.S. patent application Ser. No. 10/422,378, filed Apr. 24, 2003, now U.S. Pat. No. 6,946,978, which is hereby incorporated herein by reference, it is envisioned that a gyroscope or gyroscopic sensor can be combined with a global positioning system (optionally, also with a magnetoresponsive sensor element included) to augment the GPS-derived compass system when driving through urban canyons or the like or other situations when the GPS satellite signals are temporarily lost or obscured. In this regard, it may be advantageous to use wheel tick data, as known in the automotive art, to assist in the determination of the vehicle directional heading by differential compass techniques or the like. Alternately, or in addition thereto, an assisted global positioning system can be utilized (whereby cellular telecommunications may be used, as known in the art, to determine the vehicle location via triangulation of a cellular signal transmitted from the vehicle to cellular telephone towers or transceivers, such as by comparing the time of flight of the signal or the like to the towers or transceivers) to augment or supplement the GPS-derived compass system in areas where the satellite signals are temporarily lost or obscured. Optionally, where a navigational system is available in the vehicle, map matching techniques as known in the art can be used to augment the GPS-derived compass system. Optionally, dedicated short range communication, such as to a toll system or vehicle information communication system or an intelligent highway system component or the like, can be used to supplement or augment the GPS-derived compass system. It is further envisioned that aspects of the imaging techniques taught in U.S. patent application Ser. No. 10/422,378, filed Apr. 24, 2003, now U.S. Pat. No. 6,946,978, which is hereby incorporated herein by reference, may be used in connection with the GPS-derived compass system and/or the magnetoresponsive compass sensor or system and/or any of the other systems or components discussed above, in order to augment or assist the compass system or systems.

Such a GPS-derived compass system may include a termination trigger or detection for terminating or deactivating the control of or adjustment of a directional heading or indication to be displayed to the driver of the vehicle, such as via detection of activation of a reverse gear engagement. Thus, when the reverse gear of the vehicle is engaged, the GPS-derived data may be ignored, such that only forward moving GPS-derived data may be considered or utilized by the compass system or display circuitry and displayed to the driver or occupant of the vehicle.

Because the global positioning system may provide altitude data, such altitude data may optionally be provided to the compass system or display system as well. However, the altitude data currently available via global positioning system technology has a resolution of approximately +/−50 feet to +/−150 feet or thereabouts. Therefore, an exact numerical digital output or display of the deduced altitude would not be practical using current global positioning system technology. It is envisioned that the display may provide an indication of an approximate altitude of the vehicle via illumination of one or more icons or indicia representative of particular levels or altitudes, such as "1000 feet above sea level", "2000 feet above sea level" and so on (or may be "1 kilometer above sea level", "2 kilometers above sea level" and so on) or the like. The indicator representative of the particular altitude that the vehicle is approaching or near or at (such as "2000 feet above sea level") may be activated or illuminated, while the indicator representative of the altitude that the vehicle is moving away from (such as "1000 feet above sea level") may be correspondingly deactivated.

Optionally, multiple indicators or indicia for the altitude display may be displayed as a row or column, such that multiple levels or altitudes are displayed to the driver, with the indicator or indicia representative of the particular level or altitude at which the vehicle is at or near being activated or illuminated. As the vehicle altitude increases or decreases, the indicators or indicia may scroll or shift, such that the indicator or indicia representative of the approximate current vehicle altitude remains at the center of the row or columns of indicators/indicia. For example, the display may initially provide a row of five indicia or indicators that are representative of "sea level", "1000 feet above sea level", "2000 feet above sea level", "3000 feet above sea level", and "4000 feet above sea level" (with "sea level" being, for example, at the left side of the row or at the bottom of a column of the indicia). Initially, for example, the center indicator, which may be representative of 2000 feet above sea level, may be activated or illuminated or otherwise highlighted. As the vehicle climbs, the center indicator may remain illuminated, but the indicia or labels or icons or the like of the display may shift or scroll toward one side (such as the toward left side in the present example), such that the indicia for "sea level" disappears and the indicia representative of "5000 feet above sea level" appears at the right side of the row. The other indicia of the display also shift toward the left end or side, such that the left most indicia is then "1000 feet above sea level", and the center indicia (at the illuminated or highlighted center indicator) is "3000 feet above sea level". Because the indicia or labels may scroll as the vehicle changes altitude, the altitude display may only provide one indicator or illumination source, while the indicia or icons or the like are scrolled in either direction (left-right or up-down) to match the approximate altitude of the vehicle with the indicator. Optionally, the indicator may not even be illuminated, but may comprise a center dot or pointer or the like, with the scrolling indicia moving to align the approximate vehicle altitude with the pointer or the like.

Also, the global positioning system may provide highly accurate time data (with an accuracy good to at least a portion of a second, such as a millisecond or nanosecond, such that a display of time down to the seconds is accurate to a single second digit) to the compass system or other circuitry or system of the mirror assembly or accessory module or mirror system of the vehicle to provide a clock setting function or to provide a time or clock display which would provide accurate time for viewing by the driver or occupant of the vehicle. The time display may be displayed at the reflective element of the mirror assembly or may be displayed at a display screen or display element at an accessory module or the like or may be displayed elsewhere in the vehicle, without affecting the scope of the present invention. Because the GPS-derived highly accurate time data is fully accurate and never requires resetting, the clock display may include hours, minutes and seconds (and even fractions of seconds or milliseconds). Also, the GPS-derived highly accurate time data may, in conjunction with the GPS-derived geographic (longitude/latitude) position, figure or deduce the time zone that the vehicle is in (e.g., Eastern, Central, Mountain or Pacific time zones or the like), and may adjust the clock output accordingly. The GPS-derived highly accurate time data may also provide the date, and the system may adjust the clock output to account for daylight savings time or the like, such as in response to the date and the current location of the vehicle. The clock display thus never needs to be reset, even when the vehicle changes time zones or when the time changes from standard time to daylight savings time or vice versa.

It is envisioned that the global positioning system may also provide a vehicle speed or average vehicle speed (such as in miles per hour or kilometers per hour) by determining the distance traveled by the vehicle during a particular period of time. The distance traveled may be determined via deduction of point-to-point data pertaining to the locational movement of the vehicle. Optionally, the GPS-derived system may display an odometer function, such as trip odometer function which may indicate the distance traveled by the vehicle since the last time the odometer function was reset. Optionally, the GPS-derived system may display a timer function or elapsed time from the start of a trip (or from when the timer function is activated) to a particular waypoint or destination (or to when the timer function is stopped or deactivated). Optionally, the GPS-derived system may provide a navigational function or may be in communication with a GPS-derived navigational system, such as a navigational system of the types described in U.S. Pat. No. 6,477,464, and U.S. provisional applications, Ser. No. 60/405,392, filed Aug. 23, 2002 by McCarthy for VEHICLE NAVIGATION SYSTEM FOR USE WITH A TELEMATICS SYSTEM; and Ser. No. 60/406,166, filed Aug. 27, 2002 by Taylor et al. for VEHICLE NAVIGATION SYSTEM FOR USE WITH A TELEMATICS SYSTEM, which are hereby incorporated herein by reference.

It is further envisioned that the global positioning system of the vehicle may also provide directional heading data and/or vehicle attitude data to the magnetoresponsive compass sensor circuitry or system to assist in calibration of the compass sensor circuitry or system. The global positioning system of the vehicle may also provide zone data to the compass sensor circuitry to automatically indicate the zone in which the vehicle is located. In such an application, the magnetoresponsive compass sensor circuitry may provide the directional heading data for displaying the directional heading to the driver of the vehicle, while the GPS-derived directional heading may be auxiliary to the magnetoresponsive compass sensor-derived directional heading and may be used to fill in gaps in the magnetoresponsive compass sensor data and/or to calibrate the magnetoresponsive compass sensor circuitry or system. As discussed above, however, the primary vehicular compass system may be a GPS-derived compass system, and the magnetoresponsive compass sensor circuitry may be auxiliary to the GPS-derived compass system and may function to provide gap filling directional heading data to the GPS-derived compass system.

When a global positioning system is used to augment a compass sensor system utilizing a magnetoresponsive sensor element, or when a magnetoresistive sensor element is used to fill in the gaps of or assist functioning of a GPS-derived compass system, the GPS-derived system component and the magnetoresponsive sensor element may be substantially co-located (such as within a windshield electronic module (such as the type disclosed in U.S. patent application Ser. No. 09/793,002, filed Feb. 26, 2001, now U.S. Pat. No. 6,690,268, which is hereby incorporated herein by reference)) or they may be in disparate locations of the vehicle (with interconnection preferably provided via a vehicular network, such as a CAN, LIN, MOST or similar vehicular networking protocol/systems or the like).

The present invention thus may provide a mirror system or mirror mounted vehicle information display system, which is operable to display information pertaining to the directional heading of the vehicle, the speed of the vehicle, the distance traveled by the vehicle, the altitude of the vehicle, the highly accurate time and date, and/or the like, all of which information or data may be obtained or derived from the global positioning system of the vehicle. Optionally, the display for displaying the clock, vehicle speed, etc. may be provided at or below the mirror reflective element (or elsewhere at the mirror assembly) or at an accessory module or electronic module or pod or the like, and may include a menu or selection list for a user to access to select which information is to be displayed at the display.

Figure 13:
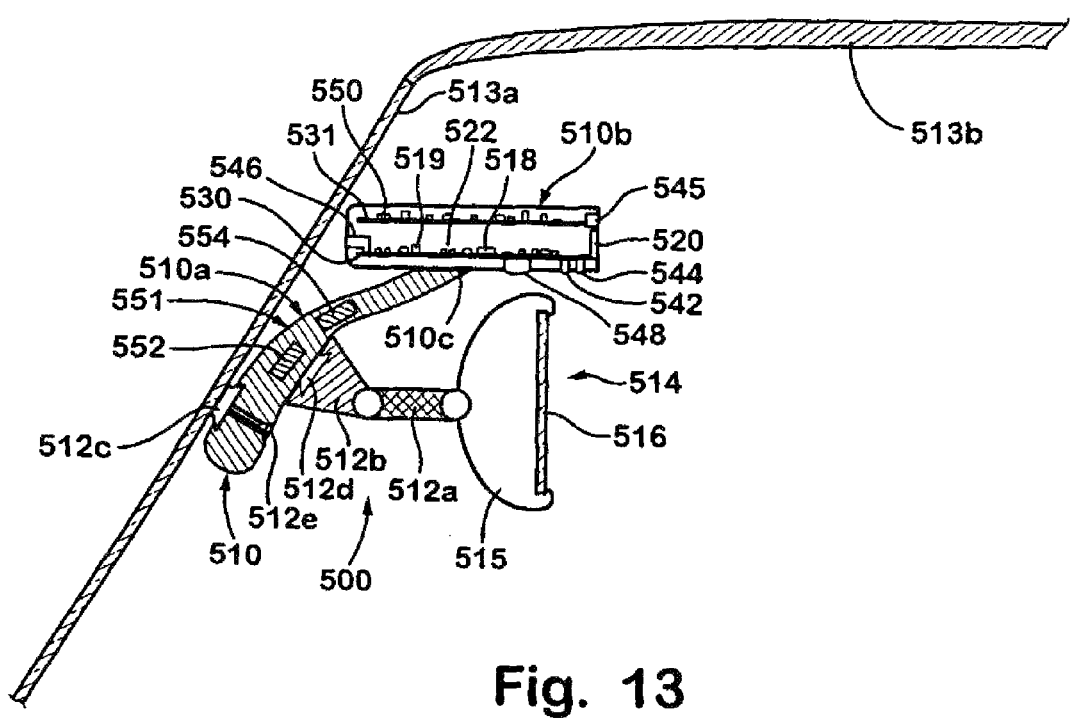
FIG. 13 is a side elevation and partial sectional view of a mirror system in accordance with the present invention, having a GPS-derived compass system, and with the information display being positioned at the accessory module.

With reference to FIG. 13, an interior rearview mirror system 500 is shown which comprises a GPS-derived compass system (comprising of a global positioning system 551, which may comprise a GPS antenna 552 and a GPS receiver/signal processor 554) and a magnetoresponsive auxiliary or back up compass sensor 518. A microprocessor 519 may receive data from the global positioning system and may generate directional heading data or information for displaying at a vehicle information display 520, while the magnetoresponsive compass sensor (for example, a magnetoresistive compass sensor or the like) provides an auxiliary compass sensor and is available for filling in gaps in the data and/or assisting in providing directional data after cold starts of the vehicle, as discussed above. Preferably, direction indicative signals as generated by the auxiliary compass sensor 518 is fed to and processed by microprocessor 519. The microprocessor may temporarily process the direction indicative signals generated by the auxiliary compass sensor 518 to generate directional information for displaying at display 520 when the locational data generated by the global positioning system 551 is compromised. The GPS-derived compass system of mirror system 500 thus may be the primary or main compass system and may provide or display the directional heading of the vehicle (as derived via the global positioning system) at display 520, while the magnetoresponsive compass sensor 518 may provide the auxiliary compass system or gap filling function, and thus may provide a back up compass sensor for the GPS-derived compass system.

In the illustrated embodiment, mirror system 500 includes an accessory module 510, which includes a base portion 510a and a head portion 510b, and an interior rearview mirror assembly 514. Head portion 510b of accessory module 510 may include a printed circuit board 530, which includes the magnetoresponsive compass sensor 518 (such as one or more magnetoresistive sensors, magnetoinductive sensors or the like) and microprocessor 519. The microprocessor 519 is in communication with global positioning system 551 and receives signals from the global positioning system and generates data or information (such as described above) to be displayed at information display 520. As discussed above, by deduction of the point-to-point locational movement of the vehicle, the directional heading (e.g., N, S, E, W, etc.) of the vehicle can be deduced, and this directional heading information (such as N, S, E, W, etc. characters or other icons, indicia or indicators or the like) may be displayed to a driver or occupant of the vehicle, such as by display 520 of mirror system 500.

The printed circuit board 530 may include or may be in communication with information display 520, which may comprise multi-functional display, and which may comprise a multi-pixel reconfigurable vehicle information display, such as described above. As shown in FIG. 13, the multi-functional vehicle information display 520 may be positioned at head portion 510b of the accessory module 510 and may be viewable above the mirror assembly 514. Information display 520 may be selectively operable to display information from one or more of the accessories of the accessory module or from other accessories or systems of the mirror assembly or mirror system or of the vehicle. For example, user-actuable buttons 544 (preferably readily accessible at or near the display 520) may be used for menu item selection (such as via stepping through multiple menu items to make a desired selection) of one or more accessories or functions that the user desires to have displayed at display 520. The menu items to be stepped through via the user-actuable controls or buttons 544 may at least include a compass octant direction display (e.g., N, S, E, W, etc.), a compass angle direction or heading, a clock display (preferably a highly accurate clock display including display accuracy to a second), a vehicle velocity display (e.g., mph, kph, etc.), an odometer display, a trip odometer display, an elapsed time display and/or the like. The user may actuate or depress the control or button multiple times to view the different available functions or displays, and may then select the desired display when that particular display is shown in the menu.

Accessory module 510 may further include a photosensor 542 to determine the ambient light level surrounding the mirror system, whereby the microprocessor or other controls or circuitry may dim or adjust the intensity of the illumination sources or pixels of display 520 in response to ambient sensing photosensor 542, in order to provide for dimming of the output of display 520 in darkened lighting conditions, such as at nighttime conditions, in order to reduce the intensity of display 520 to reduce glare and distraction and annoyance to the driver of the vehicle.

Accessory module 510 may be generally fixedly mounted at a mounting button 512c at the interior surface of the windshield 513a of a vehicle, while interior rearview mirror assembly 514 may include a mirror mount 512b which mounts to a second mounting button or attachment member 512d at the accessory module 510, such as in the manner described in U.S. patent application Ser. No. 10/355,454, filed Jan. 31, 2003 by Schofield et al. for VEHICLE ACCESSORY MODULE, now U.S. Pat. No. 6,824,281, which is hereby incorporated herein by reference. A fastener or set screw 512e or the like may be provided to secure the accessory module 510 to the mounting button 512c. Mirror assembly 514 includes a casing 515 and a reflective element 516 adjustably mounted to mirror mount 512b, such as via a mounting arm 512a and a double ball or single ball mounting arrangement, as is known in the mirror art.

The upper or head portion 510b of accessory module 510 includes one or more accessories or printed circuit boards 530, 531 positioned therein. Head portion 510b of accessory module 510a may be pivotably or movably mounted to the upper end of the base portion 510a of accessory module 510, such as at a pivot or swivel joint 510c, and such as disclosed in U.S. patent application Ser. No. 10/355,454, referenced above. Alternatively, head portion 510b may be fixedly mounted to base portion 510a. Head portion 510b may extend generally over the mirror case 514 to facilitate viewing and accessing the information display 520 and/or user actuable buttons or controls 544, 545. In addition to the microprocessor 519 and magnetoresponsive compass sensor 518, head portion 510b may further include one or more accessories on the printed circuit boards 530, 531, such as, for example, a forward facing camera or imaging sensor 546 (such as for a rain sensor system, an automatic headlamp control system, a lane departure warning system, or any other vision or imaging system of the vehicle, such as the types discussed below), a microphone 548 (which may be positioned at a lower portion of the head portion 510b and generally above the mirror casing 515 as shown in FIG. 13), garage door opening circuitry 550 (and associated controls or buttons 545 for actuating the garage door opening transmitter or the like), and/or any other vehicular accessories or systems or functions or the like. The head portion 510b may include user actuable controls or buttons 545 for selecting or activating and deactivating or controlling or adjusting one or more of the accessories.

Figure 14:
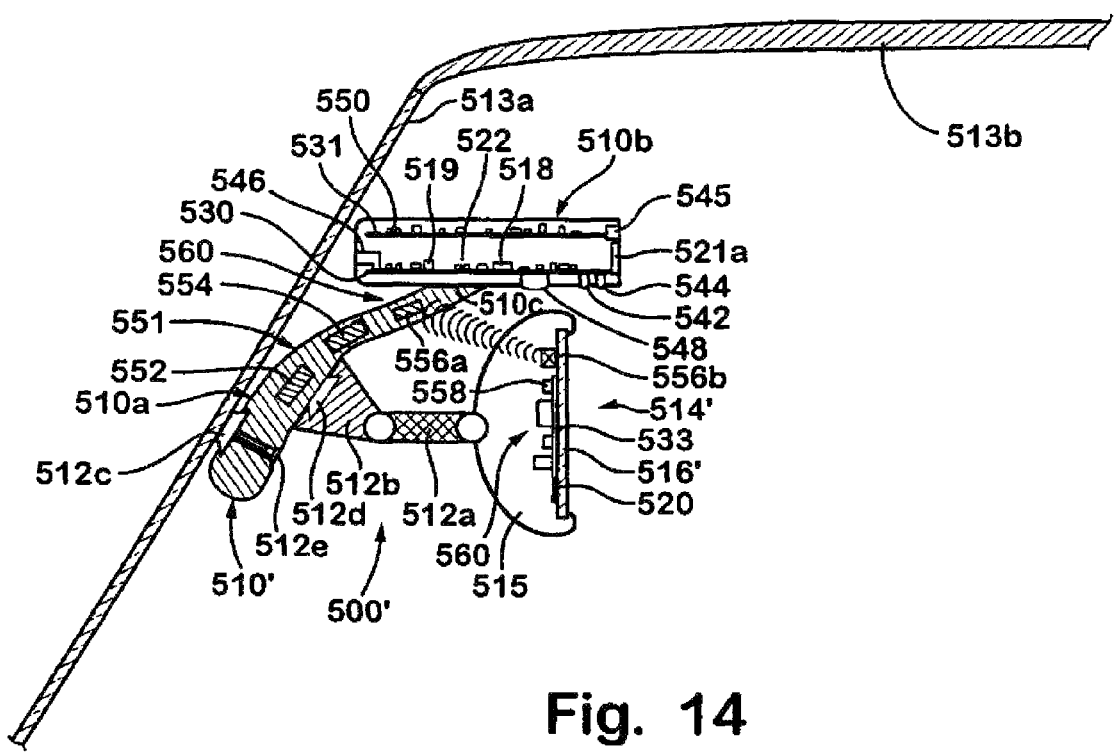
FIG. 14 is a side elevation and partial sectional view of another mirror system in accordance with the present invention, having a GPS-derived compass system, with a wireless data communication between the accessory module and the mirror assembly.
Figure 15:
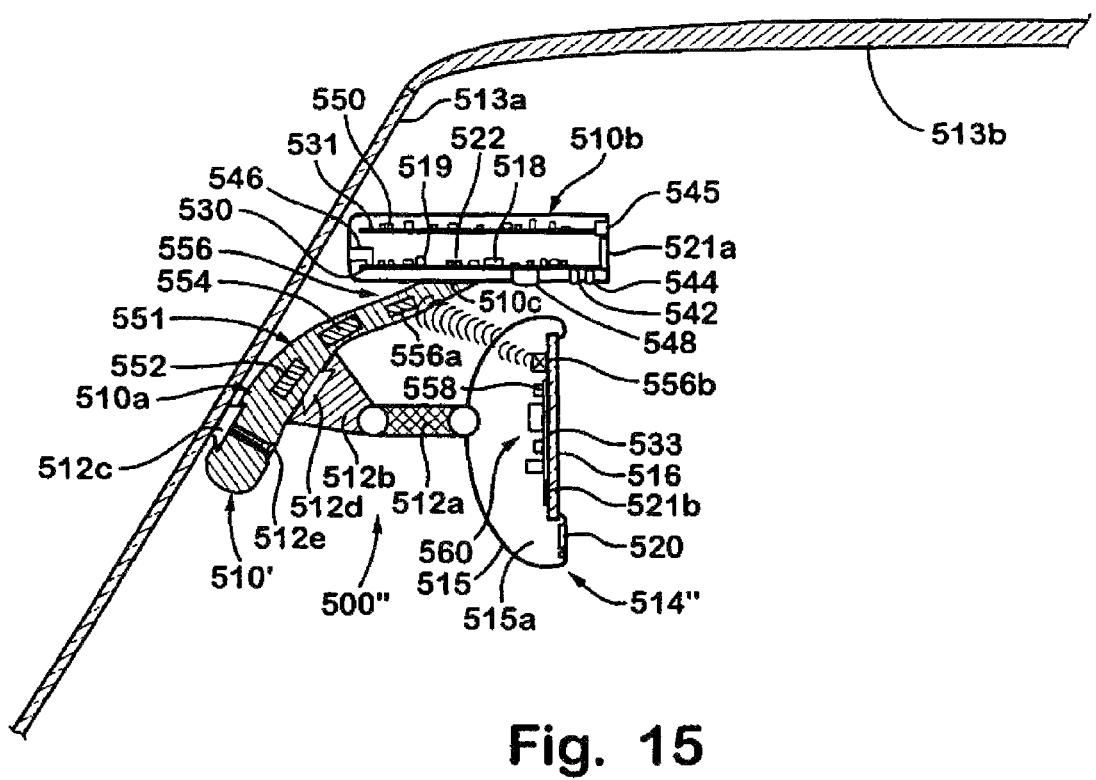
FIG. 15 is a side elevation and partial sectional view of another mirror system similar to the mirror system of FIG. 14, with the information display positioned at the bezel portion of the mirror assembly.

Optionally, and as shown in FIGS. 14 and 15, the vehicle information display 520 of a mirror system 500' may be positioned at the reflective element 516' of a mirror assembly 514' (FIG. 14), or the vehicle information display 520 of a mirror system 500" may be positioned at a bezel portion or chin portion 515a (FIG. 15) of a mirror assembly 514" (optionally, the display may otherwise be positioned elsewhere around the bezel portion, such as, for example, at the eyebrow portion of the mirror assembly or the like), while the controls and/or circuitry for the display system may be positioned within the mirror casing 515 (such as at or near the display 520) and/or at the accessory module or windshield electronic module 510' or the like remote from the mirror assembly 514', 514". The mirror assemblies and accessory modules of FIGS. 13-15 are otherwise substantially similar to one another, such that a detailed discussion of the similar components will not be repeated for each assembly. The common components of the accessory modules and mirror assemblies shown in FIGS. 13-15 are shown with common reference numbers.

As discussed above, the mirror assembly 514', 514" may mount on a mounting button 512d positioned at or protruding from an accessory module or windshield electronic module 510' which, in turn, may be mounted to an interior portion of the vehicle, such as to a mounting button 512b at the interior surface of the windshield 513a or to the headliner 513b or overhead console or the like. In such applications, it is envisioned that the communication link between the controls and the display system may be provided by a wireless data communication link 556 (such as a wireless communication link of the type disclosed in U.S. patent application Ser. No. 09/839,678, filed Apr. 20, 2001 by McCarthy et al. for VEHICLE MIRROR ASSEMBLY COMMUNICATING WIRELESSLY WITH VEHICLE ACCESSORIES AND OCCUPANTS, now U.S. Pat. No. 6,693,517, which is hereby incorporated herein by reference). The wireless data communication link 556 may include a transceiver 556a at the accessory module 510', and another transceiver 556b at the mirror casing 515, such as at a printed circuit board 533 positioned at or along a rear surface of the reflective element. The wireless data communication transceiver 556a may emit a signal, such as an infrared signal or a radio frequency (RF) signal or the like, from the windshield electronic module or the like to the transceiver 556b at the mirror housing to communicate data or control functions thereto. For example, the wireless communication link may communicate data from the microprocessor 519 to the display or display system 520, or may communicate data from the microprocessor (or from the global positioning system or other system or accessory) to other circuitry or accessories or displays positioned at the mirror assembly. The mirror assembly then only requires a power supply, such as a 12 volt power supply via a wire from the vehicle or accessory module, to power the functions or accessories or circuitry at the mirror assembly (optionally, the mirror assembly may include a battery power source or supply to obviate the need for a separate power connection). The wireless or infrared link thus avoids the need for a multi-wire data cable or the like between the accessory or electronic module and the mirror housing to provide communication and control of the accessories, functions or circuitry at the mirror assembly. The wireless communication link thus may allow the vehicle manufacturer to purchase a common windshield electronic module having the wireless or infrared link, and then associate the module with the appropriate display device, which may be at the mirror housing or at the instrument panel or at the overhead console or the like, via adjusting the aim or direction of the wireless link transceiver at the module so it is properly received by a corresponding transceiver at the display device. The wireless link thus facilitates interchangeability of the electronic modules and mirror assemblies, depending on the desired accessories, features or functions of the mirror system. For embodiments where a gyroscope is included to augment the global positioning system during periods when satellite inputs may be temporarily lost or compromised, the gyroscope can provide exact navigational guidance, and thus is a preferred inclusion should a turn-by-turn navigational feature or function be used or provided within the vehicle, such as navigation systems of the types disclosed in U.S. Pat. No. 6,477,464, and U.S. provisional applications, Ser. No. 60/405,392, filed Aug. 23, 2002 by McCarthy for VEHICLE NAVIGATION SYSTEM FOR USE WITH A TELEMATICS SYSTEM; and Ser. No. 60/406,166, filed Aug. 27, 2002 by Taylor et al. for VEHICLE NAVIGATION SYSTEM FOR USE WITH A TELEMATICS SYSTEM, which are hereby incorporated herein by reference.

As shown in FIGS. 14 and 15, the mirror case 515 may include other accessories or functions on the printed circuit board 533, such as a photosensor or the like 558 (such as for determining ambient light levels or for determining glare at the reflective element), electrochromic reflective element controls or circuitry 560 (for applications having an electrochromic reflective element), or other accessories or functions or features which may desirably be located at or within the mirror case. The sensors or accessories or controls may be positioned behind the mirror reflective element or may be positioned elsewhere at or within the casing, such as at the bezel or chin portion 515a of the mirror case 515. As shown in FIG. 14, the vehicle information display 520 may be positioned at the reflective element 516', and may be operable to project or emit illumination or information through the reflective element (such as through a transflective electrochromic reflective element such as discussed below or through a port or transparent window or region formed or etched in the reflective coating of the reflective element) for viewing by the driver or occupant of the vehicle. Optionally, as shown in FIG. 15, the vehicle information display 520 may be positioned at a chin or bezel portion 515a of the mirror case 515, and may include one or more user actuable controls or buttons at or near the information display. Optionally, as discussed above, the information display may be located at an accessory module or pod or the like at or near the interior rearview mirror assembly. The vehicle information display thus is associated with or adjacent to the interior rearview mirror assembly.

The information display 520 may comprise any of the types of displays described above, and may have multiple independently energizable LEDs, or may comprise a multi-pixel reconfigurable display, or the like. Optionally, and in addition to the vehicle information display 520 at the mirror assembly, the head portion 510a of the accessory module 510' may also include another information display 521a (FIGS. 14 and 15) and/or the circuit board 533 at the reflective element may include another information display 521b (which may project information through the reflective element, such as through a substantially transparent window formed in the reflective coating or through an electro-optic reflective element, such as a transflective electro-optic reflective element) to display other information to the driver or occupant of the vehicle.

Although shown and described as being positioned at an accessory module of a mirror system, clearly, the components of the global positioning system of the vehicle (i.e., the antenna and/or receiver/processor) can be located anywhere in the vehicle, such as in an instrument panel area, console, overhead console, or elsewhere, without affecting the scope of the present invention. Communication from the global positioning system to the upper windshield region at or adjacent to the rearview mirror assembly can be via a wire connection or a wireless communication. Preferably, the communication is via a bus or a vehicle network connection, such as a CAN, LIN, MOST or similar vehicular networking protocol/systems or nodes or the like, such as Bluetooth, SCP, UBP, J1850, CAN J2284, Fire Wire 1394 and/or the like. The microprocessor and/or display may be positioned at or adjacent to the rearview mirror assembly, such as in the mirror assembly or in the accessory module or pod or the like.

Also, although shown and described as having an accessory module and an interior rearview mirror assembly mounted to the accessory module (as shown in FIGS. 13-15), the mirror system of the present invention may include other forms of accessory modules or pods, such as a unitary pod or module, or a pod or module which attaches to the mirror mount (which in turn mounts to or attaches to a mounting button at the windshield or headliner or overhead console or other interior portion of the vehicle), without affecting the scope of the present invention.

Optionally, the printed circuit board of the compass or mirror system (such as a printed circuit board of a compass module or pod or a printed circuit board of the mirror assembly) of the present invention may include another display element along or partially along an edge of the board and may include one or more user-actuatable controls or buttons near or adjacent to the display element. The display element may be any type of display, such as a vacuum fluorescent (VF) display, a light emitting diode (LED) display, an electroluminescent (EL) display, a liquid crystal display (LCD), a video screen display or the like, and may be operable to display various information (as discrete characters, icons or the like, or in a multi-pixel manner) to the driver of the vehicle, such as passenger side inflatable restraint (PSIR) information, tire pressure status, and/or the like. The buttons may be for actuating or controlling various accessories or controls or components associated with the vehicle, such as for a compass calibration setting or zone setting, a telematics actuation, a garage door opener, an electronic toll control (such as disclosed in U.S. patent application Ser. No. 09/793,002, filed Feb. 26, 2001 by Schofield et al. for VIDEO MIRROR SYSTEMS INCORPORATING AN ACCESSORY MODULE, now U.S. Pat. No. 6,690,268, which is hereby incorporated herein by reference), and/or the like, or may be for switching the display between various functions or modes, without affecting the scope of the present invention. The mirror casing may include appropriate openings, such that the display element is visible through one opening, while the buttons or controls may partially protrude through other corresponding openings when an appropriate circuit board is installed within the mirror casing.

Optionally, the printed circuit board, or the mirror assembly (or the compass module or an accessory module associated with the mirror assembly), may include other accessories, such as a rain sensor (such as the type disclosed in commonly assigned U.S. Pat. Nos. 6,320,176; 6,353,392 and 6,313,454, which are hereby incorporated herein by reference), an image sensor (such as a video camera, such as a CMOS imaging array sensor, a CCD sensor or the like, such as the types disclosed in commonly assigned, U.S. Pat. Nos. 5,550,677; 6,097,023 and 5,796,094, which are hereby incorporated herein by reference), a temperature sensor (such as a contact temperature sensor for measuring the temperature at or of the windshield), an antenna, or any other sensor or device. For example, the mirror assembly may include a forward facing video image sensor or system, which may include an intelligent rain sensor (such as the type disclosed in commonly assigned U.S. Pat. Nos. 6,320,176; 6,353,392 and 6,313,454, which are hereby incorporated herein by reference), an image or vision system (including an imaging sensor, such as a video camera, such as a CMOS imaging array sensor, a CCD sensor or the like, such as the types disclosed in commonly assigned, U.S. Pat. Nos. 5,550,677; 6,097,023 and 5,796,094, and U.S. patent application Ser. No. 10/422, 378, filed Apr. 24, 2003 by Schofield for IMAGING SYSTEM FOR VEHICLE, now U.S. Pat. No. 6,946,978, which are hereby incorporated herein by reference), an intelligent headlamp controller (such as the type disclosed in U.S. Pat. No. 5,796,094 and/or in U.S. patent application Ser. No. 10/355,454, filed Jan. 31, 2003 by Schofield et al. for VEHICLE ACCESSORY MODULE, now U.S. Pat. No. 6,824,281, which are hereby incorporated herein by reference), an intelligent lane departure warning system, such as the type disclosed in U.S. patent application Ser. No. 10/427,051, filed Apr. 30, 2003 by Pawlicki et al. for OBJECT DETECTION SYSTEM FOR VEHICLE, now U.S. Pat. No. 7,038,577, which is hereby incorporated herein by reference, and/or the like. In applications where the mirror assembly includes or is associated with an automatic headlamp control system, it is envisioned that the display of the mirror system may include or provide a high beam/low beam indicator (such as an icon or indicia indicative of the high beams being activated, such as a blue headlamp indicia or the like) to indicate the status of the high beams of the vehicle to the driver or occupant of the vehicle.

Optionally, the mirror assembly or compass or accessory or electronic module of the present invention may include one or more displays, such as a text display, an icon display, a display on demand type display (such as may be implemented with a transflective reflective element, such as described in U.S. patent application Ser. No. 09/793,002, filed Feb. 26, 2001, entitled VIDEO MIRROR SYSTEMS INCORPORATING AN ACCESSORY MODULE, now U.S. Pat. No. 6,690,268, and in U.S. Pat. Nos. 5,668,663 and 5,724,187, the entire disclosures of which are hereby incorporated by reference herein), such as a video or touch screen interface display, or the like, and/or one or more sensors or other accessories, such as a biometric imager, such as for fingerprint authentication or the like, an infrared sensor, such as a zonal temperature sensor, such as suitable for an auto climate control, a forward facing image sensor, such as described above, a rearward facing image sensor (such as for biometric imaging (such as for face recognition, iris recognition or the like), seat height or position detection, drowsiness detection, safety/restraints object detection and position, emergency response image capture system, intrusion detection or the like), an electronic field sensor (such as the type disclosed in commonly assigned U.S. patent application Ser. No. 09/992,119, filed Nov. 14, 2001 by McCarthy et al. for VEHICLE COMPARTMENT OCCUPANCY DETECTION SYSTEM, now U.S. Pat. No. 6,768,420, which is hereby incorporated herein by reference), a microphone (such as the type disclosed in commonly assigned U.S. Pat. Nos. 6,243,003 and 6,278,377, and/or U.S. patent application Ser. No. 09/466,010, filed Dec. 17, 1999 by DeLine et al. for INTERIOR REARVIEW MIRROR SOUND PROCESSING SYSTEM, now U.S. Pat. No. 6,420,975, which are hereby incorporated herein by reference), which may be mounted at an upper portion of the mirror assembly and/or at the module. The display and/or accessories may be associated with a communication system, a speaker, a telematics module (which may include a GPS module, a wireless communication module, an human/machine interface (HMI), a display, such as an LED display, a dot matrix display, an alpha numeric display, a video display or the like, and/or a microphone, which may be operable for speech or voice recognition, noise reduction or noise cancellation), a humidity sensor, a remote keyless entry sensor, a tire pressure monitoring system (TPMS), an electronic toll collection sensor, an intelligent headlamp control, user interface controls (such as buttons, switches or the like for controlling various accessories of the vehicle, such as a sunroof, a communication system, lamps, security systems, displays or the like) or any other accessories, sensors, lights, indicators, displays or the like which may be suitable for mounting or positioning at or within the interior rearview mirror assembly or accessory module. The interior rearview mirror assembly and/or compass or accessory module may also provide for glare reduction characteristics of the reflective element of the rearview mirror assembly.

The accessories or components of the interior rearview mirror assembly or the compass or accessory or electronic module may be connected to the vehicle electronic or communication systems and may be connected via various protocols or nodes, such as Bluetooth, SCP, UBP, J1850, CAN J2284, Fire Wire 1394, MOST, LIN and/or the like, depending on the particular application of the interior rearview mirror assembly and/or compass module of the present invention. The interior rearview mirror assembly and/or compass module may be electronically integrated with the vehicle electrical and/or control systems. For example, the interior rearview mirror assembly may connect to a sunroof control, rain sensor control, mass motion sensor, roof lighting control, microphone/cell phone control, climate control, and/or the like.

The interior rearview mirror assembly and/or accessory module may also include user interface controls, such as buttons, switches or the like, displays, indicators, microphones, speakers or the like. Some of these may be provided at or along a display or interface area at or above the mirror.

The interior rearview mirror assembly and/or the compass module of the present invention may include lights, and may be a modular rearview mirror assembly, such as described in U.S. Pat. No. 6,124,886, which is hereby incorporated herein by reference, or may have various other accessories, such as disclosed in U.S. Pat. No. 6,222,460, which is hereby incorporated herein by reference.

Optionally, the interior rearview mirror assembly or compass or accessory module of the present invention may include a network bus, such as a CAN bus or a LIN bus, such as disclosed in U.S. Pat. No. 6,291,905, which is hereby incorporated herein by reference. The network bus may be operable to communicate with other systems of the vehicle, such as with accessories or elements of an accessory module, such as an accessory module of the type disclosed in commonly assigned U.S. Pat. Nos. 6,243,003; 6,278,377 and 6,420,975; U.S. patent application Ser. No. 10/054,633, filed Jan. 22, 2002 by Lynam et al. for VEHICULAR LIGHTING SYSTEM, now U.S. Pat. No. 7,195,381; U.S. patent application Ser. No. 10/355,454, filed Jan. 31, 2003 by Schofield et al. for VEHICLE ACCESSORY MODULE, now U.S. Pat. No. 6,824,281; and/or International Publication No. WO 01/64481, published Sep. 7, 2001, which are all hereby incorporated herein by reference.

Optionally, it is envisioned that the compass system of the present invention may be implemented with an electrochromic rearview mirror assembly, preferably utilizing a solid polymer matrix electrochromic medium, such as described in U.S. Pat. No. 5,910,854, which is hereby incorporated herein by reference. The network bus of the interior rearview mirror assembly may then be in communication with the reversing system of the vehicle, such that the interior rearview mirror assembly knows when the vehicle is shifted into reverse. The bus may then be operable to disable the electrochromic dimming of the mirror when the vehicle is in reverse, as is desired and known in the art.

The mirror system or interior rearview mirror assembly and/or compass or accessory module of the present invention may then include electrochromic control circuitry for controlling the reflectivity of an electrochromic mirror. The circuitry may include a rearward viewing glare detector or sensor and a forward viewing and/or sideward viewing ambient light detector or sensor, such as described in U.S. Pat. No. 4,793,690, which is hereby incorporated herein by reference, or may include a single sensor, such as described in U.S. Pat. No. 5,193,029, which is hereby incorporated herein by reference. The output of the circuitry may control an outside electrochromic mirror as well as the interior rearview electrochromic mirror. It is further envisioned that the circuitry may control an outside electrochromic mirror, while the interior rearview mirror assembly may be a prismatic mirror, without affecting the scope of the present invention.

Further, automatic dimming circuitry used in the electrochromic mirror assembly and/or in the compass module of the present invention may utilize one or more (typically two) photosensors to detect glaring and/or ambient lighting. For example, a silicon photosensor, such as a TSL235R Light-to-Frequency converter (available from Texas Advanced Optoelectronic Solutions Inc. of Plano, Tex.), may be used as such a photosensor. Such light-to-frequency converters comprise the combination of a silicon photodiode and a current-to-frequency converter on a single monolithic CMOS integrated circuit.

The mirror system of the present invention may include use of a blue or ultraviolet light emitting LED that emits UV and/or blue radiation (typically below about 400 nm in wavelength or thereabouts) into a specialized filter material (interposed as described above between the light source and the rear of the reflective element), and with the specialized filter material (typically a polymeric film or layer) including an organic or inorganic compound that fluoresces and/or phosphoresces in a color different than the color emitted by the LED light source. Thus, for example, a blue or blue-green fluorescing moiety can be included in the filter that, when irradiated with radiation from an ultraviolet LED, glows with a blue or blue-green color so that the driver, when viewing the "N" cardinal direction, for example, as etched or otherwise created or formed on the mirror reflective element, sees "N" in a blue or blue-green color. Likewise for other colors in the visible spectrum.

It is further envisioned that the interior rearview mirror assembly may include a transflective one way mirror element, such as disclosed in commonly assigned U.S. patent application Ser. No. 10/054,633, filed Jan. 22, 2002 by Lynam et al. for VEHICULAR LIGHTING SYSTEM, now U.S. Pat. No. 7,195,381, which is hereby incorporated herein by reference. Preferably, the mirror reflective element (behind which a video display screen may be disposed so that the image displayed is visible by viewing through the mirror reflective element) of the interior mirror assembly comprises a transflective mirror reflector such that the mirror reflective element is significantly transmitting to visible light incident from its rear (i.e. the portion furthest from the driver in the vehicle), with at least about 15% transmission preferred, at least about 20% transmission more preferred and at least about 25% transmission most preferred, while simultaneously, the mirror reflective element is substantially reflective to visible light incident from its front (i.e. the position closest to the driver when the interior mirror assembly is mounted in the vehicle), with at least about 60% reflectance preferred, at least about 70% reflectance more preferred and at least about 75% reflectance most preferred. Preferably, a transflective electrochromic reflective mirror element is used (such as is disclosed in U.S. patent application Ser. No. 09/793,002, filed Feb. 26, 2001, entitled VIDEO MIRROR SYSTEMS INCORPORATING AN ACCESSORY MODULE, now U.S. Pat. No. 6,690,268 and in U.S. Pat. Nos. 5,668,663 and 5,724,187, the entire disclosures of which are hereby incorporated by reference herein) that comprises an electrochromic medium sandwiched between two substrates.

The interior rearview mirror assembly may include a display on demand (DOD) display (such as disclosed in commonly assigned, U.S. patent application Ser. No. 10/054,633, filed Jan. 22, 2002 by Lynam et al. for VEHICULAR LIGHTING SYSTEM, U.S. patent application Ser. No. 09/793,002, filed Feb. 26, 2001, entitled VIDEO MIRROR SYSTEMS INCORPORATING AN ACCESSORY MODULE, now U.S. Pat. No. 6,690,268 and in U.S. Pat. Nos. 5,668,663 and 5,724,187, the entire disclosures of which are hereby incorporated by reference herein) which may comprise two or more displays located in the mirror assembly. Optionally, when the left turn signal is turned on, a blind spot/lane change aid camera view or hazard indication may be displayed in the mirror (preferably via a display on demand indicia or display).

Also, the interior rearview mirror system may include ultra small information displays, such as are disclosed in U.S. patent application Ser. No. 10/225,851, filed Aug. 22, 2002 by Burgner for VEHICLE INFORMATION DISPLAY, now U.S. Pat. No. 6,847,487, the entire disclosure of which is hereby incorporated by reference herein. Such ultra-small displays may be of a transmissive-type or a reflective type. For example, the ultra small liquid crystal display (LCD) available from Kopin Corporation of Taunton, Mass. is a transmissive type. Kopin Corporation utilizes silicon-on-insulator SOI wafers to build transmissive displays. Kopin Corporation's product utilizes thin monocrystal silicon thin film transistors Si-TFT of several microns peeled off from the circuit board to filter out light, and employs a field sequential method, which shows images in accordance with sequentially changing red, green, and blue. The display has a high degree of transmissivity because it does not need color filters. Image quality depends on color purity of the light emitting diode used as the illumination source.

Therefore, the compassized interior rearview minor system of the present invention provides for the addition or implementation of a compassized reflective element within a casing of an interior rearview mirror assembly, with minimal invasiveness if any at all to the overall complete mirror assembly design. The compass system and reflective element combination of the present invention may allow for easy installation of the compass system within the mirror casing, since the compass system may be installed as the reflective element is snapped into place at or within the mirror casing. The compass system may thus be implemented within a prismatic interior rearview mirror assembly at generally the same cost, with respect to design and tooling costs and the like of the mirror assembly, as a non-compassized mirror assembly. The compass system and printed circuit board may thus be implemented in a low cost, double ball mounted prismatic mirror assembly, thereby providing a compass system for non-luxury vehicles.

Additionally, the accessory module and display at an interior rearview mirror assembly in accordance with the present invention provides for the addition or implementation of a compassized reflective element within a casing of a mirror assembly, with minimal invasiveness if any at all to the overall complete mirror assembly design. The compass system and reflective element combination of the present invention may allow for easy installation of the compass system at the mirror mount, while the display may be positioned at the reflective element. The compass circuitry may be in electrical communication with the display illumination sources or light emitting diodes and may be operable to energize each of the illumination sources via energizing a single wire associated with each illumination source. The compass or accessory module of the present invention may also include electro-optic control circuitry for automatically dimming an electro-optic or electrochromic reflective element. Such an electro-optic reflective element may be provided within the mirror housing and may be connected to the control circuitry of the compass module to provide electro-optic function to a low cost mirror assembly, which otherwise does not include such circuitry. The compassized mirror system may thus be implemented in a low cost, double ball mounted prismatic mirror assembly, thereby providing a compass system for non-luxury vehicles.

The present invention may also provide a GPS-derived compass system for deducing or providing and displaying directional heading data or information to a driver or occupant of the vehicle. The mirror system may include a magnetoresponsive sensor which may function as an auxiliary or back up to the GPS-derived compass system when the global positioning system of the vehicle is not generating an appropriate signal or input to the GPS-derived compass system. The auxiliary compass sensor thus ensures consistency of the directional heading information being displayed. Because the GPS-derived compass system may function as the primary compass system and may function to calibrate the magnetoresponsive sensor, compass control circuitry and calibration algorithms and circuitry are not required. The GPS-derived compass system may extract or derive other data or information from the global positioning system of the vehicle and may selectively display such other vehicle information to the driver or occupant of the vehicle.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. An information mirror system for a vehicle, said information mirror system comprising:
   an interior rearview mirror assembly having a mirror housing and a transflective reflective element;
   wherein said transflective reflective element comprises an electro-optic transflective reflective element having a transflective mirror reflector that is partially transmissive of light and partially reflective of light incident thereon;
   wherein said mirror housing is adjustably mounted at an interior portion of a vehicle equipped with said information mirror system via a pivot mounting arrangement;
   wherein adjustment of said mirror housing via said pivot mounting arrangement adjusts a rearward field of view of said transflective reflective element when said interior rearview mirror assembly is normally mounted in the equipped vehicle;
   a video display operable to display information;
   wherein said video display comprises a reconfigurable liquid crystal display;
   wherein said video display is disposed in said mirror housing rearward of said transflective mirror reflector of said transflective reflective element, wherein information displayed by said video display is viewable by a driver of the equipped vehicle viewing through said transflective mirror reflector of said transflective reflective element when said video display is displaying information and wherein, when said video display is not displaying information, the presence of said video display behind said transflective mirror reflector of said transflective reflective element is substantially not discerned by a driver of the equipped vehicle normally viewing said transflective reflective element when operating the equipped vehicle;
   wherein said interior rearview mirror assembly comprises a microprocessor and wherein said microprocessor is operable to control dimming of said electro-optic transflective reflective element;
   wherein said microprocessor is operable to control said video display;
   wherein said information mirror system comprises a forward facing camera having a forward field of view in the direction of forward travel of the equipped vehicle, and wherein said forward facing camera captures images through the windshield of the equipped vehicle; and
   wherein said forward facing camera is associated with a headlamp controller that, responsive to image processing of images captured by said forward facing camera, is operable to control the headlamps of the equipped vehicle.

2. The information mirror system of claim 1, wherein said video display is operable to display at least one of (a) text information, (b) iconistic information and (c) a video image captured by a camera of the equipped vehicle.

3. The information mirror system of claim 1, wherein said video display is operable to display a directional heading to the driver of equipped vehicle.

4. The information mirror system of claim 3, further comprising a compass sensor disposed in said mirror housing rearward of said transflective reflective element and compass circuitry responsive to said compass sensor for determining the directional heading of the equipped vehicle, wherein said compass sensor adjusts in tandem with said transflective reflective element when the driver of the equipped vehicle adjusts said mirror housing to adjust a rearward field of view of the driver when viewing said transflective reflective element when said mirror assembly is normally mounted in the equipped vehicle.

5. The information mirror system of claim 4, wherein said compass circuitry at least partially compensates for movement of said compass sensor caused by adjustment of said mirror housing.

6. The information mirror system of claim 5, wherein said directional heading is at least partially established by a global positioning system of the equipped vehicle.

7. The information mirror system of claim 5, wherein said compass sensor is at least one of (a) attached at said transflective reflective element and (b) supported by said transflective reflective element.

8. The information mirror system of claim 5, wherein at least one of (a) said compass circuitry automatically at least partially compensates for a deviating magnetic field of the equipped vehicle and generates a compensated signal indicative of said directional heading of the equipped vehicle, and (b) said compass sensor comprises at least first and second magnetoresponsive sensing elements and wherein a physical mount supports said compass sensor at said transflective reflective element and is configured to orient said first magnetoresponsive sensing element to be substantially parallel to a direction of travel of the equipped vehicle and said second magnetoresponsive sensing element to be substantially orthogonal to the direction of travel of the equipped vehicle when said reflective element is at a selected angled.

9. The information mirror system of claim 5, wherein said compass circuitry at least partially compensates for movement of said compass sensor caused by adjustment of said mirror housing via an algorithm processed by a microprocessor, and wherein said pivot mounting arrangement comprises a double pivot mounting arrangement.

10. The information mirror system of claim 4, wherein said compass circuitry enters a rapid compensating mode in response to an ignition cycle of the equipped vehicle, wherein said compass circuitry automatically exits said rapid compensating mode and enters a less aggressive calibration mode that distinguishes the Earth's magnetic field from magnetic anomalies and non-abrupt changes in the vehicle magnetic signature, and wherein said compass circuitry automatically exits said rapid compensating mode after a predetermined period of time has elapsed since the ignition cycle.

11. The information mirror system of claim 1, wherein said video display comprises a reconfigurable liquid crystal display comprising a plurality of pixels and wherein particular groups of said pixels may be illuminated to form a desired character to display a directional heading of the equipped vehicle to the driver of the equipped vehicle.

12. The information mirror system of claim 1, wherein said video display is operable to display video images captured by a video camera of the equipped vehicle.

13. The information mirror system of claim 1 further comprising a global positioning system that is operable to determine a geographical location of the equipped vehicle.

14. The information mirror system of claim 13, wherein at least one of (a) said global positioning system provides altitude data and wherein altitude information is displayed to the driver of the equipped vehicle by said display, and (b) said global positioning system provides time data and wherein time information is displayed to the driver of the equipped vehicle by said video display.

15. The information mirror system of claim 1, wherein an intensity of said video display is adjusted by said microprocessor responsive to determination of a light level at said mirror assembly by at least one photosensor at said mirror assembly.

16. The information mirror system of claim 15, wherein said at least one photosensor comprises a silicon photosensor, and wherein said microprocessor, at least responsive to said silicon photosensor, controls dimming of said electro-optic transflective reflective element.

17. The information mirror system of claim 1, wherein said transflective mirror reflector comprises a metal thin film layer, and wherein at least one of (a) said transflective reflective element is at least 15 percent transmissive of visible light incident at a rear of said transflective reflective element, (b) said transflective reflective element has a reflectance of at least about 60 percent to visible light incident from its front, and (c) said transflective reflective element is at least 15 percent transmissive of visible light incident at a rear of said transflective reflective element and said transflective reflective element has a reflectance of at least about 60 percent to visible light incident from its front.

18. The information mirror system of claim 1, wherein said mirror housing is adjustably mounted at an in-cabin surface of the windshield of the equipped vehicle and wherein, when mounted at the in-cabin surface of the windshield of the equipped vehicle, said interior rearview mirror assembly accommodates a rain sensor.

19. The information mirror system of claim 1, wherein said interior rearview mirror assembly accommodates circuitry that, at least in part, is part of a lane departure warning system of the equipped vehicle.

20. The information mirror system of claim 19, wherein said circuitry of said interior rearview mirror assembly is electrically connected to a network bus of the equipped vehicle.

21. An information mirror system for a vehicle, said information minor system comprising:
    an interior rearview mirror assembly having a minor housing and a transflective reflective element;
    wherein said transflective reflective element comprises an electrochromic transflective reflective element having a transflective mirror reflector that is partially transmissive of light and partially reflective of light incident thereon;
    wherein said mirror housing is adjustably mounted at an interior portion of a vehicle equipped with said information mirror system via a pivot mounting arrangement;
    wherein adjustment of said mirror housing via said pivot mounting arrangement adjusts a rearward field of view of said transflective reflective element when said interior rearview mirror assembly is normally mounted in the equipped vehicle;
    a video display operable to display information;
    wherein said video display comprises a reconfigurable liquid crystal display comprising a plurality of pixels and wherein particular groups of said pixels may be illuminated to form a desired character to display a directional heading of the equipped vehicle to the driver of the equipped vehicle;
    wherein said video display is disposed in said mirror housing rearward of said transflective mirror reflector of said transflective reflective element, wherein information displayed by said video display is viewable by a driver of the equipped vehicle viewing through said transflective mirror reflector of said transflective reflective element when said video display is displaying information and wherein, when said video display is not displaying information, the presence of said video display behind said transflective mirror reflector of said transflective reflective element is substantially not discerned by a driver of the equipped vehicle normally viewing said transflective reflective element when operating the equipped vehicle;
    wherein said interior rearview mirror assembly comprises a microprocessor;
    wherein an intensity of said video display is adjusted by said microprocessor at least in part responsive to determination of a light level at said mirror assembly by at least one photosensor at said mirror assembly;
    wherein said at least one photosensor comprises a silicon photosensor, and wherein said microprocessor, at least in part responsive to said silicon photosensor, controls dimming of said electrochromic transflective reflective element;
    wherein said information mirror system comprises a forward facing camera having a forward field of view in the direction of forward travel of the equipped vehicle, and wherein said forward facing camera captures images through the windshield of the equipped vehicle; and
    wherein said forward facing camera is associated with a headlamp controller that, responsive to image processing of images captured by said forward facing camera, is operable to control the headlamps of the equipped vehicle.

22. The information mirror system of claim 21, wherein said microprocessor is operable to control said video display.

23. The information mirror system of claim 21, wherein said video display is operable to display at least one of (a) text information, (b) iconistic information and (c) a video image captured by a camera of the equipped vehicle.

24. The information mirror system of claim 21, further comprising a compass sensor disposed in said mirror housing rearward of said transflective reflective element and compass circuitry responsive to said compass sensor for determining the directional heading of the equipped vehicle.

25. The information mirror system of claim 21, wherein said transflective mirror reflector comprises a metal thin film layer, and wherein at least one of (a) said transflective reflective element is at least 15 percent transmissive of visible light incident at a rear of said transflective reflective element, (b) said transflective reflective element has a reflectance of at least about 60 percent to visible light incident from its front, and (c) said transflective reflective element is at least 15 percent transmissive of visible light incident at a rear of said transflective reflective element and said transflective reflective element has a reflectance of at least about 60 percent to visible light incident from its front.

26. The information mirror system of claim 25, wherein said mirror housing is adjustably mounted at an in-cabin surface of the windshield of the equipped vehicle and wherein, when mounted at the in-cabin surface of the windshield of the equipped vehicle, said interior rearview mirror assembly accommodates a rain sensor.

27. The information mirror system of claim 21, wherein said interior rearview mirror assembly accommodates circuitry that, at least in part, is part of a lane departure warning system of the equipped vehicle.

28. The information mirror system of claim 27, wherein said circuitry of said interior rearview mirror assembly is electrically connected to a network bus of the equipped vehicle.

29. An information mirror system for a vehicle, said information mirror system comprising:

an interior rearview mirror assembly having a mirror housing and a transflective reflective element;

wherein said transflective reflective element comprises an electrochromic transflective reflective element having a transflective mirror reflector that is partially transmissive of light and partially reflective of light incident thereon;

wherein said transflective mirror reflector comprises a metal thin film layer;

wherein said mirror housing is adjustably mounted at an interior portion of a vehicle equipped with said information mirror system via a pivot mounting arrangement;

wherein adjustment of said mirror housing via said pivot mounting arrangement adjusts a rearward field of view of said transflective reflective element when said interior rearview mirror assembly is normally mounted in the equipped vehicle;

a video display operable to display information;

wherein said video display comprises a reconfigurable liquid crystal display comprising a plurality of pixels and wherein particular groups of said pixels may be illuminated to form a desired character to display a directional heading of the equipped vehicle to the driver of the equipped vehicle;

wherein said video display is disposed in said mirror housing rearward of said transflective mirror reflector of said transflective reflective element, wherein information displayed by said video display is viewable by a driver of the equipped vehicle viewing through said transflective mirror reflector of said transflective reflective element when said video display is displaying information and wherein, when said video display is not displaying information, the presence of said video display behind said transflective mirror reflector of said transflective reflective element is substantially not discerned by a driver of the equipped vehicle normally viewing said transflective reflective element when operating the equipped vehicle;

wherein said interior rearview mirror assembly comprises a microprocessor;

wherein an intensity of said video display is adjusted by said microprocessor at least in part responsive to determination of a light level at said mirror assembly by at least one photosensor at said mirror assembly;

wherein said at least one photosensor comprises a silicon photosensor, and wherein said microprocessor, at least in part responsive to said silicon photosensor, controls dimming of said electrochromic transflective reflective element;

wherein said information mirror system comprises a forward facing camera having a forward field of view in the direction of forward travel of the equipped vehicle, and wherein said forward facing camera captures images through the windshield of the equipped vehicle;

wherein said forward facing camera is associated with a headlamp controller that, responsive to image processing of images captured by said forward facing camera, is operable to control the headlamps of the equipped vehicle; and wherein said interior rearview mirror assembly accommodates circuitry that, at least in part, is part of a lane departure warning system of the equipped vehicle, and wherein said circuitry of said interior rearview mirror assembly is electrically connected to a network bus of the equipped vehicle.

30. The information mirror system of claim 29, further comprising a compass sensor disposed in said mirror housing rearward of said transflective reflective element and compass circuitry responsive to said compass sensor for determining the directional heading of the equipped vehicle, wherein said compass sensor adjusts in tandem with said transflective reflective element when the driver of the equipped vehicle adjusts said mirror housing to adjust a rearward field of view of the driver when viewing said transflective reflective element when said mirror assembly is normally mounted in the equipped vehicle.

31. An information mirror system for a vehicle, said information mirror system comprising:

an interior rearview mirror assembly having a mirror housing and a transflective reflective element;

wherein said transflective reflective element comprises an electrochromic transflective reflective element having a transflective mirror reflector that is partially transmissive of light and partially reflective of light incident thereon;

wherein said transflective mirror reflector comprises a metal thin film layer;

wherein said mirror housing is adjustably mounted at an interior portion of a vehicle equipped with said information mirror system via a pivot mounting arrangement;

wherein adjustment of said mirror housing via said pivot mounting arrangement adjusts a rearward field of view of said transflective reflective element when said interior rearview mirror assembly is normally mounted in the equipped vehicle;

a video display operable to display information;

wherein said video display comprises a reconfigurable liquid crystal display comprising a plurality of pixels;

wherein said video display is disposed in said mirror housing rearward of said transflective mirror reflector of said transflective reflective element, wherein information displayed by said video display is viewable by a driver of the equipped vehicle viewing through said transflective mirror reflector of said transflective reflective element when said video display is displaying information and wherein, when said video display is not displaying information, the presence of said video display behind said transflective mirror reflector of said transflective reflective element is substantially not discerned by a driver of the equipped vehicle normally viewing said transflective reflective element when operating the equipped vehicle;

wherein said interior rearview mirror assembly comprises a microprocessor;

wherein an intensity of said video display is adjusted by said microprocessor at least in part responsive to determination of a light level at said mirror assembly by at least one photosensor at said mirror assembly;

wherein said at least one photosensor comprises a silicon photosensor, and wherein said microprocessor, at least in part responsive to said silicon photosensor, controls dimming of said electrochromic transflective reflective element;

wherein said information mirror system comprises a forward facing camera having a forward field of view in the direction of forward travel of the equipped vehicle, and wherein said forward facing camera captures images through the windshield of the equipped vehicle;

wherein said forward facing camera is associated with a headlamp controller that, responsive to image processing of images captured by said forward facing camera, is operable to control the headlamps of the equipped vehicle; and wherein said interior rearview mirror assembly accommodates circuitry that is electrically connected to a network bus of the equipped vehicle.

32. The information mirror system of claim 31, wherein said circuitry, at least in part, is part of a lane departure warning system of the equipped vehicle.

33. An information mirror system for a vehicle, said information mirror system comprising:

an interior rearview mirror assembly having a mirror housing and a transflective reflective element;

wherein said transflective reflective element comprises an electrochromic transflective reflective element having a transflective mirror reflector that is partially transmissive of light and partially reflective of light incident thereon;

wherein said transflective mirror reflector comprises a metal thin film layer, and wherein at least one of (a) said transflective reflective element is at least 15 percent transmissive of visible light incident at a rear of said transflective reflective element, (b) said transflective reflective element has a reflectance of at least about 60 percent to visible light incident from its front, and (c) said transflective reflective element is at least 15 percent transmissive of visible light incident at a rear of said transflective reflective element and said transflective reflective element has a reflectance of at least about 60 percent to visible light incident from its front;

wherein said mirror housing is adjustably mounted at an interior portion of a vehicle equipped with said information mirror system via a pivot mounting arrangement;

wherein adjustment of said mirror housing via said pivot mounting arrangement adjusts a rearward field of view of said transflective reflective element when said interior rearview mirror assembly is normally mounted in the equipped vehicle;

a video display operable to display information;

wherein said video display comprises a reconfigurable liquid crystal display comprising a plurality of pixels and wherein particular groups of said pixels may be illuminated to display at least one of (a) text information and (b) iconistic information to the driver of the equipped vehicle;

wherein said video display is disposed in said mirror housing rearward of said transflective mirror reflector of said transflective reflective element, wherein information displayed by said video display is viewable by a driver of the equipped vehicle viewing through said transflective mirror reflector of said transflective reflective element when said video display is displaying information and wherein, when said video display is not displaying information, the presence of said video display behind said transflective mirror reflector of said transflective reflective element is substantially not discerned by a driver of the equipped vehicle normally viewing said transflective reflective element when operating the equipped vehicle;

wherein said interior rearview mirror assembly comprises a microprocessor;

wherein an intensity of said video display is adjusted by said microprocessor at least in part responsive to determination of a light level at said mirror assembly by at least one photosensor at said mirror assembly;

wherein said at least one photosensor comprises a silicon photosensor;

wherein said information mirror system comprises a forward facing camera having a forward field of view in the direction of forward travel of the equipped vehicle, and wherein said forward facing camera captures images through the windshield of the equipped vehicle;

wherein said forward facing camera is associated with a headlamp controller that, responsive to image processing of images captured by said forward facing camera, is operable to control the headlamps of the equipped vehicle; and wherein said video display is operable to display video images captured by a video camera of the equipped vehicle.

34. The information mirror system of claim 33, and wherein said microprocessor, at least in part responsive to said silicon photosensor, controls dimming of said electrochromic transflective reflective element, and wherein particular groups of said pixels of said reconfigurable liquid crystal display may be illuminated to form a desired character to display a directional heading of the equipped vehicle to the driver of the equipped vehicle.

35. The information mirror system of claim 33, wherein said interior rearview mirror assembly accommodates circuitry that, at least in part, is part of a lane departure warning system of the equipped vehicle, and wherein said circuitry of said interior rearview mirror assembly is electrically connected to a network bus of the equipped vehicle.

* * * * *

UNITED STATES PATENT AND TRADEMARK OFFICE
CERTIFICATE OF CORRECTION

PATENT NO.         : 7,832,882 B2
APPLICATION NO.    : 12/693733
DATED              : November 16, 2010
INVENTOR(S)        : Andrew D. Weller et al.

Page 1 of 1

It is certified that error appears in the above-identified patent and that said Letters Patent is hereby corrected as shown below:

Column 7
Line 31, Insert --III-III-- after "line"

Column 38
Line 32, "GP S-derived" should be --GPS-derived--

Column 48
Line 29, "minor" should be --mirror--

Column 51
Claim 21, Lines 61-62, "minor" should be --mirror-- in both instances

Signed and Sealed this
Twenty-second Day of November, 2011

David J. Kappos
*Director of the United States Patent and Trademark Office*